US012726683B2

(12) United States Patent
Yamaga

(10) Patent No.: US 12,726,683 B2
(45) Date of Patent: Sep. 1, 2026

(54) INFORMATION PROCESSING SYSTEM, INFORMATION PROCESSING METHOD, AND COMPUTER PROGRAM

(71) Applicant: GREE, INC., Tokyo (JP)

(72) Inventor: Keisuke Yamaga, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 250 days.

(21) Appl. No.: 18/371,819

(22) Filed: Sep. 22, 2023

(65) Prior Publication Data

US 2024/0121481 A1 Apr. 11, 2024

(30) Foreign Application Priority Data

Sep. 22, 2022 (JP) ................................ 2022-150785

(51) Int. Cl.

| | |
|---|---|
| ***G06Q 30/02*** | (2023.01) |
| ***G06T 13/40*** | (2011.01) |
| ***G06T 19/00*** | (2011.01) |
| ***H04L 65/403*** | (2022.01) |
| ***H04N 21/4784*** | (2011.01) |

(52) U.S. Cl.

CPC ......... *H04N 21/4784* (2013.01); *G06T 13/40* (2013.01); *G06T 19/006* (2013.01); *H04L 65/403* (2013.01)

(58) Field of Classification Search

CPC ... H04N 21/4784; G06T 13/40; G06T 19/006; H04L 65/403; G06F 3/011

See application file for complete search history.

(56) References Cited

U.S. PATENT DOCUMENTS

| | | | | |
|---|---|---|---|---|
| 11,587,109 | B2 * | 2/2023 | Roberts | G06Q 30/0209 |
| 2013/0339111 | A1 * | 12/2013 | Ross | A63F 13/533 463/31 |
| 2014/0358655 | A1 * | 12/2014 | Wheeler | G06Q 30/0233 705/14.33 |
| 2015/0011286 | A1 * | 1/2015 | Kim | G07F 17/3244 463/17 |
| 2016/0189196 | A1 * | 6/2016 | Huh | G06Q 30/0267 705/14.31 |
| 2017/0018023 | A1 * | 1/2017 | Roux | G06Q 30/0201 |

(Continued)

FOREIGN PATENT DOCUMENTS

| | | | | |
|---|---|---|---|---|
| JP | 2021-051578 | A | | 4/2021 |
| JP | 2023-56436 | A | * | 10/2021 |
| JP | 2022-113881 | A | * | 6/2022 |

OTHER PUBLICATIONS

Jul. 11, 2023 Office Action issued in Japanese Patent Application No. 2022-150785.

(Continued)

*Primary Examiner* — Thuy N Nguyen

(74) *Attorney, Agent, or Firm* — Oliff PLC

(57) ABSTRACT

One or more processors included in an information processing system are programmed to receive information sent from a first user terminal, determine a state of the first user terminal based on the received information, increase a value of a first parameter associated with the first user by a first ratio while a first state of the first user terminal continues, change the first ratio to a second ratio while a second state of the first user terminal continues, and associate a predetermined reward with the first user according to the value of the first parameter.

13 Claims, 36 Drawing Sheets

(56) References Cited

U.S. PATENT DOCUMENTS

| | | | | |
|---|---|---|---|---|
| 2017/0032417 | A1* | 2/2017 | Amendjian | G06Q 30/0254 |
| 2018/0276710 | A1* | 9/2018 | Tietzen | G06Q 30/0269 |
| 2019/0103189 | A1* | 4/2019 | Schulman | G06Q 30/0207 |
| 2019/0222895 | A1* | 7/2019 | Petander | H04N 21/44218 |
| 2019/0295004 | A1* | 9/2019 | Chaturapruek | G06F 18/214 |
| 2020/0242105 | A1* | 7/2020 | Rich | H04L 9/40 |
| 2020/0413145 | A1* | 12/2020 | Fukuda | A63F 13/42 |
| 2021/0394054 | A1* | 12/2021 | Kanaya | A63F 13/213 |
| 2022/0021939 | A1 | 1/2022 | Mizuta et al. | |
| 2022/0172241 | A1* | 6/2022 | Shibata | G06Q 30/0208 |
| 2022/0345479 | A1* | 10/2022 | Markonis | H04L 63/1433 |
| 2023/0021434 | A1* | 1/2023 | Fukuda | H04N 21/44218 |
| 2023/0065048 | A1 | 3/2023 | Takakuwa et al. | |
| 2023/0086207 | A1* | 3/2023 | Palmisano | G06Q 30/0271 463/25 |

OTHER PUBLICATIONS

Jun. 16, 2026 Office Action issued in Japanese Patent Application No. 2025-118006.

* cited by examiner

| FIRST PAREMETER | REWARD |
|---|---|
| 250 | REWARD A |
| 500 | REWARD B |
| 750 | REWARD C |
| 1000 | REWARD D |

INFORMATION PROCESSING SYSTEM, INFORMATION PROCESSING METHOD, AND COMPUTER PROGRAM

This application claims the benefit of priority from Japanese Patent Application No. 2022-150785 filed Sep. 22, 2022, the entire contents of the prior application being incorporated herein by reference.

TECHNICAL FIELD

This disclosure relates to an information processing system, an information processing method, and a computer program.

BACKGROUND TECHNOLOGY

An information processing system is known that generates an animation of a character object based on movement of an actor and distributes a video including the animation of the character object.

SUMMARY

Problems to be Solved

In this technical field, an important subject is how to improve willingness of a distribution user to distribute, willingness of a viewing user to view, and/or willingness of users to interact with each other.

An object of this disclosure is to provide technical improvements that solve or alleviate at least part of the problems of the conventional technology described above.

One of more specific objects of this disclosure are to provide an information processing system, an information processing method, and a computer program that can improve willingness of a distribution user to distribute, willingness of a viewing user to view, and/or willingness of users to interact with each other.

Means of Solving Problems

An information processing system of this disclosure is an information processing system that provides a virtual space in which a character object of a user can be displayed, the information processing system comprising one or more computer processors, wherein:

the one or more computer processors comprises:

a receiver that receives information sent from a first user terminal of a first user;

a determination portion that determines a state of the first user terminal based on the information received by the receiver;

an increase portion that increases a value of a first parameter associated with the user by a first ratio while the first state continues when it is determined by the determination portion that the state of the first user terminal is a first state;

a change portion that changes a ratio of increase of the value of the first parameter to a second ratio while the second state continues when it is determined by the determination portion that the state of the first user terminal has changed from the first state to a second state; and a reward-association portion that associates a predetermined reward with the first user according to the value of the first parameter.

The second state can be either (i) a distribution state in which a video is being distributed at the first user terminal or (ii) a viewing state in which a video is being viewed at the first user terminal; and the first state can be an active state in which an application for providing the virtual space is activated at the first user terminal, and which does not correspond to either the distribution state or the viewing state.

The change portion can change the second ratio according to whether the second state is the distribution state or the viewing state.

The first state can be a first distribution state in which a video is being distributed in which a character object other than a first character object associated with the first user is not being displayed at the first user terminal; and the second state can be a second distribution state in which a video is being distributed at the first user terminal in which, in addition to the first character object, another character object associated with another user is displayed.

The first state can be a third distribution state in which a game play video provided by the information processing system is being distributed at the first user terminal; and the second state can be a fourth distribution state in which a video in which a first character object associated with the first user is displayed is distributed at the first user terminal.

The first state can be a fourth distribution state in which a video in which a first character object associated with the first user is displayed is distributed at the first user terminal; and the second state can be a fifth distribution state in which a game play video in which the first character object associated with the first user can move in the virtual space is being distributed at the first user terminal.

The reward can be an item that can be attached to a first character object associated with the first user.

The reward can be a free or paid coin associated with the first user.

The determination portion can further determine whether a number of actions from another user terminal or a worth related to a value exceeds a predetermined value in a video that is being distributed at the first user terminal;

the first state can be a state in which it is determined by the determination portion that the number of actions or the worth related to the value is equal to or less than a predetermined value; and the second state can be a state in which it is determined by the determination portion that the number of actions or the worth related to the value exceeds the predetermined value.

The determination portion can further determine whether a number of actions from the first user terminal or a worth related to a value exceeds a predetermined value in a video that is being viewed at the first user terminal;

the first state can be a state in which it is determined by the determination portion that the number of actions or the worth related to the value is equal to or less than a predetermined value; and the second state can be a state in which it is determined by the determination portion that the number of actions or the worth related to the value exceeds the predetermined value.

The determination portion can further determine whether a predetermined item is associated with the first user, and can change the second ratio when it is determined by the determination portion that the predetermined item is associated with the first user.

The one or more computer processors can further comprise a display portion that displays the value of the first parameter in a graph in a first video in which a first character object associated with the first user is displayed.

The one or more computer processors can further comprise a first calculator that increases or decreases the value of the first parameter based on an action from the first user terminal and/or another user terminal different from the first user terminal in a first video in which a first character object associated with the first user and a third character object associated with a third user are displayed; and the change portion changes a ratio of increase of the value of the first parameter to a third ratio according to the number of the first character object and the number of the third character object.

The third ratio can be changed according to a relationship between the first user and the third user.

An information processing method of this disclosure that causes one or more computer processors included in an information processing system that provides a virtual space in which a character object of a user can be displayed to execute:

a reception step that receives information sent from a first user terminal of a first user; a determination step that determines a state of the first user terminal based on the information received in the reception step;

an increase step that increases a value of a first parameter associated with the user by a first ratio while the first state continues when it is determined in the determination step that the state of the first user terminal is a first state;

a change step that changes a ratio of increase of the value of the first parameter to a second ratio while the second state continues when it is determined in the determination step that the state of the first user terminal has changed from the first state to a second state; and a reward-association step that associates a predetermined reward with the first user according to the value of the first parameter.

An information processing method of this disclosure that causes one or more computer processors included in an information processing device included in an information processing system that provides a virtual space in which a character object of a user can be displayed to execute:

a determination step that determines a state of the information processing device; an increase step that increases a value of a first parameter associated with the user by a first ratio while the first state continues when it is determined in the determination step that the state of the information processing device is a first state;

a change step that changes a ratio of increase of the value of the first parameter to a second ratio while the second state continues when it is determined in the determination step that the state of the information processing device has changed from the first state to a second state; and a reward-association step that associates a predetermined reward with the first user according to the value of the first parameter.

A computer program of this disclosure that causes one or more computer processors included in an information processing device included in an information processing system that provides a virtual space in which a character object of a user can be displayed to realize:

a determination function that determines a state of the information processing device; an increase function that increases a value of a first parameter associated with the user by a first ratio while the first state continues when it is determined by the determination function that the state of the information processing device is a first state;

a change function that changes a ratio of increase of the value of the first parameter to a second ratio while the second state continues when it is determined by the determination function that the state of the information processing device has changed from the first state to a second state; and a reward-association function that associates a predetermined reward with a first user according to the value of the first parameter.

Effects

According to this disclosure, a technical improvement that solves or alleviates at least part of the problem of the conventional technology described above can be provided. Specifically, according to this disclosure, it is possible to improve willingness of a distributing user to distribute, willingness of a viewing user to view, and/or willingness of users to interact with each other.

DETAILED DESCRIPTION OF EMBODIMENTS

Figure 1:
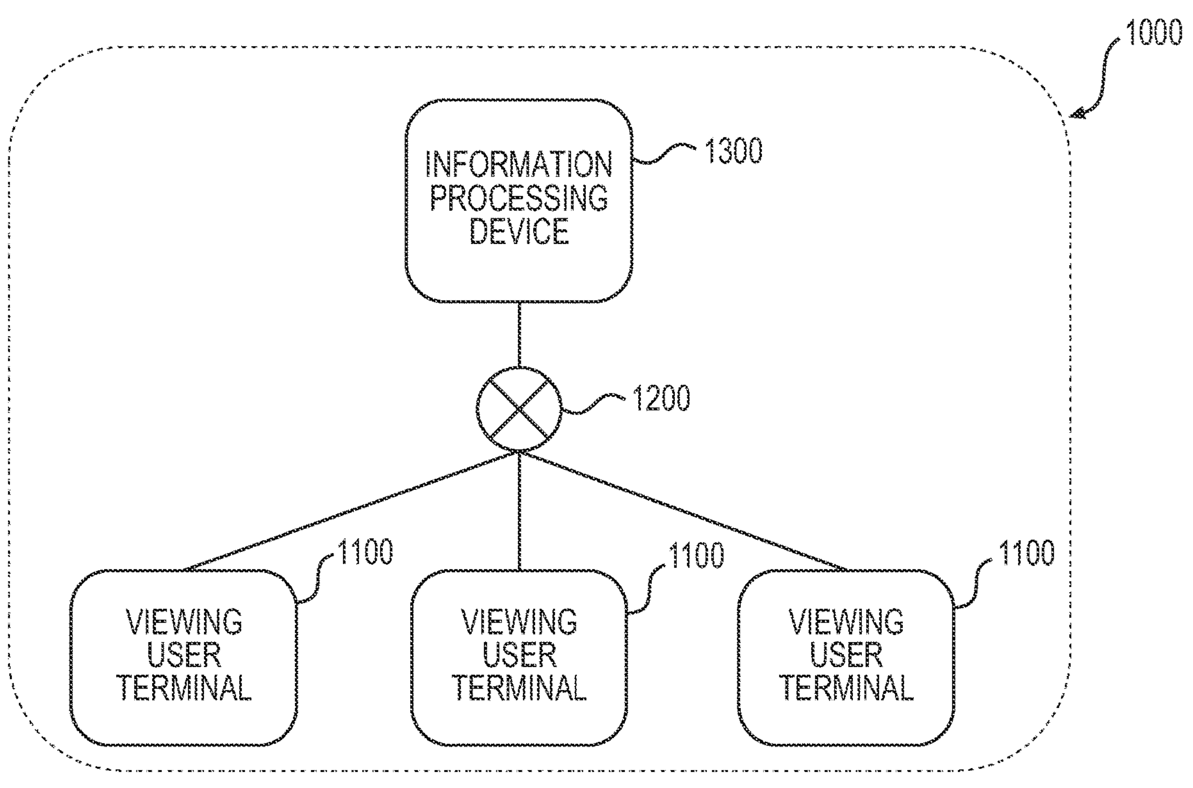
FIG. 1 is a system configuration diagram showing an example of an information processing system in this disclosure.

First, an overview of an information processing system according to an embodiment of this disclosure will be described with reference to the drawings.

The information processing system in this disclosure is an information processing system including one or more client devices and a server device, and includes one or more computer processors.

A video displayed on each client device is described as including an animation of a 3D or 2D character object generated based on movement of a distributing user, but the description is not limited to this, and the video may include an animation of a character object generated in response to an operation by the distributing user, or may include an image of the distributing user himself/herself. Further, the video may also include only the voice of the distributing user, without displaying a character object or the distributing user.

Here, a distributing user means a user who sends information related to video and/or sound. For example, a distributing user can be a user who organizes or hosts a single video distribution, a collaborative distribution in which multiple people can participate, a video or voice chat that multiple people can participate in and/or view, or an event (for example, a party) in a virtual space that multiple people can participate in and/or view, that is, a user who mainly performs these functions. Therefore, the distributing user in this disclosure can also be called a host user, a sponsor user, a hosting user, or the like.

Meanwhile, a viewing user means a user who receives information related to video and/or sound. However, the viewing user can be a user who not only receives the above information, but can also react to it. For example, a viewing user can be a user who views a video distribution, a collaborative distribution, or a user who participates in and/or views a video or voice chat, or an event. Therefore, the viewing user in this disclosure can also be referred to as a guest user, a participating user, a listener, a spectator user, a cheering user, or the like.

The information processing system in an embodiment of this disclosure can be used to provide the next Internet space (metaverse), which is a digital world in which many people can participate simultaneously and freely engage in activities such as interaction, work, and play via character objects (avatars) at a level close to that of the real world. Social activities can be carried out transcending the gap between reality and virtuality.

In such a space, user avatars can freely walk around the world and communicate with each other.

Additionally, one avatar (character object) among the plurality of avatars in the virtual space may be configured to be able to distribute a video as a character object of a distributing user. That is, one-to-many video distribution can be performed in a many-to-many metaverse virtual space.

In such a space, there may be no particular distinction between a distributing user and a viewing user.

The space displayed in the video may be a virtual space, a real space, or an augmented reality space that is a combination thereof. The video may be a karaoke video or a live game video that plays at least a predetermined image and the voice of the distributing user, or it may be a superimposed display of a character object, or a real image of the distributing user, on these images.

Further, when the distributing user is included in a real space, a character object generated based on movement of the distributing user may be superimposed and displayed on the actual image of the distributing user. Further, an animation such as a gift object may be superimposed and displayed on a captured image of the real space.

System Configuration

As shown as an example in FIG. 1, an information processing system 1000 according to this disclosure includes (i) one or more viewing user terminals 1100, and (ii) an information processing device (support computer) 1300 arranged in a video distribution studio or the like, which is connected to these viewing user terminals 1100 via a network 1200.

Further, the information processing device 1300 may be connected to a predetermined server device via the Internet, and part or all of the processing to be performed by the information processing device 1300 may be performed by the server device. The server device may be an information processing device 2400 shown in FIG. 2.

In this specification, distribution by the information processing system 1000 is referred to as studio distribution.

In studio distribution, movement of an entire body of a distributing user (actor) will be reflected in a character in real time by shooting markers attached to the distributing user with a camera(s) installed in the studio and using known motion capture technology.

Figure 2:
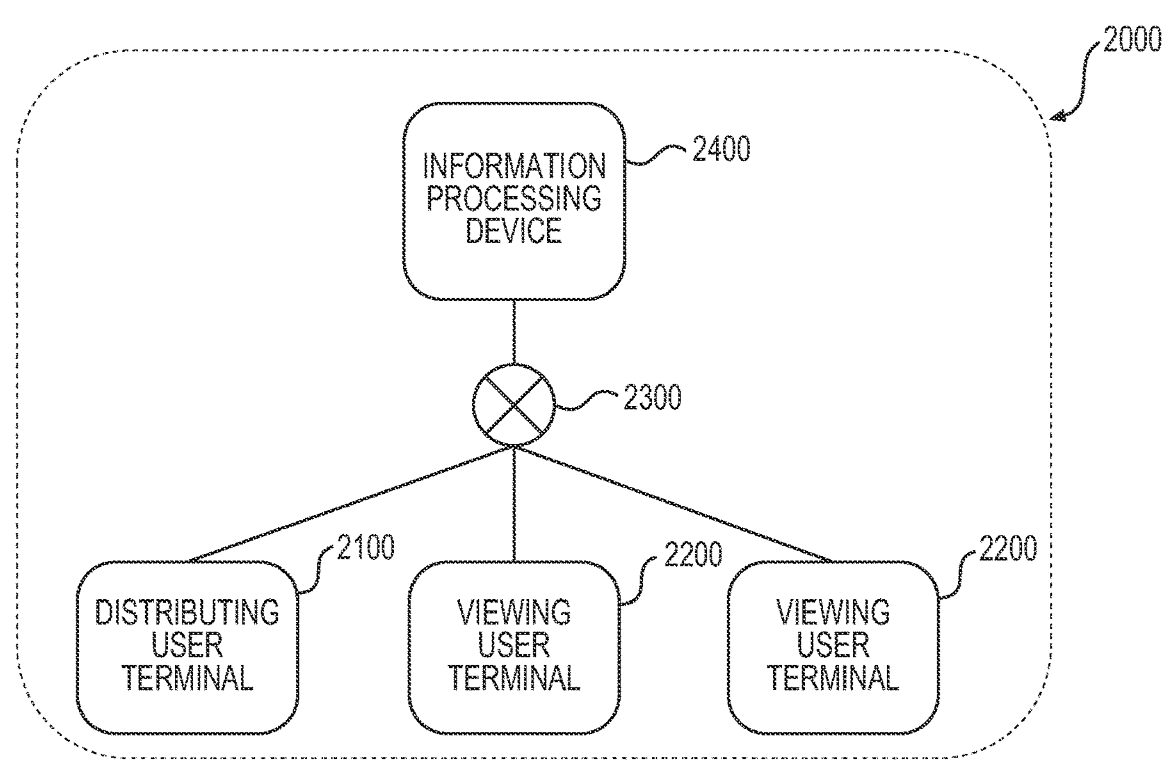
FIG. 2 is a system configuration diagram showing an example of an information processing system in this disclosure.

Additionally, the information processing system 1000 can also work in cooperation with another information processing system 2000, shown in FIG. 2 as an example. The information processing system 2000 shown in FIG. 2 can include (i) a distributing user terminal 2100, (ii) one or more viewing user terminals 2200, and (iii) and an information processing device (server device) 2400 that is connected to the distributing user terminal 2100 and the viewing user terminals 2200 via a network 2300.

In the above example, the distributing user terminal 2100 can be an information processing terminal such as a smartphone. In this specification, distribution by such information processing system 2000 is referred to as mobile distribution.

In mobile distribution, the movement of the distributing user's face is captured by a camera provided in the distributing user terminal 2100 and reflected on the character's face in real time using known face tracking technology.

There is no particular distinction between a distributing user and a viewing user in mobile distribution. A viewing user can perform mobile distribution at any time, and a distributing user can be a viewing user when viewing a video of another distributing user.

The video generated by the information processing system 1000 and the information processing system 2000 can be distributed to a viewing user from one video distribution platform, as an example.

Furthermore, in any distribution, the process of generating animation by reflecting motion on a character, the process of displaying a gift described below, and the like may be shared by a distributing user terminal, a viewing user terminal, an information processing device and other devices.

That is, "distribution" here refers to sending information to make the video available for viewing at the viewing user terminal. Video rendering is performed at the information processing devices 1300, 2400 side or at the distributing user terminal 2100 and viewing user terminal 1100 and 2200 side.

Specifically, face motion data and sound data of the distributing user is sent from the distributing user terminal or information processing device to a terminal or device that generates (renders) an animation of a character object. Further, body motion may be sent in addition to the face motion.

In this disclosure, the process of generating an animation will be described as being performed by each of the distributing user terminal and the viewing user terminal, but this disclosure is not limited to this.

Figure 3:
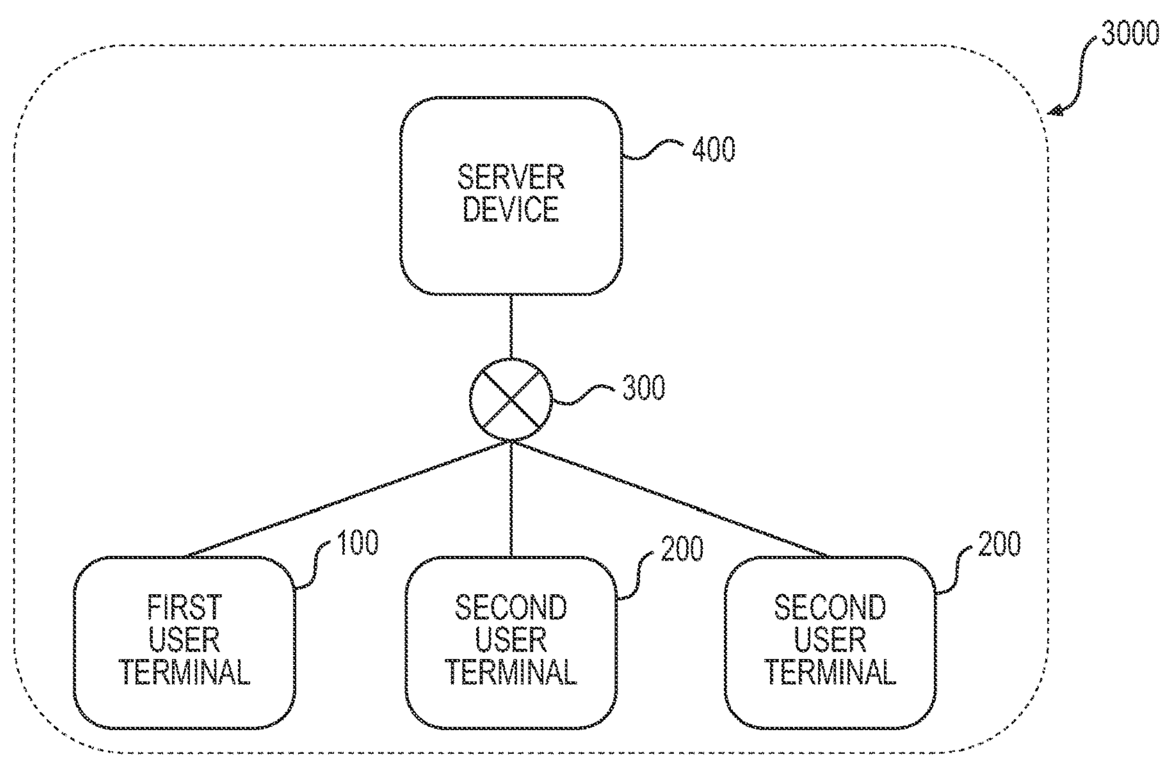
FIG. 3 is a system configuration diagram showing an example of an information processing system in this disclosure.

The information processing system in this disclosure can be applied to any of the examples shown in FIGS. 1 and 2. Further, an information processing system 3000 in an embodiment of this disclosure is described as being provided with a first user terminal 100, second user terminals 200, and a server device 400 that can be connected to these distributing first terminal 100 and second user terminals 200 via a network 300, as shown in FIG. 3.

The first user terminal 100 and the second user terminals 200 are interconnected with the server device 400 via, for example, a base station, a mobile communication network, a gateway, and the Internet. Communication is performed between the first user terminal 100 and the second user terminals 200 and the server device 400 based on a communication protocol such as the Hypertext Transfer Protocol (HTTP). Additionally, between the first user terminal 100 and the second user terminals 200 and the server device 400, communication may be performed based on WebSocket, which initially establishes a connection via HTTP communication and then performs bidirectional communication at a lower cost (less communication load and processing load) than HTTP communication. The communication method between the first user terminal 100 and the second user terminals 200 and the server device 400 is not limited to the method described above, and any communication method technology may be used as long as it can realize this embodiment.

The first user terminal 100 functions as at least the information processing device 1300, the viewing user terminal 1100, the distributing user terminal 2100, or the viewing user terminal 2200 described above. The second user terminals 200 function as at least the information processing device 1300, the viewing user terminal 1100, the distributing user terminal 2100, or the viewing user terminal 2200 described above. The server device 400 functions as at least the server device or information processing device 2400 described above.

In this disclosure, the first user terminal 100 and the second user terminals 200 may each be a smartphone (multi-functional phone terminal), a tablet terminal, a personal computer, a console game machine, a head-mounted display (HMD), a wearable computer such as a spectacle-type wearable terminal (AR glasses or the like), or an information processing device other than these devices that can reproduce a video. Further, these terminals may be stand-alone devices that operate independently, or may be constituted by a plurality of devices that are connected to each other so as to be able to send and receive various data.

Hardware Configuration

Here, a hardware configuration of the first user terminal 100 will be described using FIG. 4. The first user terminal 100 includes a processor 101, a memory 102, a storage 103, an input/output interface (input/output I/F) 104, and a communication interface (communication I/F) 105. Each component is connected to each other via a bus B.

The first user terminal 100 can realize the functions and methods described in this embodiment by the processor 101, the memory 102, the storage 103, the input/output I/F 104, and the communication I/F 105 working together.

The processor 101 executes a function and/or a method realized by a code or a command included in a program stored in the storage 103. The processor 101 may realize each process disclosed in each embodiment by a logic circuit (hardware) or a dedicated circuit formed in an integrated circuit (IC (Integrated Circuit) chip, an LSI (Large Scale Integration)) or the like, including, for example, a CPU (Central Processing Unit), an MPU (Micro Processing Unit), a GPU (Graphics Processing Unit), a microprocessor, a processor core, a multiprocessor, an ASIC (Application-Specific Integrated Circuit), an FPGA (Field Programmable Gate Array), or the like. These circuits may be realized by one or more integrated circuits. A plurality of processes shown in each embodiment may be realized by a single integrated circuit. Furthermore, LSI may also be referred to as VLSI, Super LSI, Ultra LSI, or the like, depending on difference in the degree of integration.

The memory 102 temporarily stores a program loaded from the storage 103 and provides a work area to the processor 101. Various data generated while the processor 101 is executing the program are also temporarily stored in the memory 102. The memory 102 includes, for example, a RAM (Random Access Memory), a ROM (Read Only Memory), and the like.

The storage 103 stores the program. The storage 103 includes, for example, an HDD (Hard Disk Drive), an SSD (Solid State Drive), a flash memory, or the like.

The communication I/F 105 is implemented as hardware such as a network adapter, software for communication, or a combination thereof, and is used to send and receive various types of data via the network 300. This communication may be executed by either by wire or wirelessly, and any communication protocol may be used as long as mutual communication can be executed. The communication I/F 105 executes communication with another information processing device via the network 300. The communication I/F 105 sends various data to other information processing devices according to instructions from the processor 101. The communication I/F 105 also receives various data sent from other information processing devices and transmits them to the processor 101.

The input/output I/F 104 includes an input device for inputting various operations to the first user terminal 100 and an output device for outputting processing results processed by the first user terminal 100. The input/output I/F 104 may be such that the input device and the output device are integrated, or may be separated into the input device and the output device.

The input device is realized by any one of all types of devices that can receive an input from a user and transmit information related to the input to the processor 101, or a combination thereof. The input device includes, for example, (i) a hardware key, such as a touch panel, a touch display, or a keyboard, (ii) a pointing device, such as a mouse, (iii) a camera (operation input via an image), and (iv) a microphone (operation input by sound).

The input device may include a sensor portion (sensor unit). The sensor portion is one or more sensors that detect (i) face motion, which indicates changes in the user's facial expression, and (ii) body motion, which indicates changes in the relative position of the user's body with respect to the sensor portion. Face motion includes movements such as blinking of the eyes, opening and closing of the mouth, and the like. A known device may be used as the sensor portion. An example of a sensor portion includes (i) a ToF sensor that measures and detects the time of flight (Time of Flight) until light irradiated toward the user is reflected by the user's face and returns, or the like, (ii) a camera that captures the user's face, and (iii) an image processor that image-processes the data captured by the camera. The sensor portion may also include an RGB camera for capturing visible light and a near-infrared camera for capturing near-infrared light. The RGB camera and near-infrared camera may use, for example, "True Depth" of the "iPhone X (registered trademark)," "LiDAR" of the "iPad Pro (registered trademark)," or other ToF sensors in smartphones. This camera specifically projects tens of thousands of invisible dots onto the user's face and the like. Then, accurate face data is captured by detecting and analyzing the reflected light of the dot pattern to form a depth map of the face and capturing infrared images of the face and the like. An arithmetic processor of the sensor portion generates various types of information based on the depth map and infrared images, and compares this information with registered reference data to calculate the depth (distance between each point and the near-infrared camera) and non-depth positional deviations for each point on the face.

Further, the sensor portion may have a function of tracking not only the user's face, but also the hand(s) (hand tracking). The sensor portion may further include a sensor other than the above-mentioned sensors such as an acceleration sensor and a gyro sensor. The sensor portion may have a spatial mapping function of (i) recognizing an object in the real space in which the user exists based on the detection results of the above ToF sensor or other known sensor, and (ii) mapping the recognized object to a spatial map. Hereinafter, when the face motion detection data and the body motion detection data are described with no particular distinction, they are simply referred to as "tracking data." The image processor of the sensor portion may be provided with a controller that can be provided in the information processing system of this disclosure.

As an operation portion as an input device, a device corresponding to the type of the user terminal can be used. An example of the operation portion is a touch panel integrated with a display, an operation button provided on a housing of a user terminal, a keyboard, a mouse, a controller operated by a user, and the like. The controller may incorporate various known sensors such as an inertial measurement sensor (IMU: Inertial Measurement Unit) such as an acceleration sensor and a gyro. Furthermore, another example of the operation portion may be a tracking device that specifies the movement of the user's hand, the movement of the eyes, the movement of the head, the direction of the line of sight, and the like. In this embodiment, for example, based on the user's hand movements, the user's instructions are determined and various operations are performed such as starting or ending the video distribution, rating messages and videos, and requesting the display of predetermined objects (for example, the gift described below), and the like. If the sensor portion also has an input interface function such as a hand tracking function, the operation portion can be omitted.

The output device outputs the processing result processed by the processor 101. The output device includes, for example, a touch panel, a speaker, and the like.

The functions realized by the components described in this specification may be implemented in circuitry or processing circuitry programmed to realize the functions described, including general-purpose processors, special-purpose processors, integrated circuits, ASICs (Application Specific Integrated Circuits), a CPU (a Central Processing Unit), conventional circuits, and/or combinations thereof. Processors include transistors and other circuits, and are referred to as circuitry or processing circuitry. The processors may be programmed processors that execute programs stored in memory.

In this specification, circuitry, units, and means are hardware that is programmed, or hardware that performs, so as to realize the functions described. Such hardware may be any hardware disclosed in this specification or any hardware known to be programmed or to perform so as to realize the functions described herein.

When the hardware is a processor considered to be of the circuitry type, the circuitry, means or units are a combination of (i) hardware and (ii) software used to constitute a processor and/or the hardware.

Figure 4:
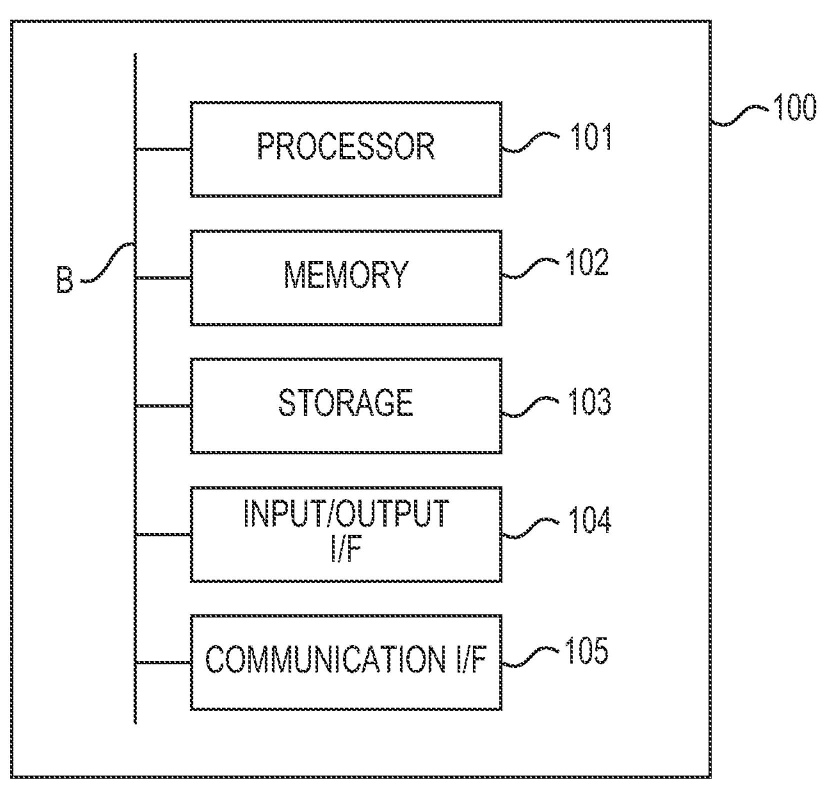
FIG. 4 is a configuration diagram showing an example of a hardware configuration of a server device, a first user terminal, and a second user terminal in this disclosure.

Also, except for special cases, a second user terminal 200 and server device 400 in this disclosure can be configured with the same hardware configuration as in FIG. 4.

Next, various functions that can be executed in a user terminal that has activated an application realized by an information processing system according to an embodiment of this disclosure, and transitions of screens that are displayed, will be described with reference to the drawings.

Figure 5:
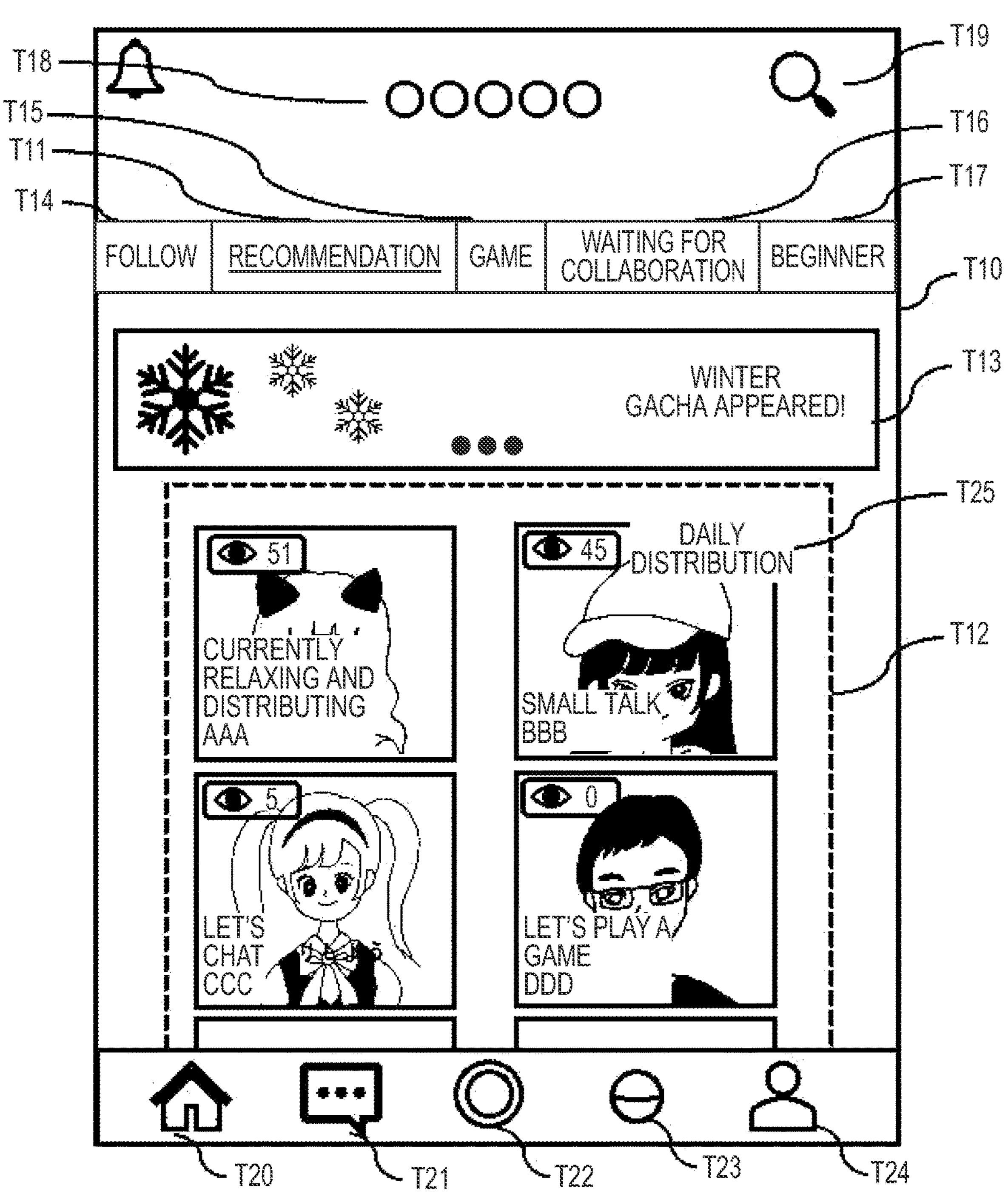
FIG. 5 is a conceptual diagram showing an image of a screen displayed on a user terminal.

FIG. 5 shows a top screen T10 displayed on a user terminal (here, it is not yet specified whether or not the user will view or distribute) when a video distribution/viewing application is activated.

As shown in FIG. 5, by selecting one distribution channel (called a distribution frame, distribution program, distribution video or the like) from among thumbnail images of one or more recommended distribution channels T12 displayed in a recommendation tab T11 on the top screen T10, the user can view a video played on that distribution channel.

Alternatively, by accessing a fixed link for a specific distribution channel, the user can view a video played on that specific distribution channel. Such fixed links may come from a notification from a first user who is followed, or from a share notification sent by another user.

Here, the user who views the video is the viewing user, and the terminal for viewing the video is the second user terminal 200.

Further, as shown in FIG. 5, a display field T13 for notification of a campaign, an event, or the like may be displayed on the top screen T10. The display field T13 of this notification can be switched to another notification by a slide operation.

Additionally, from the top screen T10, a follow tab T14, a game tab T15 for displaying a game category, an awaiting collaboration tab T16 for displaying a distribution channel that is awaiting collaboration, and a beginner tab T17 for displaying a beginner's distribution channel are displayed. By selecting these (by switching the tabs), the top screen T10 transitions to respective different screens.

A service name display T18 and a search button T19 in an upper frame of the top screen T10 may be fixedly displayed on a transition destination screen.

Similarly, a home button T20, a message button T21, a distribution preparation button T22, a gacha button T23, and a profile button T24 in a lower frame of the top screen T10 may be fixedly displayed on the transition destination screen.

A user who selects displayed thumbnail images T12 on the top screen T10 or the like shown in FIG. 5 becomes a viewing user (second user) who views the video as described above, and a user who selects the distribution preparation button T22 can become a distributing user (first user) who distributes a video.

Figure 6:
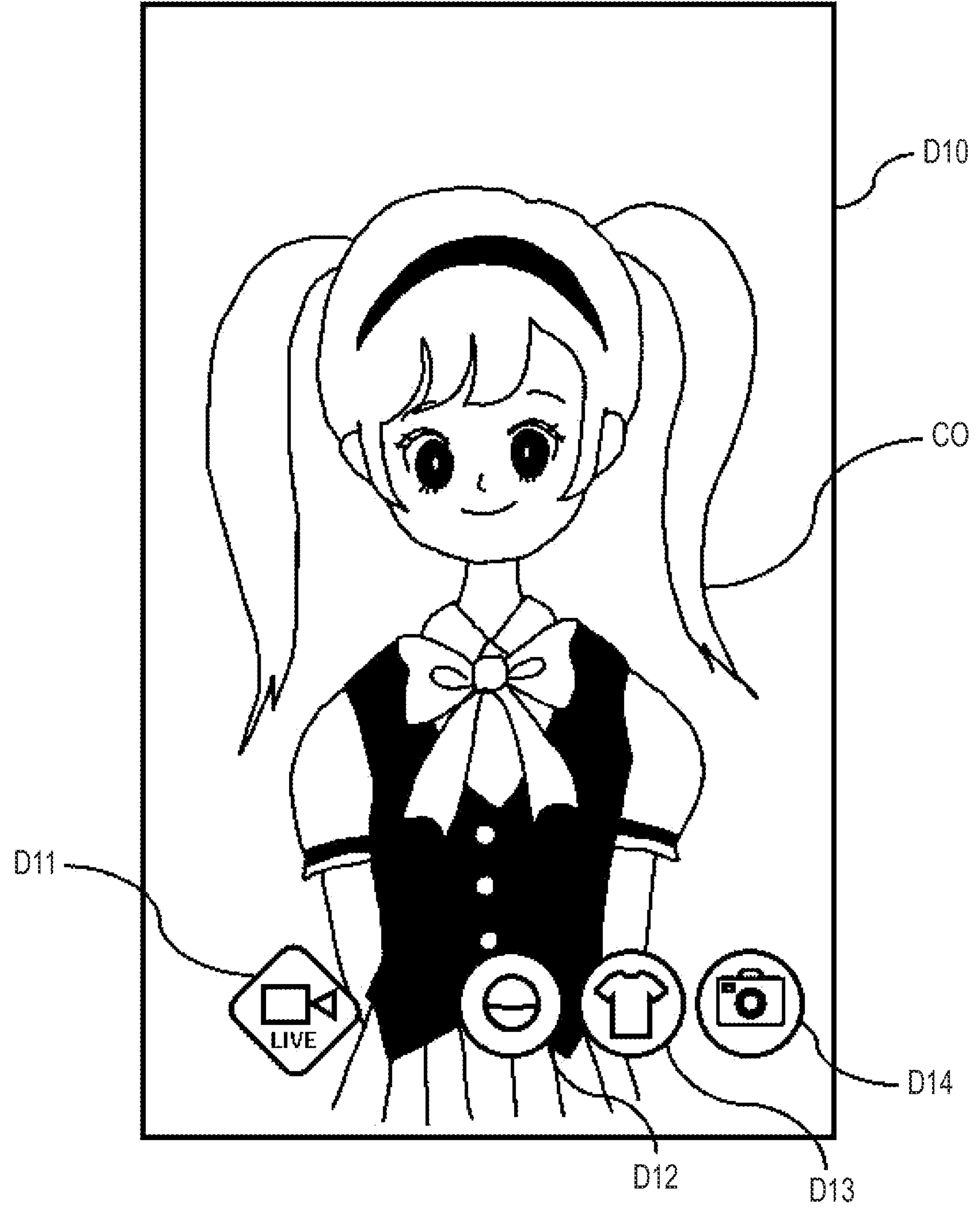
FIG. 6 is a conceptual diagram showing an image of a screen displayed on a user terminal.

As an example, when the distribution preparation button T22 is selected on the top screen T10 shown in FIG. 5, the screen transitions to an avatar setting screen D10 shown in FIG. 6. Then, when a distribution button D11 is selected on the avatar setting screen D10, the screen transitions to a distribution setting screen D20 shown in FIG. 7. Then, when a distribution start button D25 is selected on the distribution setting screen D20, the screen transitions to an avatar distribution screen D30 shown in FIG. 8.

Next, details of a flow up to the start of video distribution will be described.

The one or more computer processors in this disclosure may include a distribution start request receiver, a distribution setting portion, and a distribution start portion.

The distribution start request receiver receives a distribution start request for a first video including an animation of a character object from the first user terminal of the first user.

Here, the first video refers to a video including an animation of a character object. In this specification, the character object may be referred to as an "avatar."

The above-described distribution start request can be sent from the user terminal to the information processing device 400 by selecting the distribution button D11 located on the avatar setting screen or the like that has transitioned from the top screen displayed on the user terminal (later to become the first user terminal) that has activated a dedicated application (video distribution/viewing application) for accessing the above-described video distribution platform.

FIG. 6 shows an example of the avatar setting screen D10. A character object CO, the distribution button D11, a gacha button D12, a clothes-changing button D13, a photo button D14, and the like can be displayed on the avatar setting screen D10.

When the clothes-changing button D13 is selected by the user, a closet screen for selecting various avatar parts such as eyes, nose, mouth, hair, accessories, clothes, and background of the character object CO appears.

When the gacha button D12 is selected by the user, a lottery screen for obtaining the above-described avatar parts appears.

When the photo button D14 is selected by the user, a capturing screen for capturing a still image of the character object appears.

When the distribution button D11 is selected by the user, a distribution start request is sent to the information processing device 400.

The distribution setting portion sets the distribution setting of the first video based on the designation from the first user terminal 100 in response to the distribution start request of the first video received by the distribution start request receiver.

Figure 7:
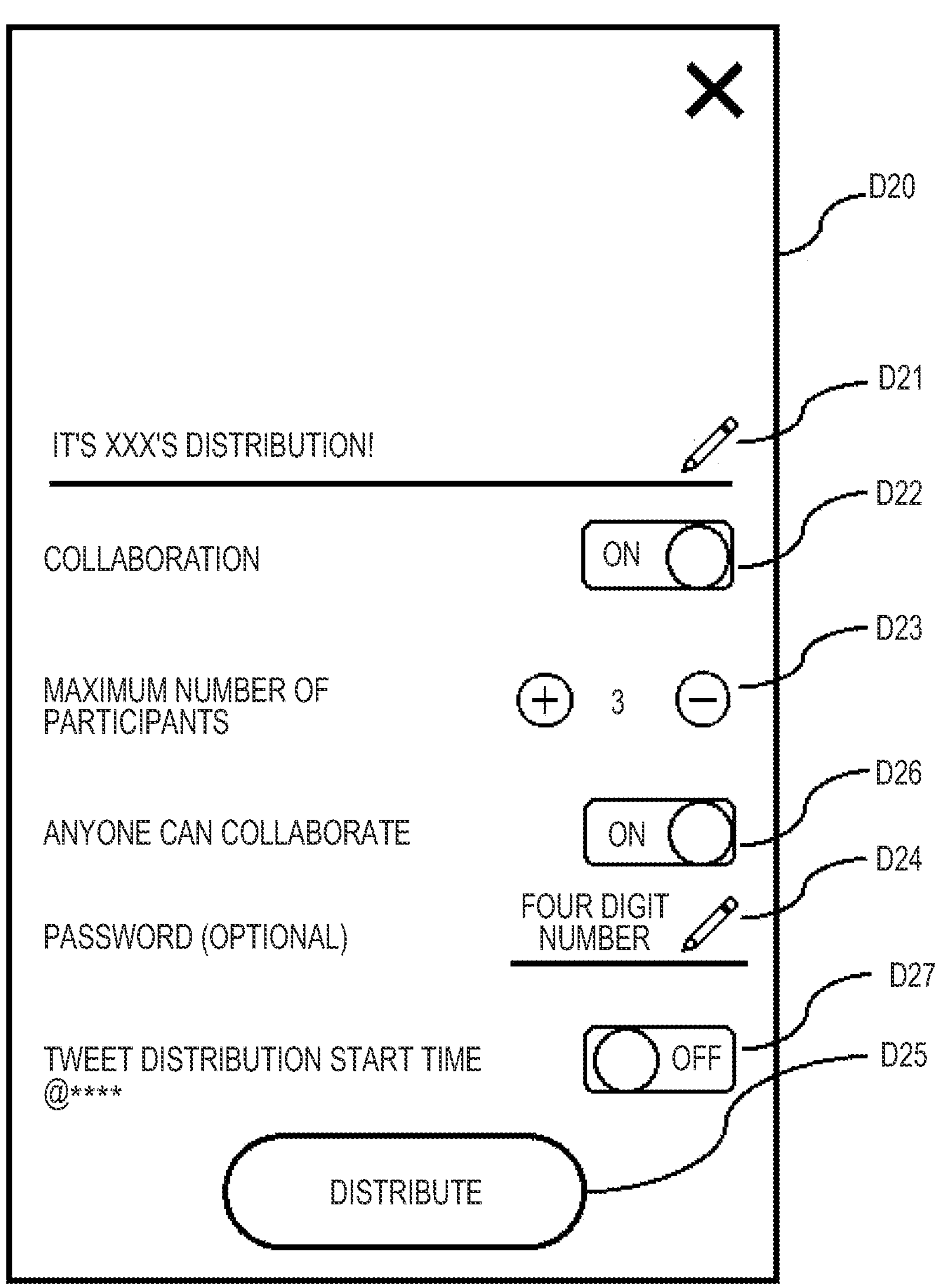
FIG. 7 is a conceptual diagram showing an image of a screen displayed on a user terminal.

As an example, when the distribution button D11 is selected, the screen displayed on the first user terminal 100 transitions from the avatar setting screen D10 shown in FIG. 6 to the distribution setting screen D20 shown in FIG. 7.

The distribution setting can include at least one of a setting related to the title of the first video, a setting regarding whether other users can appear in the first video, a setting related to the number of people who can appear in the first video, or a setting related to a password.

These distribution settings can be set in a title setting field D21, a collaboration possibility setting field D22, a number-of-people setting field D23, and a password setting field D24 in FIG. 7, respectively. Additionally, in FIG. 7, an anyone-can-collaborate possibility setting field D26 and an SNS posting possibility field D27 are further displayed.

The title of the first video can be freely determined by the distributing user within a range of a number of characters up to an allowable upper limit. If there is no input by the distributing user, a preset title, including the name of the character object (distributing user) such as "This is so and so's distribution ♪," may be determined automatically.

Whether other users can make a request for appearance in the first video can be freely determined by the first user. If yes, other users can make a request for appearance to the distributing user. If no, other users cannot make a request for appearance to the distributing user. A state in which another user appears in the video of the first user may be referred to as "collaboration" in this specification. Details of the collaboration will be described later.

The number of people who can appear in the first video can be set only when other users can appear in the first video mentioned above, and the distributing user can freely determine this number within a range of the number of people up to an allowable upper limit.

A password can be arbitrarily set only when other users can appear in the first video mentioned above, and the distributing user can freely determine the designated number of digits. When another user makes a request for appearance in the first video, entering of such a password is required. A configuration is acceptable in which the password setting field D24 may become active only when the anyone-can-collaborate possibility setting field D26 is OFF.

The distribution start portion distributes information about the first video to the viewing user terminal(s) 200 of the viewing user(s) based on the conditions set by the distribution setting portion.

The instruction to start such distribution is sent by selecting the distribution start button D25 shown in FIG. 7.

As an example, the distribution start portion distributes information about the video (first video) including the animation of the character object of the first user to the second user terminal 200 of the second user (avatar distribution).

Information about the first video includes, for example, motion information indicating movement of the character object, sound information of the first user, and gift object information indicating a gift sent from another viewing user. The gift object information includes at least gift object identification information that specifies the type of the gift object and position information that indicates the position where the gift object is to be displayed.

Then, the distribution start portion can live-distribute the video via the video distribution platform described above.

Figure 8:
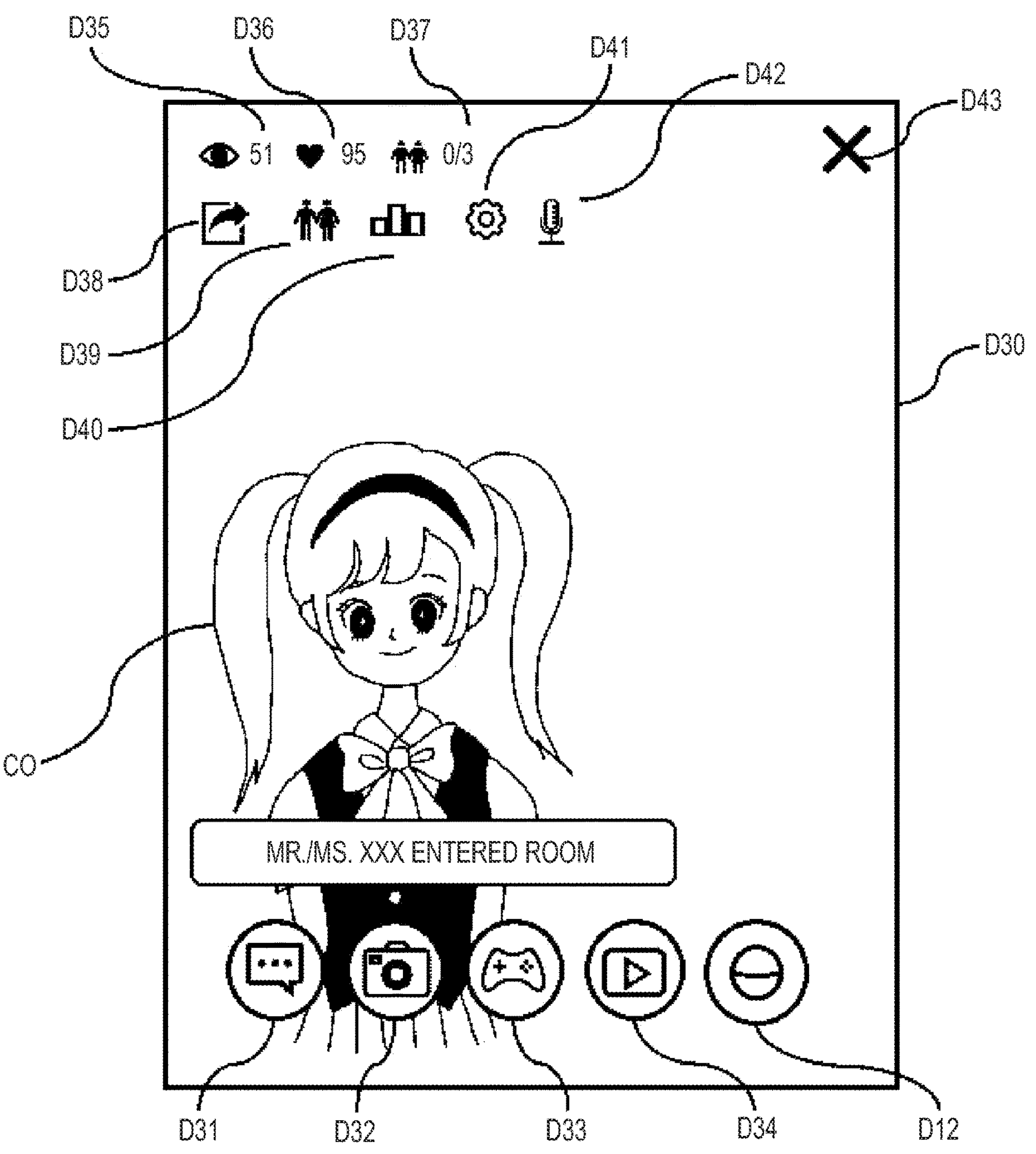
FIG. 8 is a conceptual diagram showing an image of a screen displayed on a user terminal.

FIG. 8 shows the avatar distribution screen D30 displayed on the first user terminal 100.

In addition to displaying the character object CO on the avatar distribution screen D30, a comment input button D31 for the distributing user to input a comment, a photo button D32 for saving a still image of the screen, a play start button D33 for playing a game described later, an external service liaison button D34 for viewing a video provided by an external service, and the gacha button D12 for obtaining an avatar part can be displayed.

Additionally, a cumulative number-of-viewers display D35, a cumulative number-of-likes display D36, a number-of-collaborators display D37, a share button D38 for an external SNS, a guest details button D39, a ranking display button D40, a setting button D41, and a sound switching button D42 for switching sound ON/OF can be displayed. Further, an end button D43 for ending the distribution is also displayed.

Although detailed description of these displays and buttons is omitted, it is possible to change the distribution settings set on the distribution setting screen D20 by selecting the setting button D41.

FIG. 8 shows an example of starting distribution in which the distribution setting screen D20 allows other users to appear in the first video, and the number of people who can appear in the first video is three. Therefore, the character object CO is displayed in a state of being closer to the lower left. This is a state in which up to three character objects of other users are able to appear in a vacant space.

The above is a description of the screen transition when the avatar distribution of this disclosure is performed.

Subsequently, a screen transition when the distributing user plays a game during distribution will be described.

The one or more computer processors in this disclosure may include a game request receiver, a game video distribution portion, and a game display processor.

The distributing user can request to start playing a game by selecting the play start button D33 during avatar distribution such as is shown in FIG. 8.

The game displayed by selecting the play start button D33 can be a dedicated game implemented in the application realized by the information processing system in this disclosure, and can be different from a general-purpose game provided by an external service. Therefore, the game distribution in this disclosure may be distinguished from the distribution of a general-purpose game play video provided by an external service together with a live broadcast of the distributing user.

Alternatively, the play start request may be sent from the first user terminal 100 to the information processing device 400 by selecting the play start button arranged on a predetermined screen displayed on the first user terminal 100 of the first user.

Figure 9:
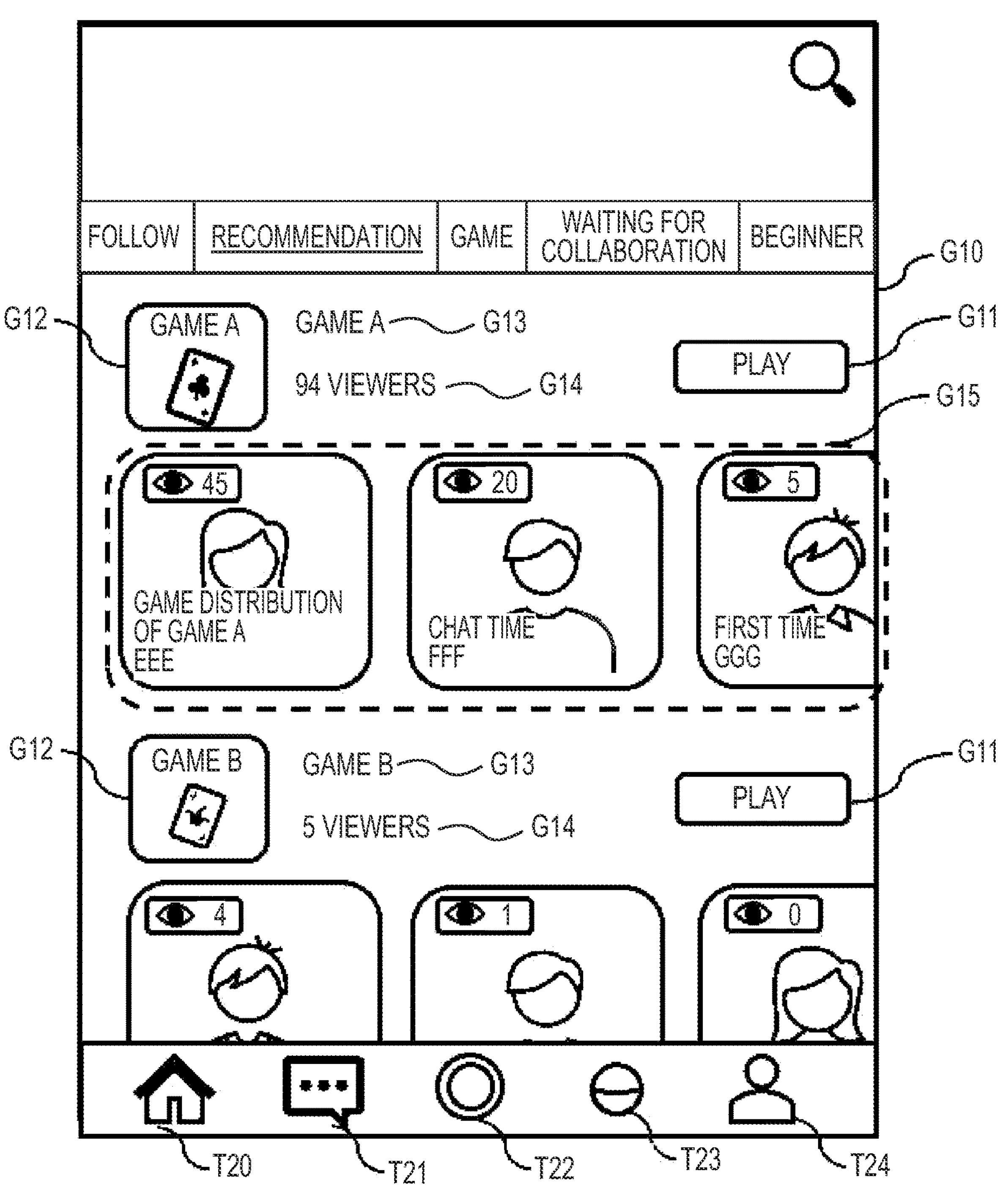
FIG. 9 is a conceptual diagram showing an image of a screen displayed on a user terminal.

FIG. 9 shows an example of a screen G10, in which a play start button G11 is arranged, as the predetermined screen. The screen G10 shown in FIG. 9 is a screen that has transitioned from the top screen T10 (FIG. 5) displayed on a user terminal that has activated the application realized by the information processing system in this disclosure by selecting the game tab T15.

At least the play start button G11 that can send a request to start play of a predetermined game is displayed on the screen G10.

Then, when the game request receiver receives the request to start play of the predetermined game, the game video distribution portion distributes information about a second video to the second user terminal 200.

Here, the second video is a play video of a predetermined game. In this specification, distributing a video so that it is displayed on the screen of the second user terminal 200 is called "game distribution."

Further, as a first user, after activating the application realized by this disclosure, the user can send the request for the start of distribution of the second video to the information processing device 2400 by selecting a play start object arranged on the game list screen and the game detail screen.

The game list screen or the game details screen is a first screen to be described in detail below.

That is, the game display processor performs display processing of the first screen including (i) a distribution start object that can send a distribution start request, (ii) a play start object that can send a play start request for a predetermined game, and (iii) a thumbnail image of a video that is distributing a play video for a predetermined game.

The screen G10 shown in FIG. 9 corresponds to the game list screen of the first screen. The first screen, which is the game list screen, is a screen that has transitioned from the top screen T10 by selection of the game tab T15.

The first screen includes (i) the distribution preparation button T22 as a distribution start object, (ii) the play start button G11 as a play start object, and (iii) a thumbnail image showing a distribution channel of a video.

On the first screen, for each of a plurality of playable games, the play start button G11, a game icon G12, a game name G13, a total number-of-viewers G14 of the distribution channel of the game, and a distribution list G15 including thumbnail images of the distribution channels during the game distribution are displayed.

The order of the thumbnail images displayed in the distribution list G15 displayed here may be different depending on the viewing user. As an example, the thumbnail images are arranged in the order of (i) the order in which the number of viewing users following and the number of views by those viewing users are highest, (ii) the order in which the cumulative number of viewers is highest, and (iii) the order in which the distribution start is oldest. Additionally, the display range of the thumbnail images of the distribution list G15 can be changed by horizontal scrolling.

Additionally, the games displayed on this game list screen will read the top 10 titles with the following priorities. As an example, the priority is determined by (i) the order by newest date within 48 hours from the game distribution start date and time, and in which a viewing user last played within 30 days, (ii) the order of highest priority of a period ID, and (iii) the descending order of the period ID.

This distribution list G15 will be updated (i) when returning from the screen of another tab and (ii) when a refresh operation (Pull-to-Refresh) has been performed.

Figure 10:
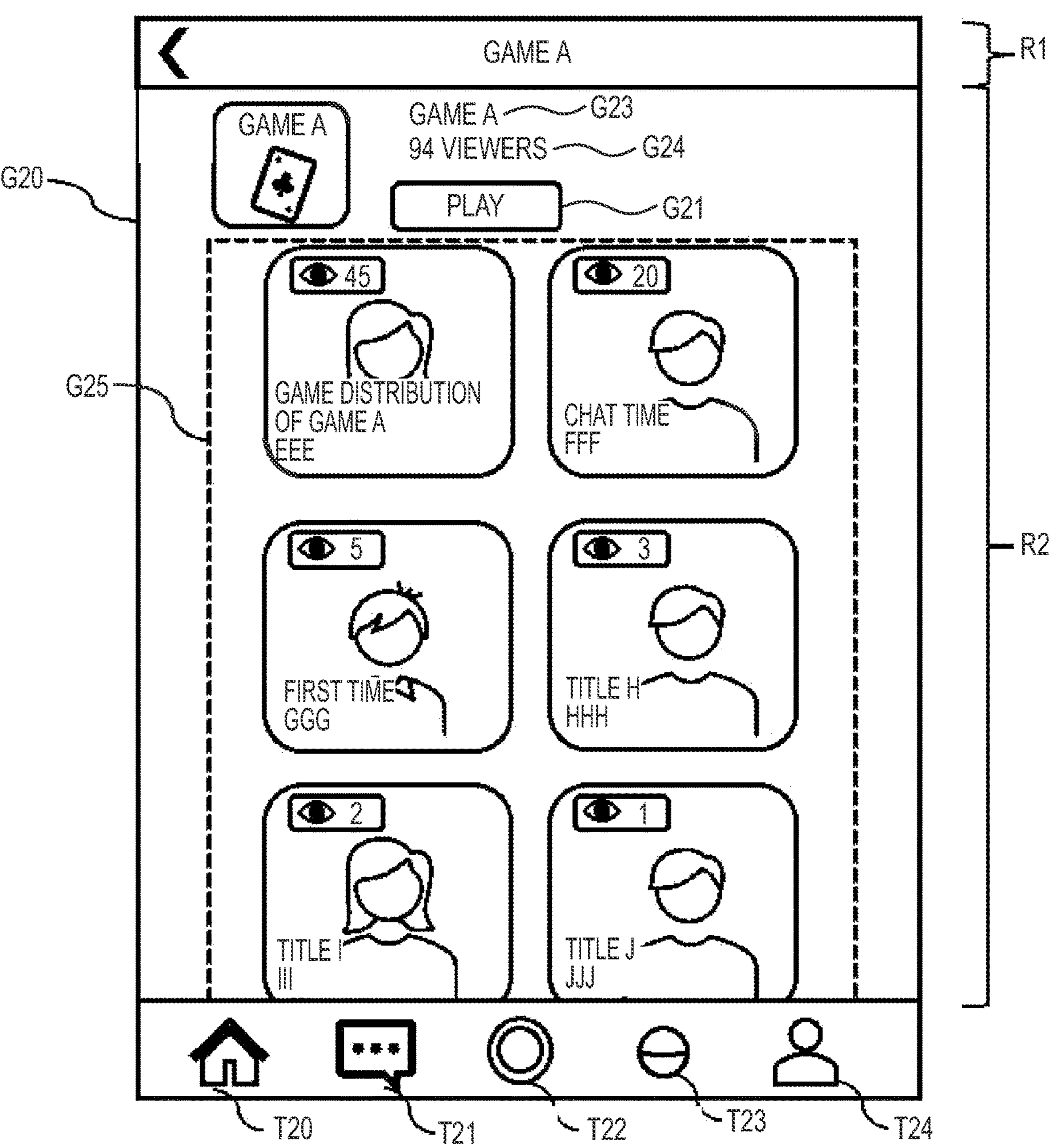
FIG. 10 is a conceptual diagram showing an image of a screen displayed on a user terminal.

FIG. 10 corresponds to a game detail screen of the first screen. The first screen, which is the game detail screen, is a screen that has been transitioned to by selecting a game icon G12 or a game name G13 displayed on the game list screen shown in FIG. 9, and is G20.

The first screen includes the distribution preparation button T22 which is a distribution start object, a play start button G21 which is a play start object, and thumbnail images showing video distribution channels.

Further, on the first screen, a game icon G22, a game name G23, a total number-of-viewers G24 of the distribution channel of the game, and a distribution list G25 including thumbnail images of the distribution channels that are distributing the game are displayed.

The order of the thumbnail images displayed in the distribution list G25 displayed here may be different depending on the viewing user. As an example, the order is arranged in the order of (i) the order in which the number of viewing users following and the number of views by the viewing users is highest, (ii) the order in which the cumulative number of viewers is highest, and (iii) the order in which the distribution start is oldest. Additionally, the display range of the thumbnail images of the distribution list G25 can be changed by vertical scrolling.

This distribution list G25 will be updated (i) when returning from the screen of another tab and (ii) when a refresh operation (Pull-to-Refresh) has been performed.

As described above, a user who selects the distribution start object or the play start object becomes a first user who makes the distribution start request or the play start request.

Further, a user who selects a thumbnail image becomes a second user who views the second video.

In addition, the first screen includes a first region in which a scrolling operation is not possible, and a second region in which a scrolling operation is possible.

The first screen referred to here is the first screen shown in FIG. 10. The first screen includes a first region R1 and a second region R2. Specifically, the game title is displayed in the first region R1, and the play start button G21, the game icon G22, the game name G23, the number of viewers G24, and the distribution list G25 described above are displayed in the second region R2.

The first region R1 is a portion in which a scrolling operation is not possible, and is fixedly displayed on the display screen, and the second region R2 is a portion in which a scrolling operation by the user is possible. By scrolling the second region R2, the user can check the thumbnail images hidden outside the screen.

However, since the play start button G21 may be hidden outside the screen by scrolling in the second region, the display processor in this disclosure can display a play start object (play start button G21) in the first region R1 according to a display state of a play start object (play start button G21) displayed in the second region R2.

Figure 11:
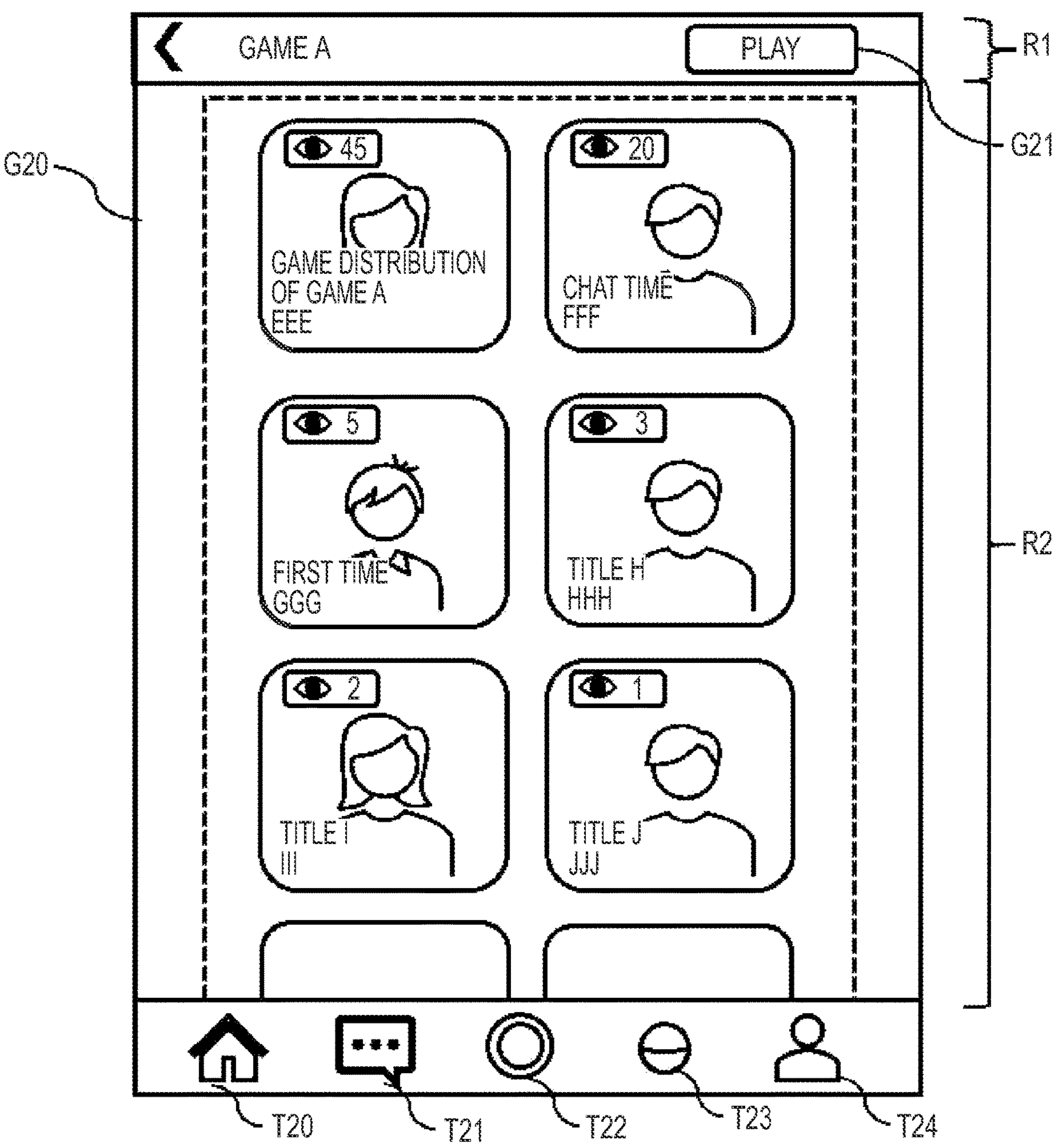
FIG. 11 is a conceptual diagram showing an image of a screen displayed on a user terminal.

As an example, in FIG. 10, the play start button G21 is displayed in the second region R2, but in FIG. 11, it is displayed in the first region R1. That is, when part or all of the play start button G21 is not displayed in the second region R2, the play start button G21 appears in the first region.

Further, the game display processor may display the play start object in the first region R1 in stages according to the display state of the play start object displayed in the second region R2.

Such an expression can be realized by changing the transparency of the play start object according to the scroll amount of the second region R2.

As an example, a scroll amount (unit is pixels) of 0 to 50 is caused to correspond to a button transparency of 0.0 (completely transparent) to 1.0 (completely opaque). Thus, in the initial display state, the object is completely transparent and cannot be seen, and when scrolling by 50 pixels or more has been performed, the object is completely displayed. During that scrolling (0 to 50), it is preferable to change the transparency of the object linearly. The unit of the scroll amount is a logical pixel, which may be different from an actual pixel of the display.

Further, the game request receiver can accept a play end request for a predetermined game from the first user terminal 100 after the game video distribution portion distributes information about the second video.

The play end request can be sent by selection of an end button arranged on the game screen.

Then, when the game request receiver receives the play end request of the predetermined game, the video distribution portion can end the distribution of the information about the second video and distribute the information about the first video.

That is, what is distributed here is not part of the information of the first video, but all the information of the first video.

Then, when the video distribution portion ends the distribution of the information about the second video and distributes the information about the first video, what is displayed on the second user terminal 200 is the first video.

The following is an explanation of a flow to start viewing the video. The one or more processors in this disclosure may further include a viewing receiver. The viewing receiver receives a video viewing request from a user.

The video distribution portion distributes video and sound information as video information to the user's information processing terminal in response to the viewing request.

Figure 12:
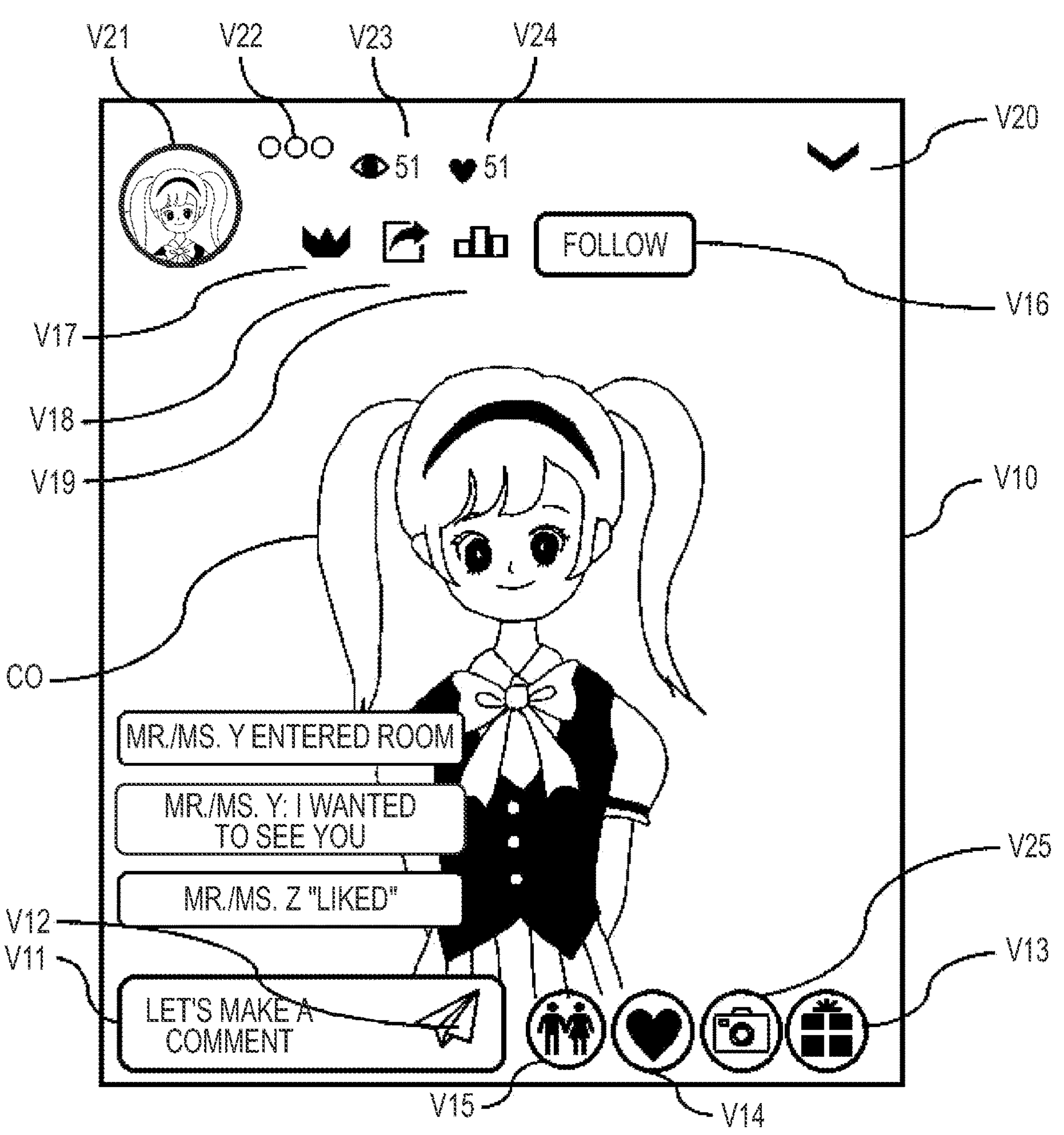
FIG. 12 is a conceptual diagram showing an image of a screen displayed on a user terminal.

FIG. 12 is an example showing a viewing screen V10 of an avatar video displayed on the second user terminal 200.

The viewing user can post a comment by inputting text in a comment posting field V11 and pressing a send button V12.

Further, by pressing a gift button V13, a gift list (screen V30 in FIG. 13) is displayed to the viewing user, and a display request for a gift designated by selection can be sent.

At this time, the one or more processors in this disclosure may include a determination portion. The determination portion determines whether there is a gift display request from the second user terminal 200.

The display request can include gift object information. The gift object information includes at least (i) gift object identification information that specifies the type of the gift object and (ii) position information that indicates the position where the gift object is to be displayed.

Figure 13:
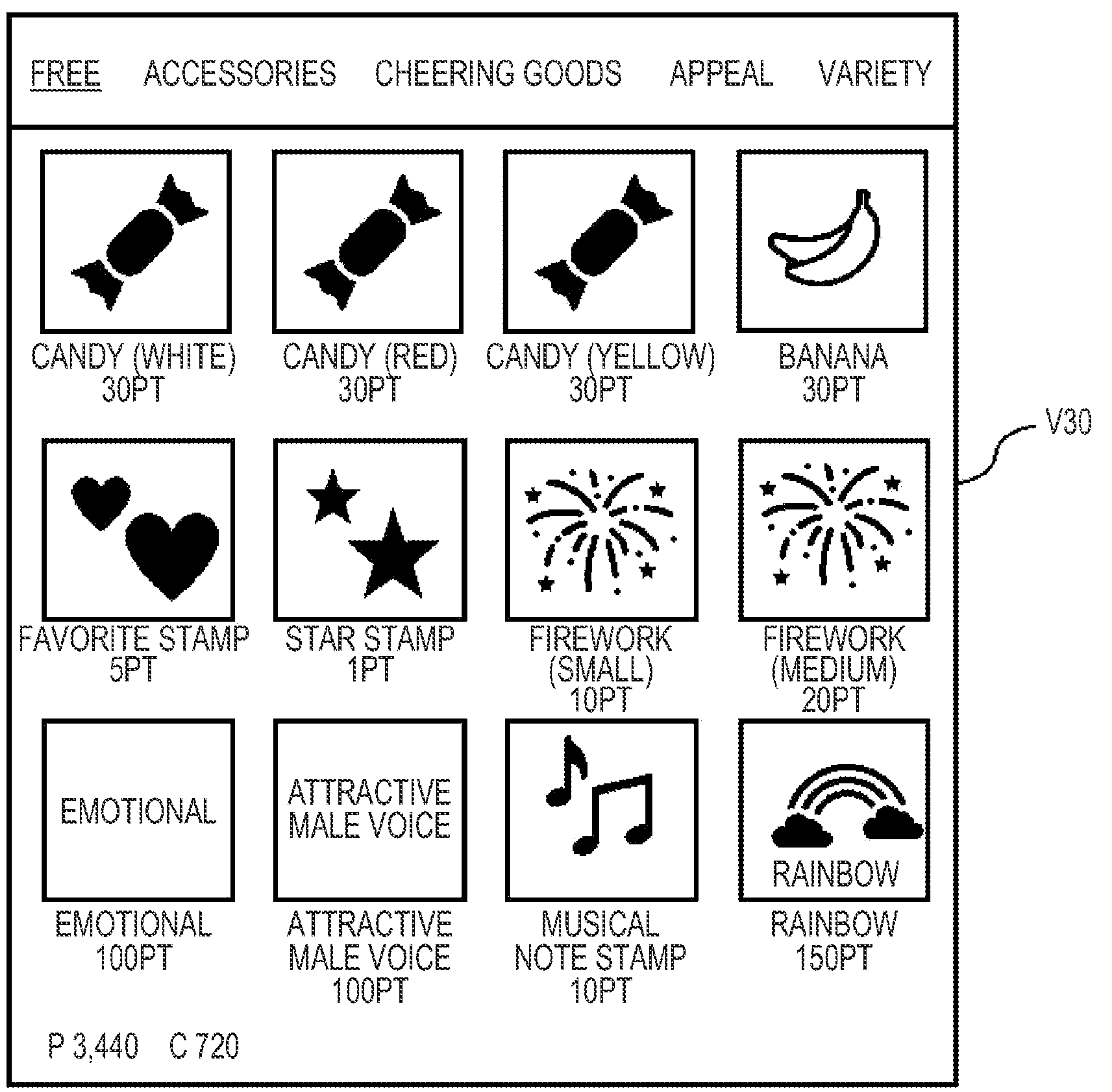
FIG. 13 is a conceptual diagram showing an image of a screen displayed on a user terminal.

Further, as shown in FIG. 13, gifts can be displayed separately for each category (free (paid) gifts, accessories, cheering goods, appeal, variety, or the like).

Here, a paid gift is a gift (coin gift) that can be purchased by the consumption of "My Coin" purchased by the viewing user. A free gift is a gift (point gift) that can be obtained with or without consumption of "My Points," which the viewing user has obtained for free.

The term "gift" used in this application means the same concept as the term "token." Therefore, it is also possible to replace the term "gift" with the term "token" to understand the technology described in this application.

Furthermore, the viewing user can post a rating showing favor by pressing a like button V14. In addition to/in place of the like button V14, it is also possible to display a button for posting a negative rating or other emotions.

In addition, when the first user has enabled other users' appearances in the distribution settings, a user can send a request to appear in the video by selecting a collaboration request button V15.

In addition, a follow button V16 for a second user to follow a distributing user is displayed on the screen of a video distributed by a first user whom the second user has not yet followed. This follow button functions as an unfollow button on the screen of a video distributed by a first user whom a second user is already following.

This "follow" may be performed from a second user to a another second user, from a first user to a second user, and from a first user to another first user. However, this "follow" is managed as a one-way association, and a reverse association is managed separately as a follower.

Additionally, a photo button V25 for saving a still image of the screen can also be displayed.

Further, a cheering ranking display button V17, a share button V18, and a ranking display button V19 are also displayed on the viewing screen V10.

The cheering ranking displays the ranking of a second user who cheers a first user, and the ranking can be calculated according to the amount of gifts (points/coins) or the like.

Additionally, regarding the sharing of videos, by pressing the share button V18, the second user can check a list of SNS (Social Networking Services) that can be shared, and can send a fixed link to a designated location of the SNS designated by selection.

Furthermore, by pressing the collaboration request button V15, it is possible to request collaborative distribution from a first user. Collaborative distribution means that the character object of a second user is caused to appear in a distributed video of the first user.

At the top of the viewing screen V10, a distributing user icon V21, a distributing user name (character object name) V22, a cumulative number-of-viewers display V23, and a cumulative number-of-likes display V24 can be displayed.

Further, when the viewing end button V20 is selected, a screen for ending viewing appears, and a viewing end request can be sent.

The screen for ending such viewing will be described in detail. Such a screen is called "small window sound distribution," and is for viewing a video in a manner of playing only the sound without displaying the image of the video.

The selection of the viewing end button V20 is accepted by the viewing receiver as a video viewing end request.

At this time, the video distribution portion ends the distribution of the image-related information in response to the viewing end request, but does not end the distribution of the sound-related information.

Then, when the image- and sound-related information are distributed at the user terminal, the image is displayed on the main screen at the user terminal, and when only the sound information is distributed, the image is not displayed at the user terminal and a sub screen indicating that the video is being viewed is displayed.

Figure 14:
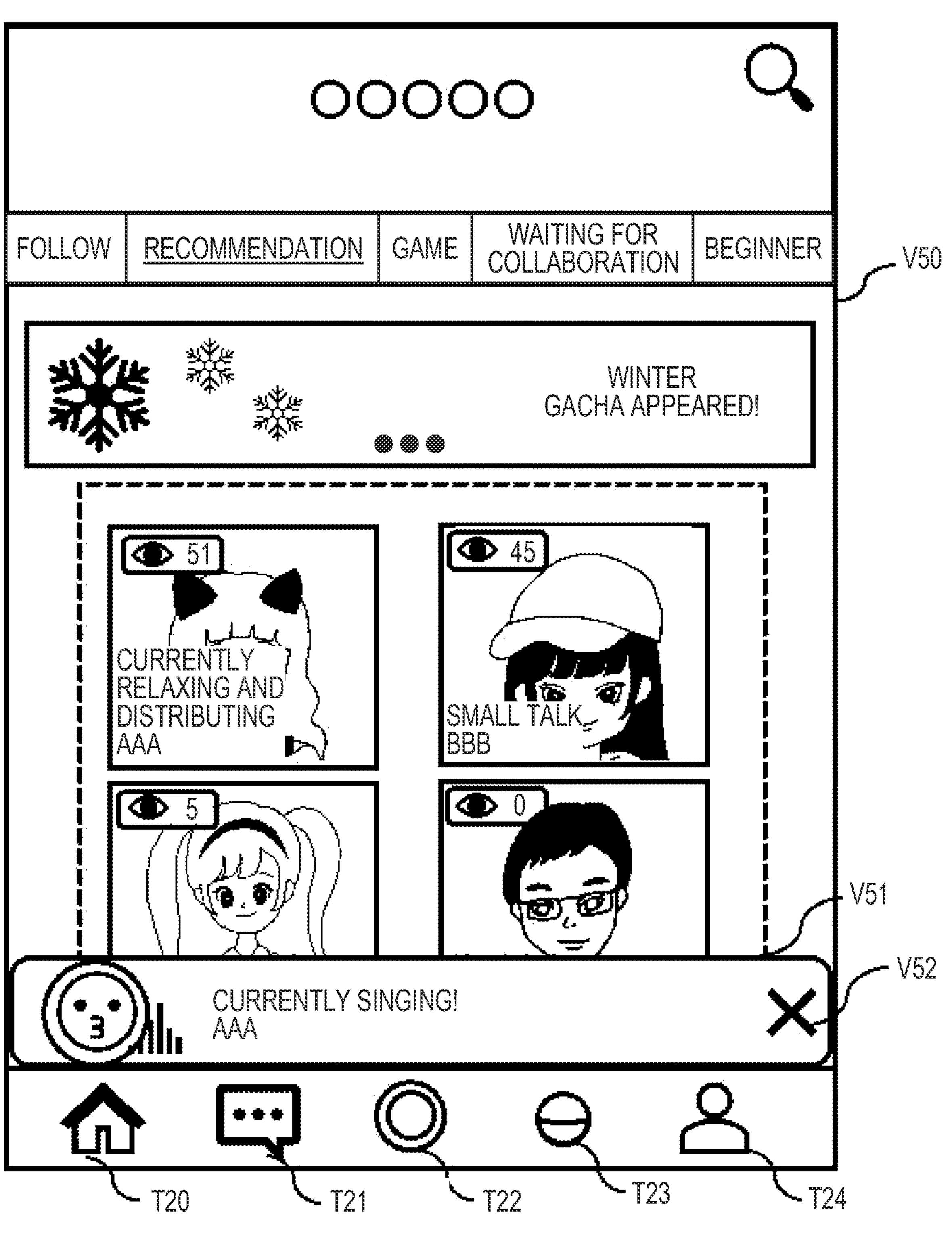
FIG. 14 is a conceptual diagram showing an image of a screen displayed on a user terminal.

FIG. 14 shows an image of a screen V50 on which a sub screen V51 is displayed.

When this sub screen V51 is displayed, the main screen displayed at the back transitions to the screen before viewing the video. For example, when moving from a recommendation tab to the viewing frame, the display returns to the recommendation tab, and when moving from the follow tab to the viewing frame, the display transitions to the follow tab.

When this sub screen V51 is being displayed, operation on the main screen becomes possible, and transition to another screen becomes possible.

On the sub screen V51, a profile image, a name, a title, and a sound icon that can visually identify that sound is playing are displayed.

Then, by selecting an end icon V52 displayed on the sub screen V51, the viewing can be completely ended.

Regarding the end of the display of the image, the information may be sent from the server device, but not displayed at the terminal side, or the transmission of the information itself from the server device may be stopped.

With such a configuration, it becomes possible to search for other distributions and enjoy chatting with other users while listening only to sound.

Next, a "collaboration" in which another user appears in the video of the first user will be described.

As described above, a second user can send a request to participate in the video via the confirmation screen of the collaborative distribution participation request, which is displayed by pressing the collaboration request button V15 shown in FIG. 12.

A collaboration avatar display portion provided to one or more computer processors in this disclosure causes a character object generated based on the movement of the viewing user who made the participation request to be displayed in the video, in response to the received participation request.

Figure 15:
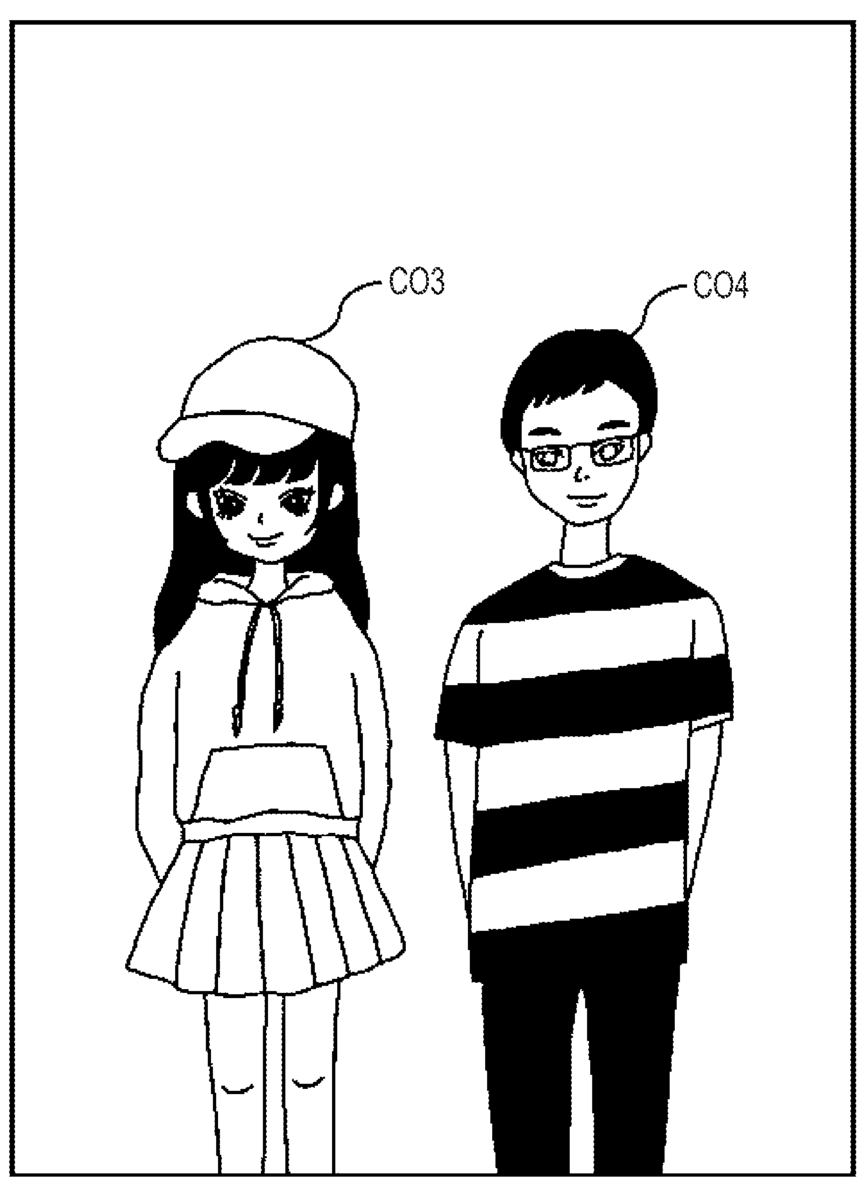
FIG. 15 is a conceptual diagram showing an image of a screen displayed on a user terminal.

FIG. 15 shows, as an example, a viewing or distribution screen when a second avatar CO4, which is a character object of a guest user, participates in a video in which a first avatar CO3, which is the character object of the host user, is displayed. In FIG. 15, the display of objects other than the avatars is omitted.

Figure 16:
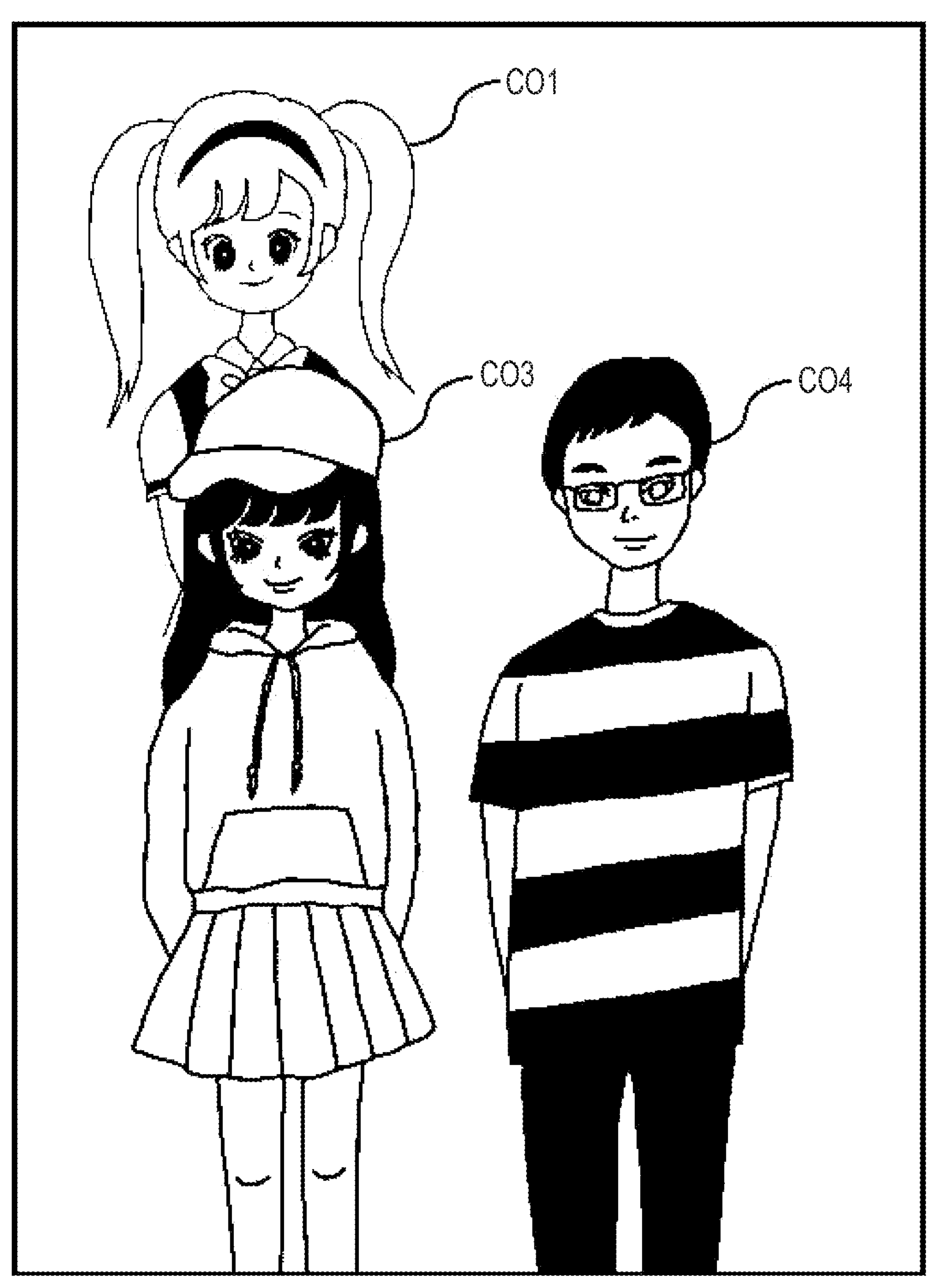
FIG. 16 is a conceptual diagram showing an image of a screen displayed on a user terminal.

Further, as shown in FIG. 16, a third avatar CO1, which is a character object generated based on the movement of another viewing user, may participate in the video. Additionally, although the third avatar CO1 is arranged behind the first avatar CO3 and the avatar CO4 in FIG. 16, the three people may be arranged so as to line up in a horizontal row. Further, the arrangement position of the avatars may be designated by the distributing user.

Figure 17:
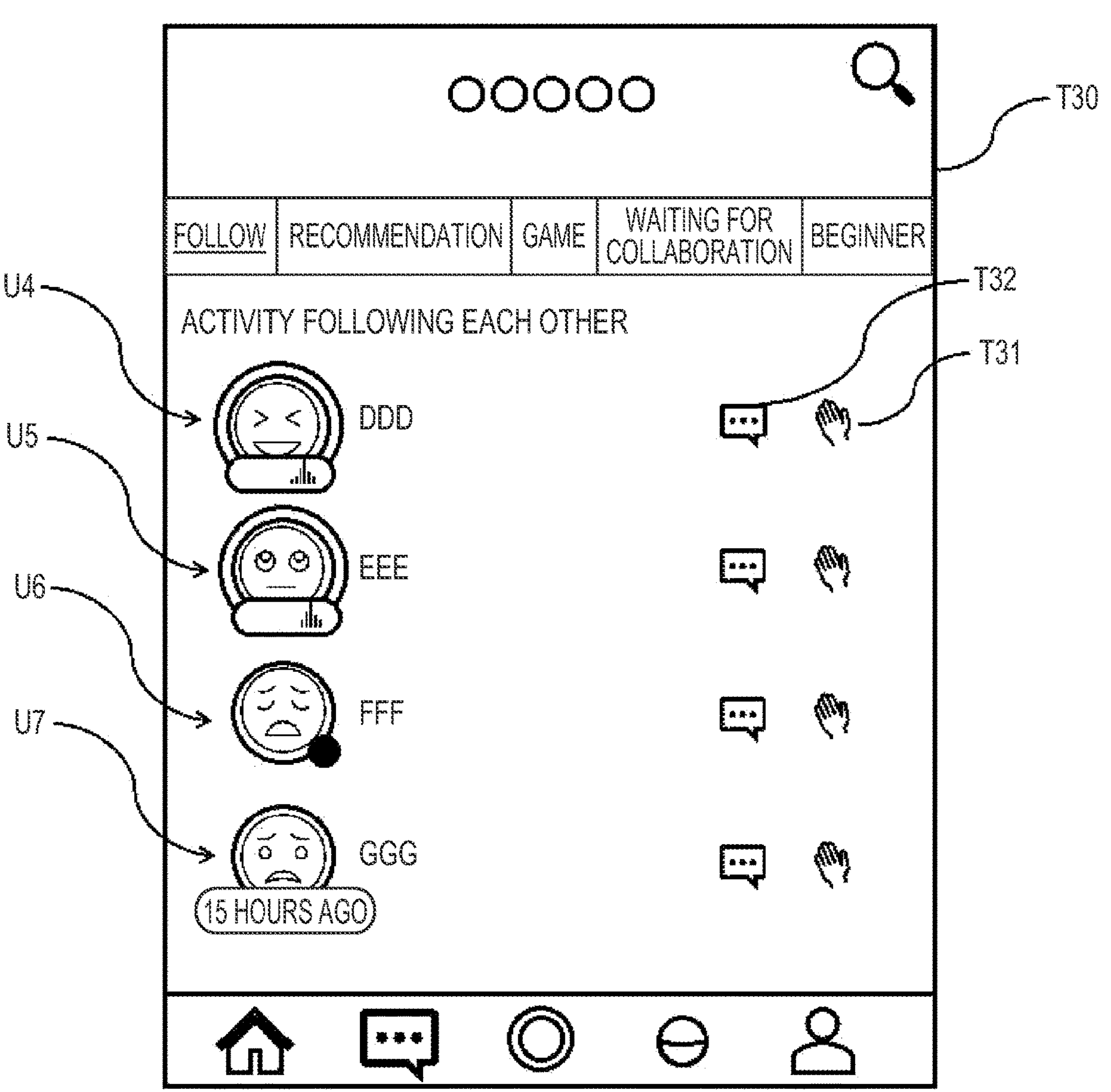
FIG. 17 is a conceptual diagram showing an image of a screen displayed on a user terminal.

FIG. 17 shows a list screen T30 of users having a mutual follow relationship, which is displayed by selection of the follow tab on the top screen shown in FIG. 5. Mutual follow is a relationship in which each is a follower of the other.

On the list screen T30, profile images and names of users who have a mutual follow relationship are displayed.

As shown in FIG. 17, a first object T31 is displayed on the list screen T30 for each of the users having a mutual follow relationship. Further, a chat object T32 may be displayed together with the first object T31. By selecting this chat object, it is possible to transition to an individual chat screen with a second user.

Selection of the first object T31 sends a predetermined notification to the terminal of the user associated with the first object T31.

The predetermined notification may be, for example, a call notification.

Nest, a detailed description of a flow for executing a video chat in an embodiment of this disclosure will be explained.

As an example, a user can execute a video chat from an individual chat screen or a group chat screen.

These chat screens can be transitioned to, for example, from a chat list screen C10 (FIG. 18) expanded by selecting the message button T21 on the top screen T10 (FIG. 5).

Figure 18:
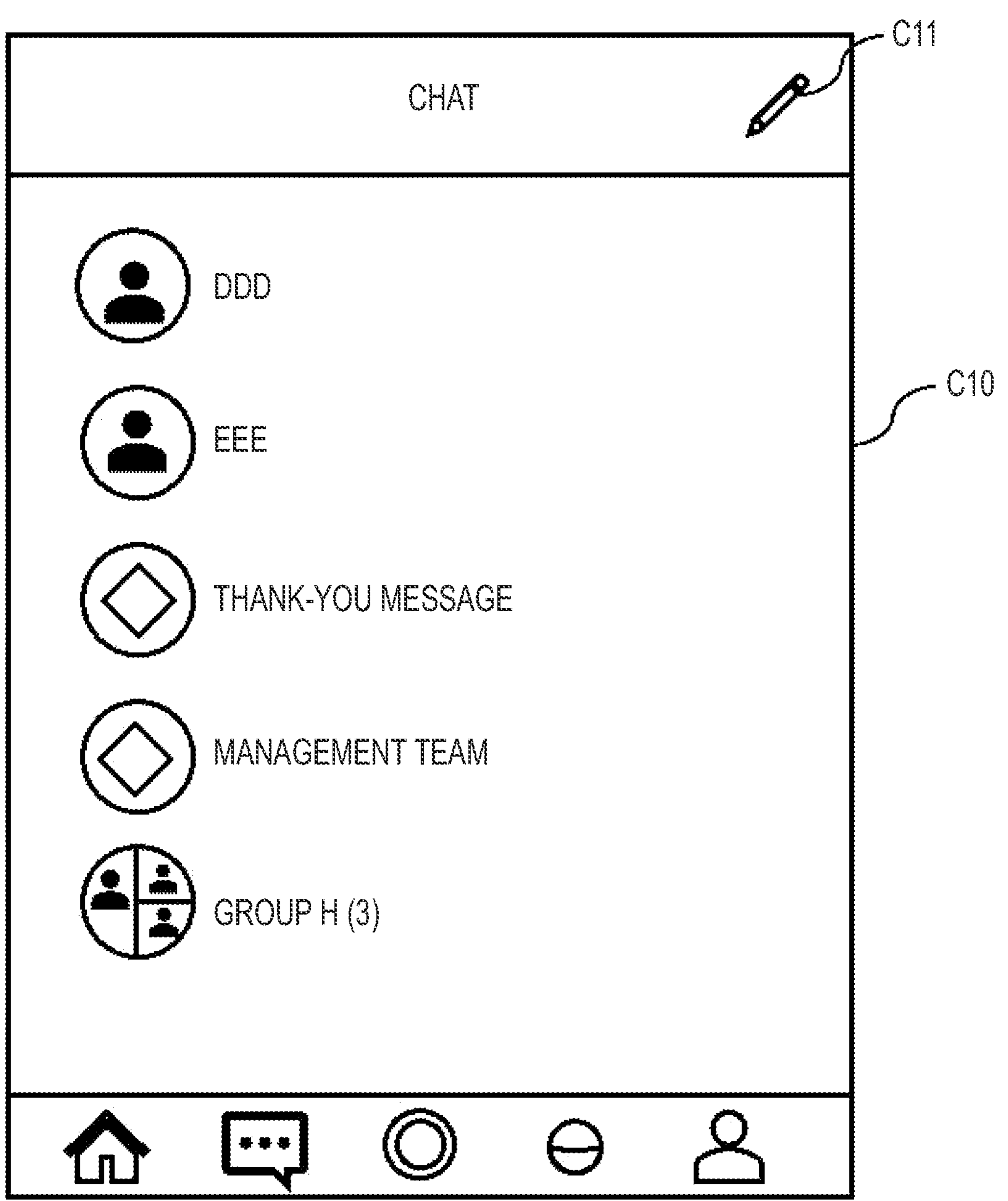
FIG. 18 is a conceptual diagram showing an image of a screen displayed on a user terminal.

The chat list screen C10 shown in FIG. 18 displays icons of users (character objects) or icons of groups that have sent or received messages (chats) in the past, along with their names or titles. The icons of groups can include icons of users (character objects) participating in the groups.

Figure 19:
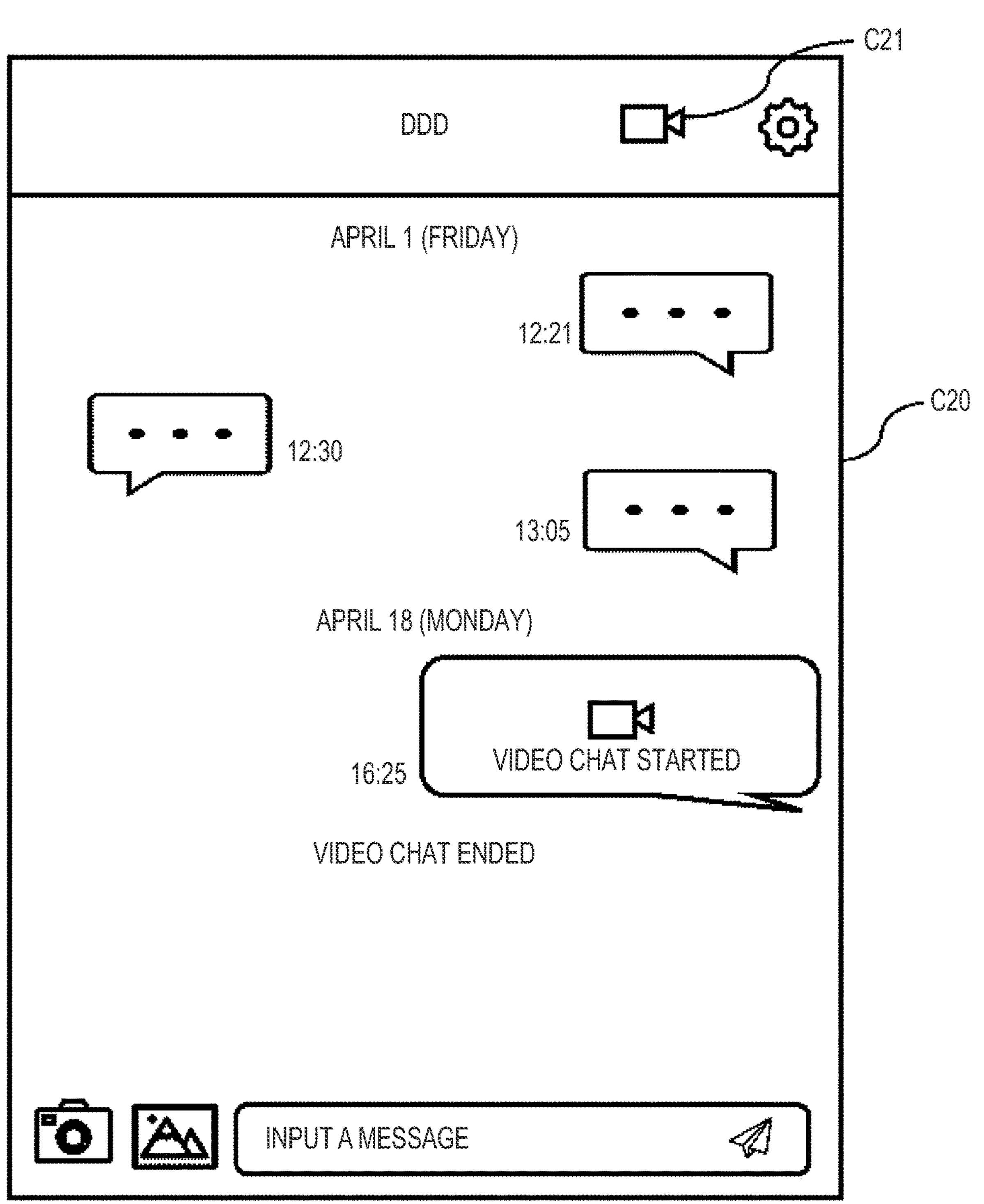
FIG. 19 is a conceptual diagram showing an image of a screen displayed on a user terminal.

The user can then select one user or group on the above-described chat list screen C10, open an individual chat screen C20 (FIG. 19) or a group chat screen, and select a video chat button C21 to start a video chat.

Figure 20:
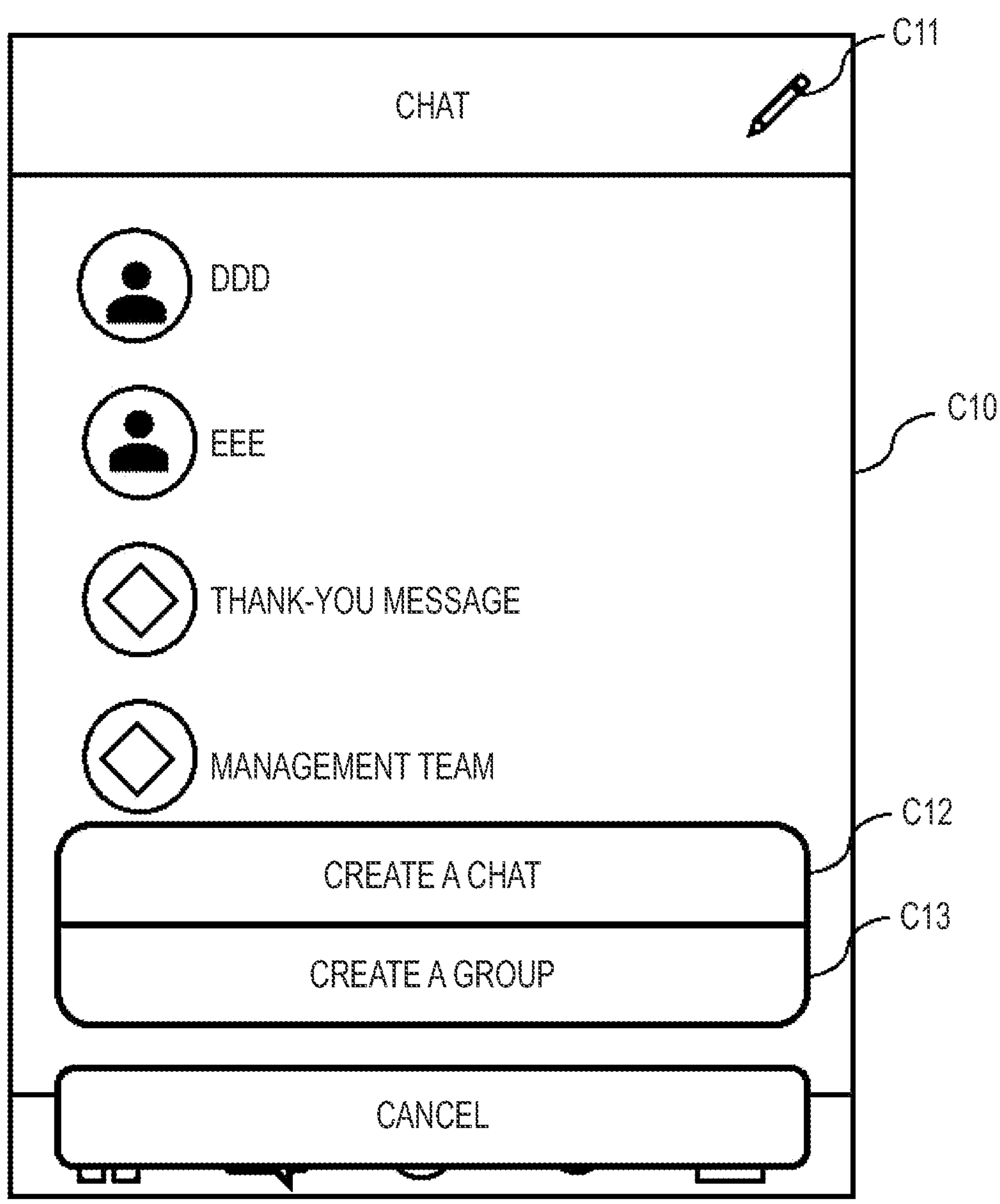
FIG. 20 is a conceptual diagram showing an image of a screen displayed on a user terminal.

Additionally, by selecting a chat creation button C12 or a group creation button C13 displayed by selecting an edit button C11 on the chat list screen C10 (FIG. 20), a chat screen of a user or group not displayed on the chat list screen C10 can be created.

Figure 21:
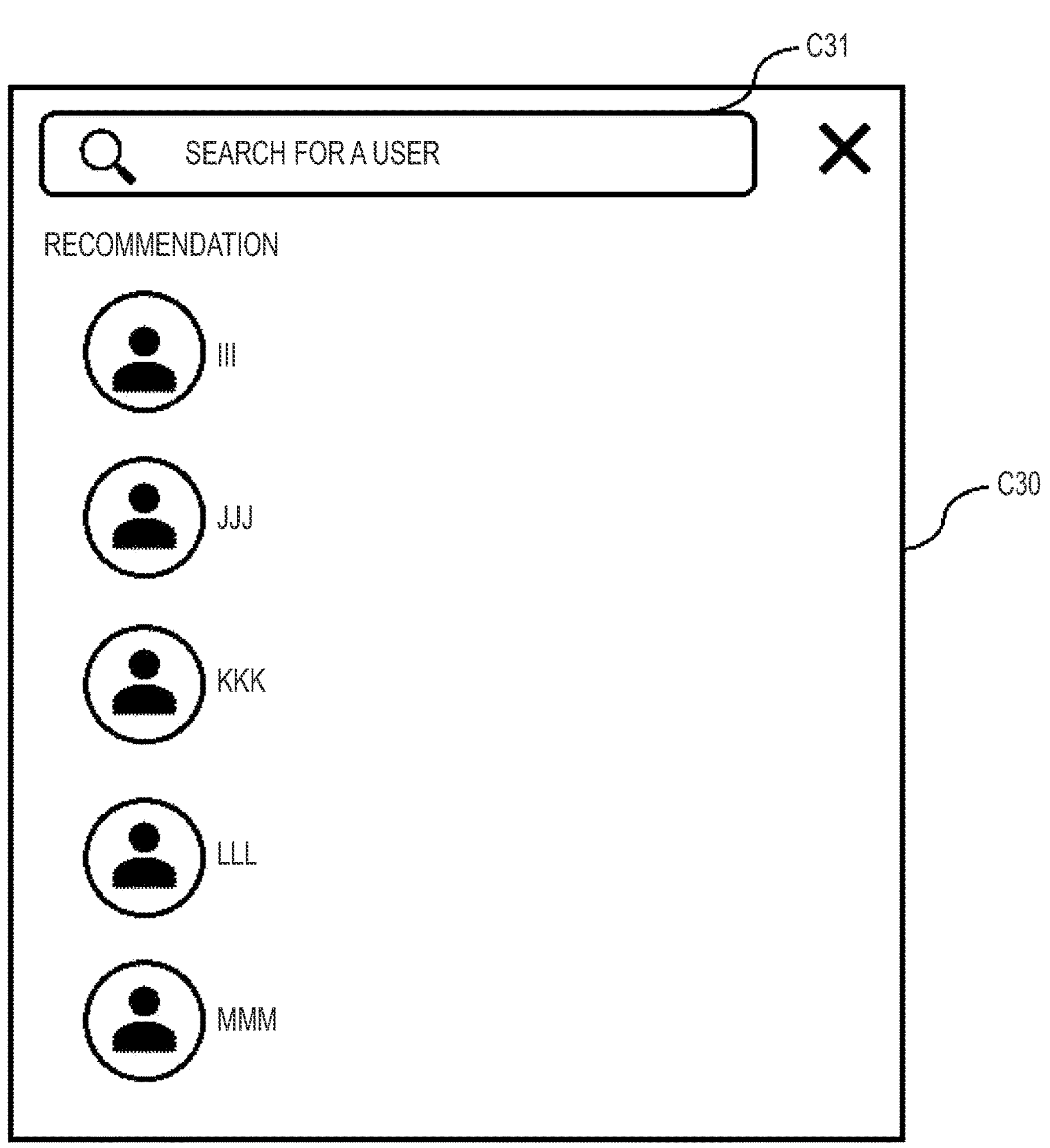
FIG. 21 is a conceptual diagram showing an image of a screen displayed on a user terminal.

FIG. 21 is a user selection screen C30 that deploys when the chat creation button C12 is selected, and a chat screen with a recommended user(s) that is being displayed or a user searched for using a search field C31 is displayed/generated. A configuration of the generated chat screen is the same as the chat screen C20 shown in FIG. 19, and video chatting can be started by selecting the video chat button C21.

Figure 22:
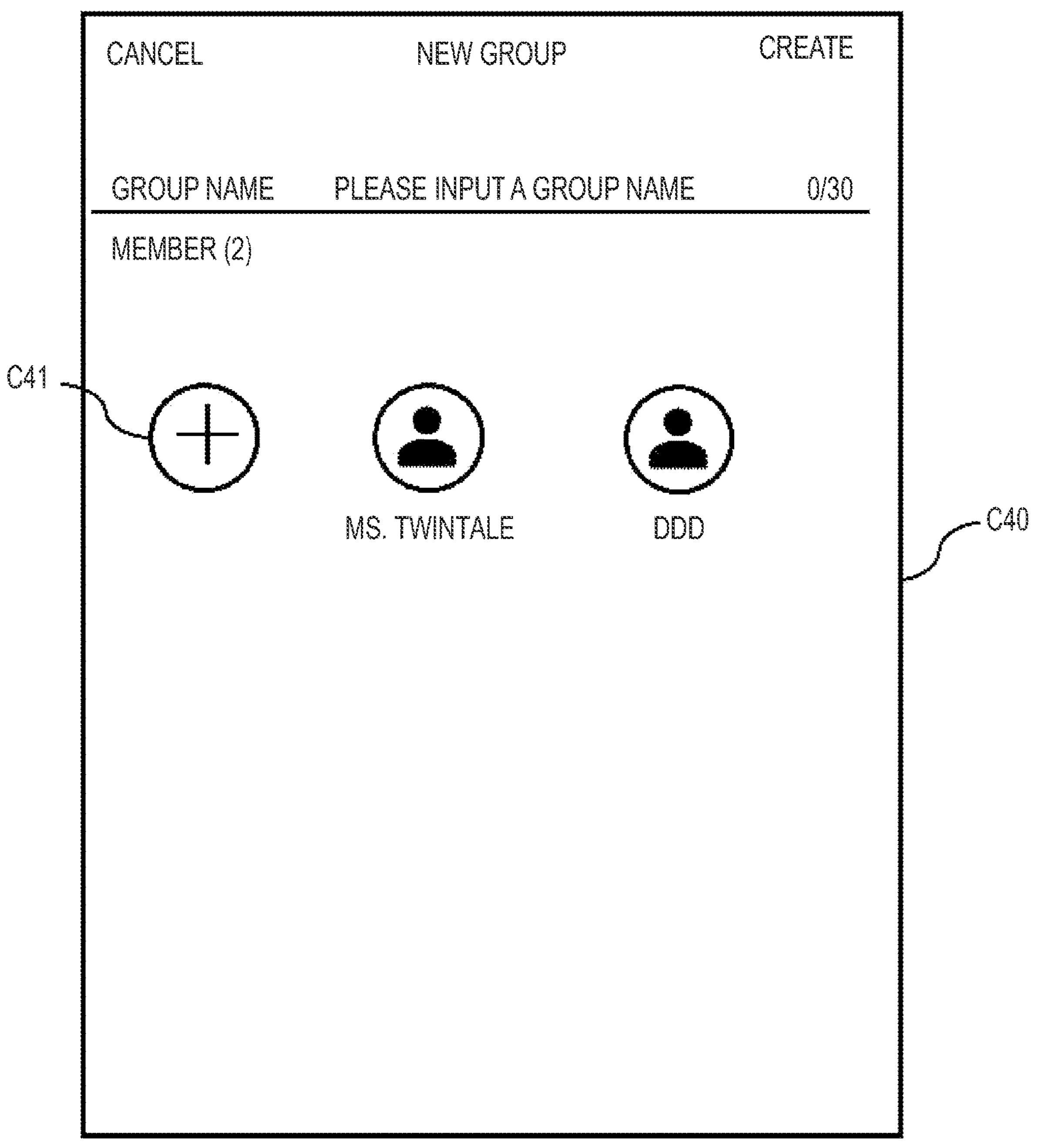
FIG. 22 is a conceptual diagram showing an image of a screen displayed on a user terminal.

Similarly, FIG. 22 shows a group creation screen C40 that deploys when the group creation button C13 is selected. The user can add users other than himself/herself as group members by selecting a user addition button C41. As an example, the number of group members that can be added is up to 7. A group name can also be set on this screen.

Figure 23:
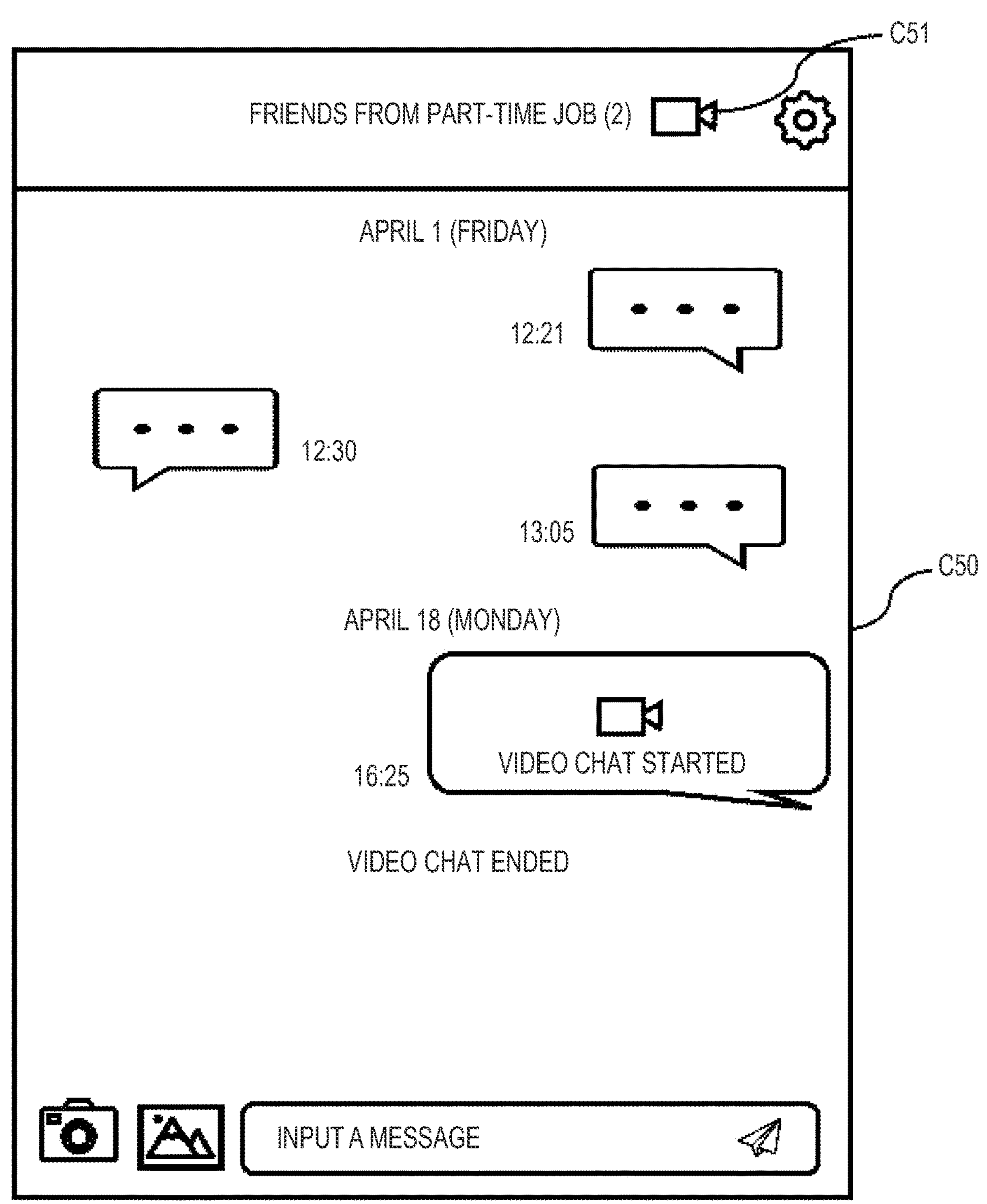
FIG. 23 is a conceptual diagram showing an image of a screen displayed on a user terminal.

Once a group is created, a group chat screen C50 is displayed (FIG. 23). In the group chat screen C50 as well, video chatting can be started by selecting a video chat button C51.

Furthermore, the above-described chat screen C20 can be transitioned to from the chat icon T32 of the follow list screen T30 (FIG. 17).

Also, a chat icon can also be arranged on a profile screen of another user, and the user can transition from various pages to a chat screen, and start a video chat.

When a video chat is started, a notification is sent to the other party, and the other party can participate in the video chat by responding to the notification. Users can set whether or not to receive such notifications.

Furthermore, the system may be configured to allow video chatting only with users who are in a mutual follow relationship. In this case, the system may be configured to display an icon on the follow list screen indicating that a user in a mutual follow relationship is in a video chat with another user, and a user may select the icon to participate in such an ongoing video chat.

The video chat in this disclosure can be said to be a function that allows only a specific user to view the collaborative distribution described above. The specific user here refers to a user participating in a video chat.

Next, an image of the spread of the virtual space in this disclosure will be described with reference to FIG. 24.

Figure 24:
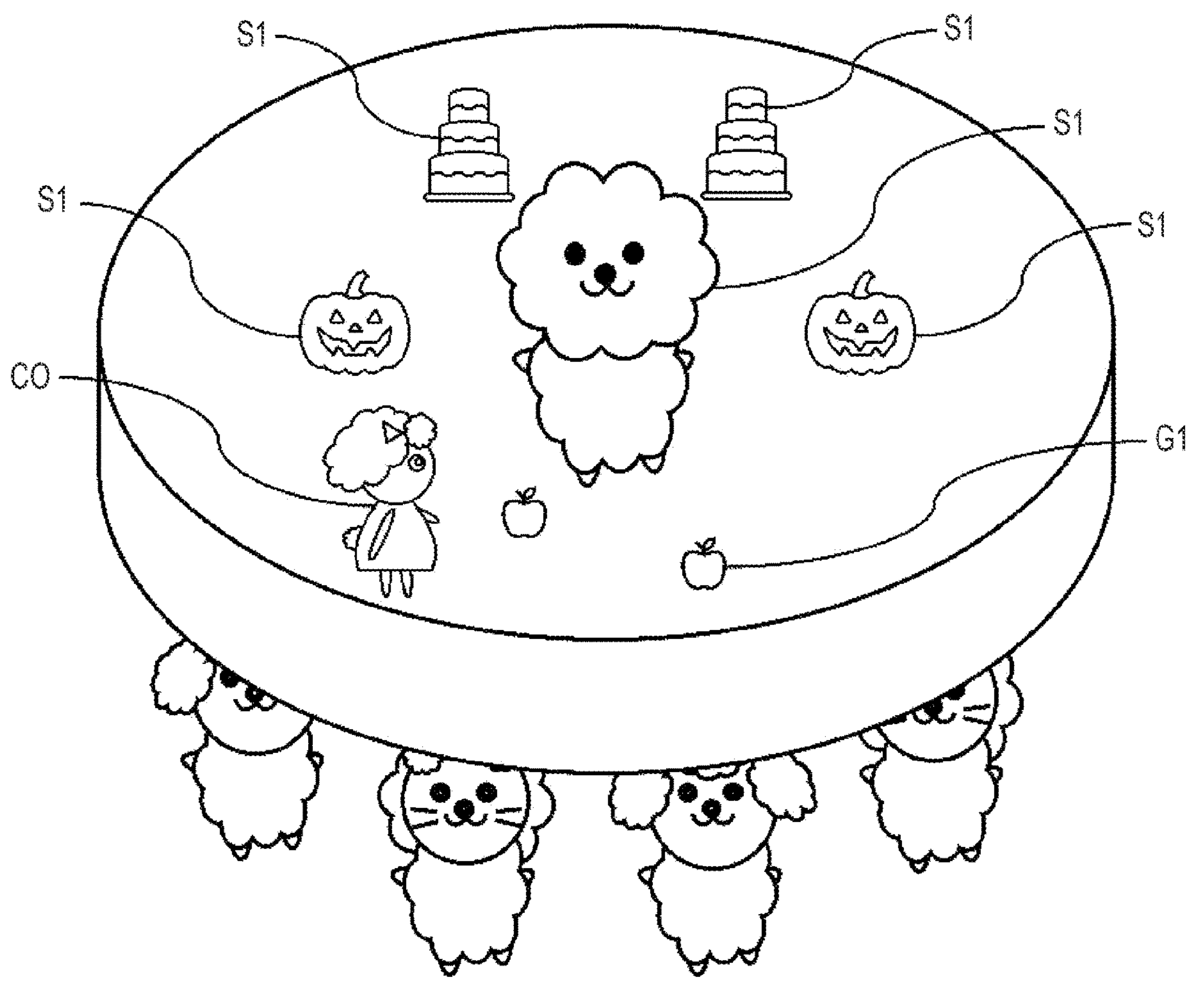
FIG. 24 is a conceptual diagram showing an image of a virtual space described in this disclosure.

As shown in FIG. 24 as an example, the virtual space in this embodiment is arranged such that a disk-shaped island (world) is floating in the air. This island is an object in the form of a tower-shaped cake turned upside down, and can be configured such that various objects are arranged on a disk-shaped ground. The island and the ground are shown as an example, and the display mode thereof is not particularly limited.

The objects that can be displayed include at least the character object CO of a first user, a gift object G1 corresponding to a gift for which a display request was made by a second user, and an object S1, the display position and display timing of which are controlled by the server device 400 (system side).

The character object can be caused to move, jump, and the like within the world by user operation, and such functions can be provided as one of the games described above, for example. In this disclosure, this is specifically referred to as "world distribution" and the procedures for starting and ending game distribution described above apply.

Specifically, switching from normal distribution (avatar distribution) to world distribution can be performed by selecting the play start button D33 of a game displayed in the avatar distribution video (FIG. 8) or by selecting the play button G11 or G21 of one game selected from the game list displayed on the destination screen to which the user has moved by selecting the play start button D33 (FIG. 9, FIG. 10).

Also, switching from world distribution to avatar distribution can be performed by selecting a play end button displayed in a world distribution video.

Next, various functions executable in the information processing system 3000 according to an embodiment of this disclosure will be described with reference to the drawings.

The information processing system 3000 according to an embodiment of this disclosure is, for example, an information processing system that provides a virtual space in which the character object of the user can be displayed.

The virtual space is not particularly limited as long as it can display the user's character object, but may be the world described above.

Figure 25:
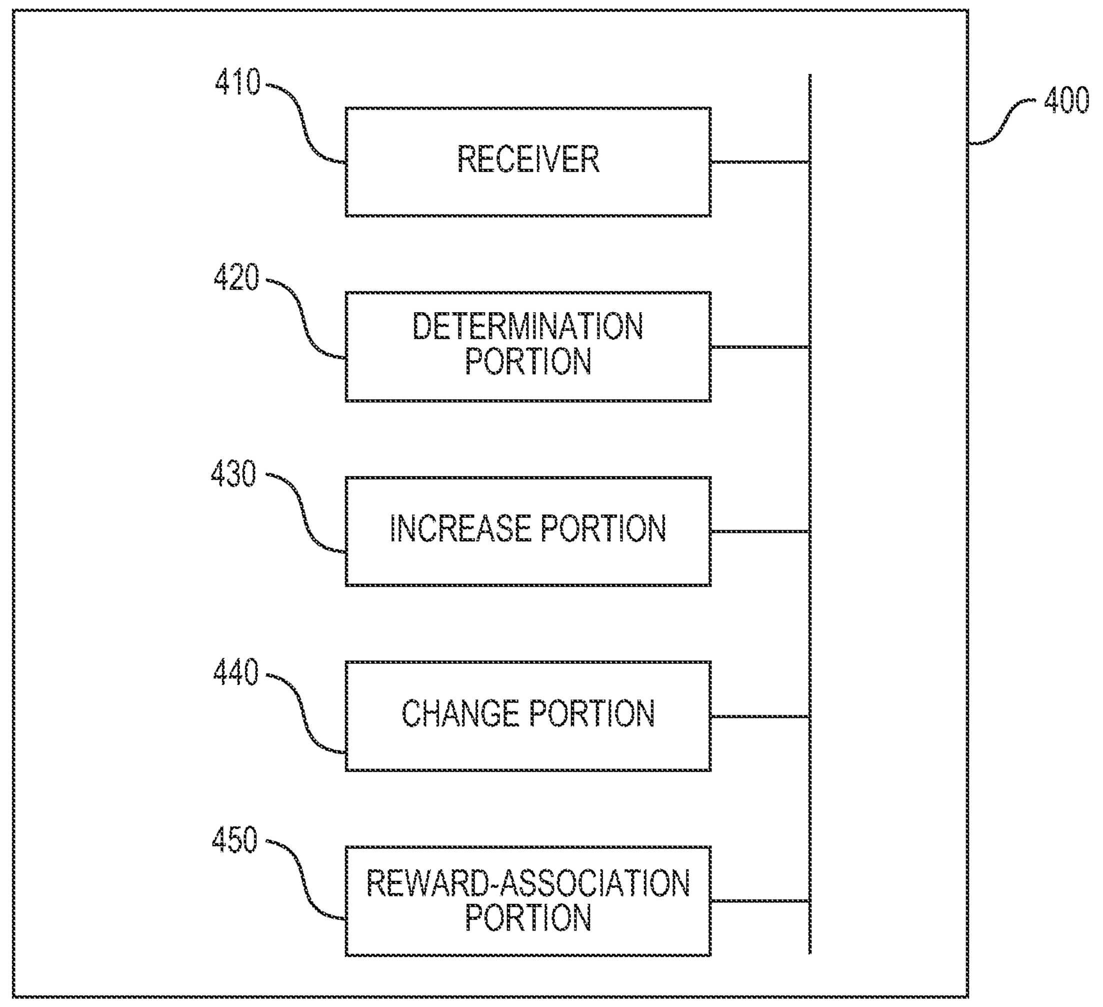
FIG. 25 is a configuration diagram showing an example of a functional configuration of a server device in this disclosure.

One or more computer processors included in the information processing system 3000 include a receiver 410, a determination portion 420, an increase portion 430, a change portion 440, and a reward-association portion 450, as shown in FIG. 25.

In this embodiment, the receiver 410, the determination portion 420, the increase portion 430, the change portion 440, and the reward-association portion 450 are all included in the server device 400.

The receiver 410 receives information sent from the first user terminal 100 of the first user.

The information sent from the first user terminal 100 is not particularly limited as long as it is information by which the determination portion 420 described hereinafter can determine the state of the first user terminal 100.

As an example, the above-mentioned information includes operation information at the first user terminal 100, information indicating that an application realized by the information processing system of this disclosure has been activated/ended, information indicating that video distribution has been started/ended, and information indicating that video viewing has been started/ended.

The information indicating that the application has been activated can be, for example, a request for displaying a predetermined screen, which is sent from the first user terminal 100 when the application is started at the first user terminal 100.

The information indicating that the application has been ended can be, for example, operation information sent from the first user terminal 100 when the application is ended at the first user terminal 100. It is also possible to determine that the application has ended when periodic communication between the application and the server device is interrupted.

Also, the information indicating that the video distribution has been started can be, for example, information sent from the first user terminal when the video distribution start button is selected at the first user terminal.

Similarly, the information indicating that the video distribution has been ended can be, for example, information sent from the first user terminal when the video distribution end button is selected at the first user terminal.

Also, the information indicating that video viewing has been started can be, for example, information sent from the first user terminal when the video viewing start button is selected at the first user terminal.

Similarly, the information indicating that video viewing has been ended can be, for example, information sent from the first user terminal when the video viewing end button is selected at the first user terminal.

These pieces of information can also be used to display to the mutual follow users as mutual follow activities as shown in FIG. 17.

The determination portion 420 determines the state of the first user terminal 100 based on the information received by the receiver 410.

Here, the state of the first user terminal 100 can be broadly classified into a distribution state, a viewing state, and an active state (not including the distribution state and the viewing state).

It is assumed that the distribution state is a state in which a video is being distributed at the first user terminal 100.

It is assumed that the viewing state is a state in which a video is being viewed on the first user terminal 100.

It is assumed that the active state is a state (online state) in which an application for providing a virtual space has been activated at the first user terminal 100 and neither the distribution state nor the viewing state applies.

When the receiver 410 receives information from the first user terminal 100 indicating that an application for providing a virtual space is activated, it can be determined that the determination portion 420 is online.

Specifically, the determination portion 420 can determine that the first user terminal 100 is in an online state by receiving a request for displaying a list screen of the video being distributed, which is sent from the first user terminal 100 when the application has been activated at the first user terminal 100.

The determination portion 420 can determine that the first user terminal 100 is in a distribution state when the receiver 410 receives information indicating that distribution of the video has started from the first user terminal 100.

As an example, the determination portion 420 can determine that the first user terminal 100 is in a distribution state by receiving a start request or the like sent from the first user terminal 100 when the distribution start button D25 is selected at the first user terminal 100.

The determination portion 420 can determine that the first user terminal 100 is in the viewing state when the receiver 410 receives information from the first user terminal 100 indicating that viewing of the video has started.

As an example, the determination portion 420 can determine that the first user terminal 100 is in the viewing state by receiving a display request or the like sent from the first user terminal 100 when the viewing button (thumbnail image T12 or the like) is selected at the first user terminal 100.

The state determined once by determination portion 420 continues until it is determined that a different state has been entered.

When it is determined by the determination portion 420 that the state of the first user terminal 100 is a first state, the increase portion 430 increases a value of a first parameter associated with the user by a first ratio while the first state continues.

As discussed below, one example of the "first parameter" is the number of points received by the first user each minute (pt/minute) when preparing for, and later executing, the distribution. "Increase the value of the first parameter by a first ratio" means that the speed of increase of the value of the first parameter is a first speed of increase (e.g., the value of the first parameter (points) is increased by 10 each minute, such that the first ratio is 10/1). The speed of parameter increase can become greater when doing certain activities such as when singing songs, when talking about certain themes, and so on. For example, the song can be a theme song set by the management or a song that is currently popular. This is not limited to the speed of parameter increase. The value or ratio of the parameter increase may also be increased when doing these certain activities.

As an example, the first state may be any one of the distribution state, viewing state, and online state, but here the description will be given assuming that the first state is the online state.

When it is determined by the determination portion 420 that the state of the first user terminal 100 has changed from the first state to a second state, the change portion 440 changes the ratio at which the value of the first parameter is increased to a second ratio while the second state continues.

"Increase the value of the first parameter by a second ratio" means that the speed of increase of the value of the first parameter is a second speed of increase.

As an example, the second state may be a state different from the above-described first state, but here the second state is described as being the distribution state or the viewing state.

At this time, the second speed of increase can be greater than the first speed of increase.

Thus, the value of the first parameter increases by the first ratio while the state of the first user terminal 100 is the first state, and as described hereinafter, while the state of the first user terminal 100 is the second state, it is increased by the second ratio, and may be a dedicated parameter that is not increased or decreased by another factor(s), or a shared parameter that is increased or decreased by another factor(s).

As a specific example, when the application is activated at the first user terminal 100 and the first user is changing the clothes of the character object in preparation for the distribution of a video, checking the information of an event, or the like (i.e., the terminal of the first user is in a first state), the value of the first parameter (i.e., the number of points held by the first user) increases continuously by 10 pt/minute (i.e., 10 points per minute). Then, when the first user terminal 100 starts distributing the video (i.e., the terminal of the user changes to a second state), the ratio of increase increases, such that the first parameter increases by 30 pt/minute (i.e., the first ratio is changed from 10 pt/minute to 30 pt/minute). As another specific example, if the first user begins viewing another user's distribution (i.e., the terminal of the first user is in a first state), the value of the first parameter is continuously increased by the ratio of 10 pt/minute; then, if the first user changes to the distribution state (i.e., the terminal of the first user is changed to a second state), the ratio increases such that the value of the first parameter is continuously increased by the ratio of 30 pt/minute.

After that, if the application itself is activate even though the distribution is ended at the first user terminal 100, the increase speed of the first parameter is returned from 30 pt/minute to 10 pt/minute.

Further, after that, when the viewing of the video is started at the first user terminal 100, the increase speed is changed again, and the first parameter is increased by 20 pt/minute.

Thus, the speed of increase in the distribution state and viewing state can be made greater than the speed of increase in the online state.

Also, the speed of increase in the viewing state can be smaller than the speed of increase in the distribution state.

Then, the reward-association portion 450 associates a predetermined reward with the first user according to the value of the first parameter.

A predetermined reward is available within the application. For example, items (avatar parts, clothes, accessories, and the like) that can be attached to the character object of the first user, free or paid coins, and the like can be listed. Items representing monetary value may also be provided as the reward. For example, the user (e.g., distributing user) may exchange points (e.g., points for paid gifts that are received) for cash.

As an example, a condition for awarding a reward can be that the first parameter reaches a predetermined value.

As such a predetermined value, one value corresponding to an upper limit value may be set, or a plurality of values may be set until the upper limit value is reached.

Figures 26, 27:
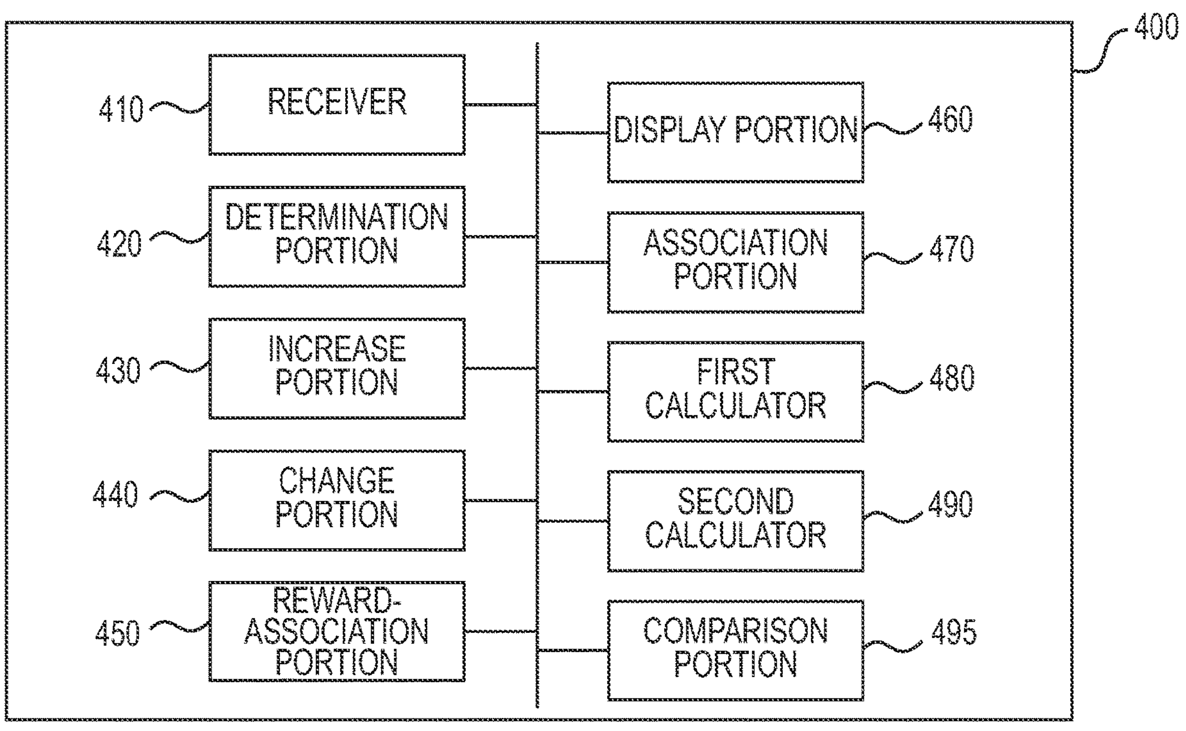
FIG. 26 is a data configuration diagram showing an example of a data table stored in a memory device in this disclosure.
FIG. 27 is a conceptual diagram showing another example of a functional configuration of a server device in this disclosure.

FIG. 26 shows an example of a data table in which the value of the first parameter is associated with a reward, and shows an example in which a plurality of predetermined values are each associated with a reward.

Also, the value of the first parameter can be reset to 0 at a predetermined timing.

Although the predetermined timing is not particularly limited, it can be set as appropriate, such as 10:00 every morning or 0:00 on the first day of every month.

Also, the predetermined timing can be reset to 0 at the timing at which the value of the first parameter reaches the upper limit.

In this case, at the timing at which the value of the first parameter is reset to 0, the table associated with the reward may be changed to another table. This other table may store more valuable rewards than the previous table.

The above-described configuration provides a technical improvement that solves or alleviates at least part of the problem of the conventional technology described above.

Specifically, according to the configuration of this disclosure, it is possible to improve willingness of a distributing user to distribute, willingness of a viewing user to view, and/or willingness of users to interact with each other.

In particular, since a user is rewarded according to his/her activity within the application and in proportion to the duration of the activity, the user is more motivated to engage in a long-term activity in which the speed of parameter increase is greater in the application, and the user's activity within the application is promoted.

Encouraging user activity within the application leads to an improvement in willingness of a distributing user to distribute, willingness of a viewing user to view, and/or willingness of users to interact with each other, thereby improving the quality of the video.

As described above, when the first state is the active state (online state) in which an application for providing a virtual space is activated at the first user terminal 100 and does not correspond to either the distribution state or the viewing state, the second state can be either the distribution state in which the video is distributed at the first user terminal 100 or the viewing state in which the video is being viewed at the first user terminal 100.

At this time, the change portion 440 can change the second ratio depending on whether the second state is the distribution state or the viewing state.

That is, in the above-described case, the second ratio in the second state is larger than the first ratio in the first state, but the second ratio differs depending on the second state. Specifically, the second ratio in the distribution state can be made larger than the second ratio in the viewing state.

In the above example, the first state is described as being the online state, but the following describes the case in which the first state is defined as another state.

The first state can be a first distribution state in which a video is distributed in which character objects other than the first character object associated with the first user are not displayed on the first user terminal, and the second state can be a second distribution state in which a video is distributed in which other character objects associated with other users are displayed in addition to the first character object on the first user terminal.

Specifically, the first distribution state is a solo distribution state, and the second distribution state is a collaborative distribution state.

In this case, the determination portion 420 can determine that the first user terminal 100 is in the first distribution state when the receiver 410 receives information indicating that the distribution of the video has started from the first user terminal 100, and can determine that it is in the second distribution state when another character object (guest) is allowed to participate in the video during the first distribution state.

By increasing the speed of increase of the first parameter during collaborative distribution more than during solo distribution, it is possible to increase the user's willingness for collaborative distribution.

Furthermore, the change portion 440 may change the second ratio according to the number of guests participating in the collaboration. For the collaborative distribution, various patterns may exist for how the benefits (e.g., the speed of parameter increase, the value and rate of increase, and so on) and rewards are determined. As an example, in a first pattern, the benefit or reward is set for each person participating in the collaborative distribution (for example, for each person, the speed of increase of the first parameter is increased equally). As another example, in a second pattern, the total number of benefits or rewards is determined by the number of people participating in the collaborative distribution and the number of viewers, and the benefits or rewards are distributed among the participants. In this second pattern, the method of distribution (which may include that the benefits differ for different participants) is calculated based on the participation time of the participants in the collaborative distribution and/or the number of followers of each participant.

According to such a configuration, it is possible to increase the willingness to perform collaborative distribution with a large number of people.

As another example, the first state may be a third distribution state in which a game play video provided by the information processing system is distributed at the first user terminal 100, and the second state may be a fourth distribution state in which a video in which a first character object associated with the first user is displayed is distributed at the first user terminal 100.

Specifically, the third distribution state is a game distribution state, and the fourth distribution state is an avatar distribution state.

The determination portion 420 can determine that the first user terminal 100 is in the game play state when the receiver 410 receives information indicating that the game has started to be played from the first user terminal 100, and can determine that it is in the fourth distribution state when it is recognized that the first user terminal 100 has returned to avatar distribution during the third distribution state.

By increasing the speed of increase of the first parameter during avatar distribution more than during game distribution, the user's willingness for avatar distribution can be increased.

Alternatively, by increasing the speed of increase of the first parameter during game distribution more than during avatar distribution, it is possible to increase the user's willingness to distribute the game.

The fourth distribution state here can include the first distribution state and the second distribution state.

As another example, the first state may be the fourth distribution state in which a video in which a first character object associated with the first user is displayed is distributed at the first user terminal 100, and the second state may be a fifth distribution state in which a game play video in which the first character object associated with the first user can move through the virtual space is distributed at the first user terminal 100.

Specifically, the fourth distribution state is the avatar distribution state, and the fifth distribution state is a world distribution state.

The determination portion 420 can determine that the first user terminal 100 is in the fourth distribution state when the receiver 410 receives information indicating that the video distribution has started from the first user terminal 100, and can determine that the first user terminal 100 is in the fifth distribution state when the receiver 410 receives information indicating that a world function has started from the first user terminal 100 during the fourth distribution state.

By increasing the speed of increase of the first parameter during world distribution more than during avatar distribution, it is possible to increase the user's willingness to perform world distribution.

As another example, the first state may be a sixth distribution state in which a camera of the first user terminal 100 is turned off, and the second state may be a seventh distribution state in which at least the first character object associated with the first user terminal 100 is displayed.

Specifically, the sixth distribution state is camera-off distribution, and the seventh distribution state is camera-on distribution.

The determination portion 420 can determine that the first user terminal 100 is in the sixth distribution state when the receiver 410 receives information from the first user terminal 100 indicating that the camera is turned off during video distribution, and can determine that the first user terminal 100 is in the seventh distribution state when the receiver 410 receives information from the first user terminal 100 indicating that the camera is turned on during the sixth distribution state.

By increasing the ratio of increase of the first parameter during camera-on distribution more than during camera-off distribution, it is possible to increase the user's willingness to perform camera-on distribution.

The camera-off distribution is not limited to distribution with the camera turned off, and need not be particularly limited as long as the first character object is not displayed or an icon of the first character object is displayed.

Similarly, camera-on distribution is not limited to being distributed with the camera turned on, and need not be particularly limited as long as the first character object is displayed.

As another example, the first state may be an eighth distribution state in which distribution is performed with the microphone of the first user terminal 100 turned off, and the second state may be a ninth distribution state in which distribution is performed with the microphone of the first user terminal 100 turned on.

Specifically, the eighth distribution state is a microphone-off distribution, and the ninth distribution state is a microphone-on distribution state.

The determination portion 420 can determine that the first user terminal 100 is in the eighth distribution state when the receiver 410 receives information from the first user terminal 100 indicating that the microphone is turned off during video distribution, and can determine that the first user terminal 100 is in the ninth distribution state when the receiver 410 receives information from the first user terminal 100 indicating that the microphone is turned on during the eighth distribution state.

By increasing the ratio of increase of the first parameter during microphone-on distribution more than during microphone-off distribution, it is possible to increase the user's willingness to perform microphone-on distribution.

The microphone-off distribution is not limited to distribution with the microphone turned off, and need not be particularly limited as long as sound from the first user terminal 100 is not included.

Similarly, the microphone-on distribution is not limited to distribution with the microphone turned on, and need not be particularly limited as long as it includes sound from the first user terminal 100.

Although these distribution states may include states that overlap each other, the determination portion 420 may determine that a state in which the speed of increase of the first parameter is highest is the state of the first user terminal 100, or may use the sum of the speed of increase of a plurality of states determined by the determination portion 420 as the speed of increase of the first parameter.

The reward can be an item that can be attached to the first character object associated with the first user.

Items that can be attached to the first character object associated with the first user are, for example, items such as avatar parts such as eyes, nose, mouth, hairstyle, and body type, clothes, and accessories.

Also, the reward can be free or paid coins associated with the first user.

"Free coins" means "points" that users receive for free through activities within the application, and "paid coins" mean "coins" that users purchase by paying fees.

"Points" are consumed when viewing users request the display of free gifts called point gifts, and "coins" are consumed when viewing users request the display of paid gifts called coin gifts.

Also, the reward can be a gacha ticket or the like that is consumed to execute a gacha.

The determination portion 420 can further determine whether the number of actions from other user terminals or a worth related to a value exceeds a predetermined value in the video that is being distributed at the first user terminal 100.

An action with respect to a video by another user terminal (here, the viewing user terminal (second user terminal 200)) is the viewing of a video by another user (viewing user), a request to display a gift on the video, a comment post, and/or a rating post, or the like.

For example, the number of actions or the worth related to a value is calculated by (i) the number of viewing users when the action is viewing a video, (ii) the gift value X number of gifts when the action is requesting the display of a gift, (iii) a reference value X number of comment posts or a comment value X number of comment posts when the action is a comment post, and (iv) a reference value X number of rating posts when the action is a rating post.

The reference value may be a constant value, or may be a constant value multiplied by the number of viewing users.

Also, the value of a gift can be a value according to the number of coins/points required to request display of the gift.

In addition, the value of a comment can be a value according to the volume of the comment or the amount charged for the comment. Charging for a comment is performed in order to make the comment stand out.

At this time, the first state is a state in which the determination portion 420 determines that the number of actions or a worth related to a value is equal to or less than a predetermined value, and the second state is a state in which determination portion 420 determines that the number of actions or a worth related to a value exceeds the predetermined value.

By increasing the speed of increase of the first parameter when there are many actions from the viewing users with respect to the video, the distributing user will strive to improve the quality of the video in order to increase the actions of the viewing users with respect to the video.

The determination portion 420 can further determine whether the number of actions from the first user terminal 100 or the worth related to the value exceeds a predetermined value in the video being distributed or viewed on the first user terminal 100.

Actions with respect to the video by the first user terminal 100 can be distribution of the video by the first user as the distributing user, activation of an "emote" with respect to the first character object, posting of a comment, and/or execution of a gacha.

Activation of an emote with respect to the first character object means to cause a specific movement to be applied to the first character object. The first user can cause the first character object to activate the selected emote by selecting one or more emotes from among emote candidates displayed on the screen. An emote is, for example, a movement that moves a body part other than the face (hands or arms) that cannot be tracked in mobile distribution.

Also, the action with respect to the video by the first user terminal 100 can be viewing the video by the first user as the viewing user, posting a comment, and/or requesting the display of a gift, or the like.

For example, the number of actions or the worth related to a value is calculated by, for example, the number of viewing users when the action is distribution or viewing of a video; gift value X number when the action is a gift display request; reference value X number or comment value X number when the action is a comment post; and reference value X number of rating posts when the action is rating post.

The reference value may be a constant value, or may be a constant value multiplied by the number of viewing users.

In addition, the value of a comment can be a value according to the volume of the comment or an amount charged for the comment.

Also, the value of a gacha can be a value corresponding to the number of coins/points required to request the execution of the gacha.

At this time, the first state is a state in which the determination portion 420 determines that the number of actions or a worth related to a value is equal to or less than a predetermined value, and the second state is a state in which determination portion 420 determines that the number of actions or a worth related to a value exceeds the predetermined value.

By increasing the speed of increase of the first parameter when there are many actions with respect to a video to be distributed or viewed, it is possible to increase action with respect to videos by the distributing or viewing user(s).

In the above example, the state of the first user terminal 100 is roughly divided into three types: online state, distribution state, and viewing state. Further, the state of the first user terminal 100 can be roughly divided into six types including event participation state, video chat state, and text chat state.

The event participation state is a state in which the first user is associated with a predetermined event. The event participation state may be further classified according to a ranking within the event, the number of associated events, and the like.

The video chat state is a state in which a video chat is being performed at the first user terminal 100. The video chat state may be further classified according to whether the video chat is open to the public, the number of participants in the video chat, and the like.

The text chat state is a state in which a text chat is being performed at the first user terminal 100. The text chat state may be further classified according to the number of participants in the text chat, the number of stamp transmissions, the number of chat posts, and the like.

At this time, the first state is an online state in which an application for providing a virtual space is activated at the first user terminal 100 and does not correspond to any of the distribution state, viewing state, event participation state, video chat state, or text chat state.

According to this configuration, by increasing the speed of increase of the first parameter when users are actively working in the application, it is possible to promote interaction between users and encourage participation in events.

Also, the second ratio at this time can be made different depending on whether the second state is the distribution state, the viewing state, the event participation state, the video chat state, or the text chat state.

That is, in the above-described case, the second ratio in the second state is greater than the first ratio in the first state, but the second ratio differs depending on the second state. Specifically, the second ratio in the text chat state can be greater than the second ratio in the event participation state, the second ratio in the video chat state can be greater than the second ratio in the text chat state, the second ratio in the viewing state can be greater than the second ratio in the video chat state, and the second ratio in the distribution state can be greater than the second ratio in the viewing state.

In addition, the state of the first user terminal 100 can be further classified into a state of turning a gacha, a state of posting on an SNS, and the like. The gacha can be turned both during and not during distribution, but here it refers to a state in which the gacha is being turned not during distribution. An example of the gacha being turned during distribution is as described above as an action with respect to a video.

The determination portion 420 can further determine whether a predetermined item is associated with the first user.

When the determination portion 420 determines that the predetermined item is associated with the first user, the change portion 440 changes the second ratio.

The predetermined item is not particularly limited as long as it causes the second ratio to increase, but as an example, it can be a non-wearable item (VIP pass, ticket, or the like), a wearable item (clothes or accessories), or an item that can be displayed as an object during video distribution.

An example of an item that can be displayed as an object during video distribution is a figurine item.

The first user can select the figurine item to display a figurine object while the video is being distributed, and can temporarily change the second ratio.

Such an object may automatically end its display along with its effect after a certain period of time has elapsed, or may end display along with its effect in response to a display end instruction from the first user.

The user can obtain such items as rewards for a gacha, posting on SNS, and gifts, and as rewards provided by the reward-association portion 450 described above.

The one or more computer processors in this disclosure can further include a display portion 460, as shown in FIG. 27 as an example.

The display portion 460 displays the value of the first parameter in the form of a graph on the first video in which the first character object associated with the first user is displayed.

The above-described graph may be displayed upon a display request from the first user, or may be displayed on the screen at all times.

Also, the above graph may be displayed even when the first video is not being distributed, according to a display request from the first user.

If there is an upper limit to the value of the first parameter that can be obtained in a predetermined period (for example, one day), the degree of achievement can be visually displayed using a pie chart (FIG. 28) or a horizontal bar chart (FIG. 29) with the upper limit set to 100%. In addition, when a plurality of achievement values are set up to an upper limit, these are also displayed so as to be visible.

Figure 28:
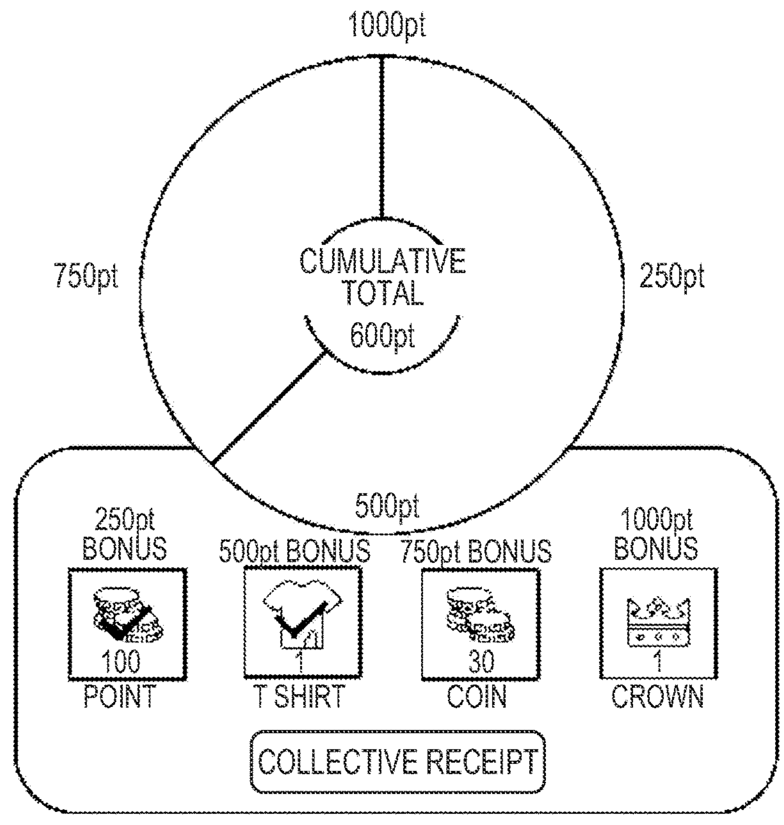
FIG. 28 is a conceptual diagram showing an example of a display aspect of a first parameter in this disclosure.
Figure 29:
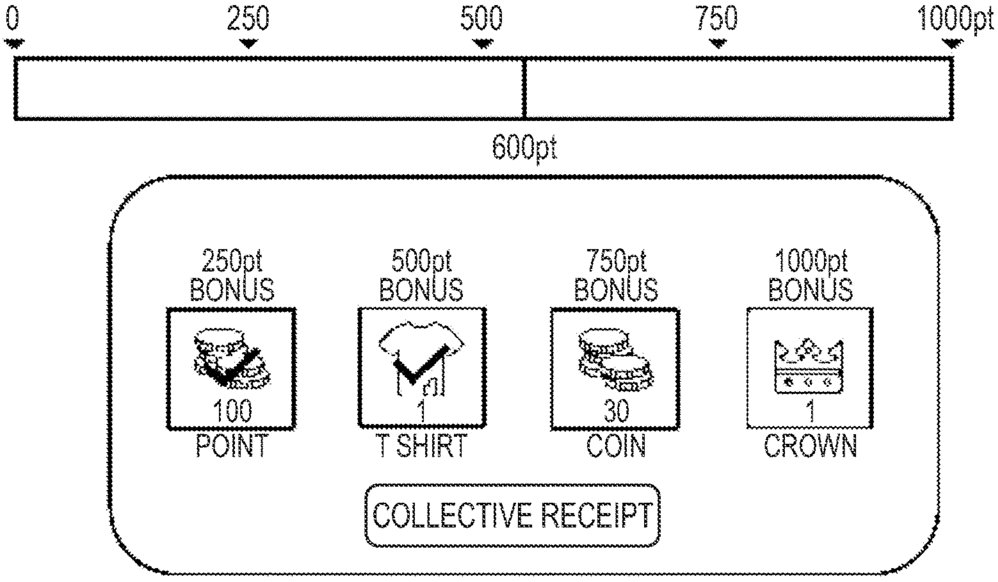
FIG. 29 is a conceptual diagram showing an example of a display aspect of a first parameter in this disclosure.

In FIGS. 28 and 29, the upper limit value of the first parameter is 1000 pt, and 250 pt, 500 pt, and 750 pt are set as intermediate achievement values.

In FIGS. 28 and 29, the current value of the first parameter of the first user is 600 pt, and the position corresponding to 60% when the whole is 100% is shown.

Also, as shown in FIGS. 28 and 29, rewards given for each of a plurality of achievement values may be displayed.

Also, a completed reward may be given according to an operation by the first user, or the completed reward may be given without depending on the first user's operation.

In addition, the rewards that have already been given may be displayed in a way that makes it clear that they have been given (with a check mark as an example).

Figure 30:
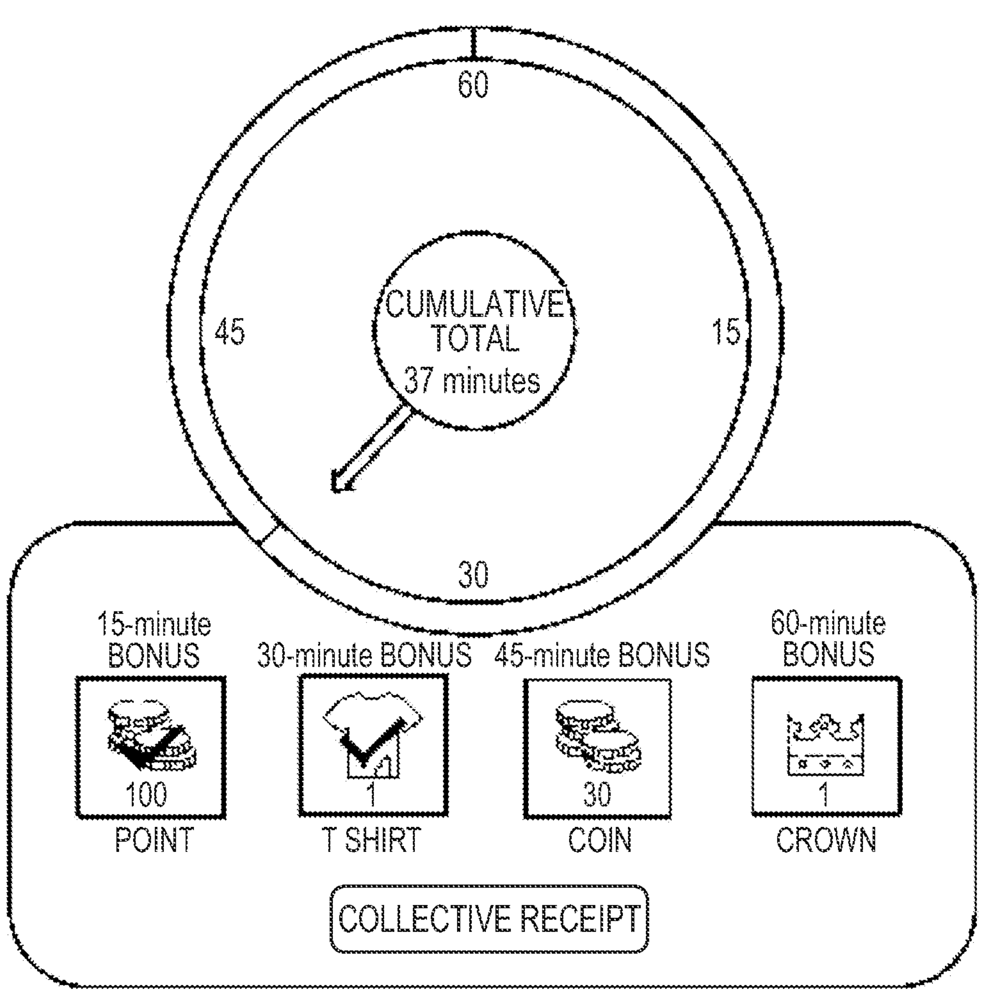
FIG. 30 is a conceptual diagram showing an example of a display aspect of a first parameter in this disclosure.

In addition, as shown in FIG. 30, the graph display also includes a mode in which the value of the first parameter is set to minutes and the hand of a clock points to the value of the first parameter.

Furthermore, the display portion 460 may display a speedometer indicating the speed of increase of the first parameter in the first video in which the first character object associated with the first user is displayed.

Such a speedometer may be always displayed on the screen regardless of the state of the first user terminal 100, or may appear on the screen when the ratio of increase of the first parameter is increasing (for example, during video distribution or during viewing).

According to these configurations, the increasing state and insufficient state of the first parameter are visually easy to understand, and the user's willingness to achieve can be improved.

The configuration of this application described above can also be applied to games, such as medal games in online games, in which the amount of medals wagered multiplied by a specific coefficient is awarded as a reward.

At this time, the specific coefficient may be used as the value of the first parameter, and the ratio of increase of the specific coefficient may be changed according to the state of the first user terminal 100.

In addition, the configuration of this application can also be applied when a medal game is played during video distribution.

At this time, a specific coefficient may be used as the value of the first parameter, and the increase ratio of the specific coefficient may be changed according to the distribution state as described above.

Next, an example will be described in which the above-described configuration is applied to a distribution battle in which two or more distributors compete for points acquired during distribution.

At this time, one or more computer processors in this embodiment can further include an association portion 470, a first calculator 480, a second calculator 490, and a comparison portion 495, as shown in FIG. 27.

The association portion 470 associates the first user and the second user by selection from at least one of them, or automatically.

Both the first user and the second user are users who are in the process of distribution (distributing users) or users before distribution (online users, viewing users, and the like).

Then, it is assumed that the first user terminal 100 displays a selection screen for selecting the second user.

Such a selection screen may be one that allows transition from the distribution setting screen D20 before distribution, or one that allows transition from the second user's distribution screen.

Also, the second user can be specified (designated) by the first user's selection from among multiple users presented under a predetermined condition(s).

The predetermined conditions include, but are not limited to, being in a mutual follow relationship with the first user, being followed by the first user, being a follower of the first user, being online, and waiting to be designated.

Alternatively, the second user may be automatically designated (matched) by one user presented according to a predetermined condition.

The predetermined condition includes, but is not limited to, being in a mutual follow relationship with the first user, being followed by the first user, being a follower of the first user, being online, and waiting to be designated.

Also, the association portion 470 may associate a first user and a second user belonging to the same rank range, either automatically or through a selection from at least one of them.

This is an example in which the above-described predetermined conditions are in the same rank range. The rank here refers to the classification of users based on the number of followers, distribution time, number of distribution points acquired in the past, and the like. The distribution points are a value calculated by multiplying the value of the gift×the number of gifts×a coefficient.

Then, although the first user and the second user are associated with each other, their respective character objects are used to distribute videos.

The first calculator 480 increases or decreases the first parameter based on actions from the first user terminal 100 and/or another user terminal(s) different from the first user terminal 100 in the first video in which the first character object associated with the first user is displayed.

Actions from the first user terminal 100 include, for example, distributing a video, turning a gacha during distribution of a video, posting a comment during distribution of a video, and the like.

Actions from another user terminal(s) different from the first user terminal 100 are actions from a viewing user terminal(s) of a viewing user(s) who views the first video. Actions include, for example, posting a gift, posting a comment, and the like.

Increasing or decreasing the first parameter based on these actions includes, for example, increasing or decreasing the first parameter based on the distribution time, the number of times the gacha turned, the number of comments posted, the number of gifts posted for each predetermined value, and the like.

Although the first parameter is basically increased, it may be decreased as an exception. Such exceptions are described below.

The second calculator 490 increases or decreases the second parameter associated with the second user terminal based on actions from the second user terminal 200 and/or another user terminal(s) different from the second user terminal 200 in the second video in which the second character object associated with the second user is displayed.

Actions from the second user terminal 200 include, for example, distributing a video, turning a gacha while distributing a video, and posting a comment while distributing a video.

Actions from another user terminal(s) different from the first user terminal 200 are actions from the viewing user terminal(s) of a viewing user(s) who views the second video. Actions include, for example, posting a gift, posting a comment, and the like.

Increasing or decreasing the second parameter based on these actions includes, for example, increasing or decreasing the second parameter based on the distribution time, the number of times the gacha turned, the number of comments posted, the number of gifts posted for each predetermined value, and the like.

Although the second parameter is basically increased, it may be decreased as an exception. Such exceptions are described below.

The comparison portion 495 compares the first parameter calculated by the first calculator 480 and the second parameter calculated by the second calculator 490.

Then, the reward-association portion 450 associates a predetermined reward with the first user and/or the second user according to the result of the comparison portion 495.

Specifically, the reward-association portion 450 associates the predetermined reward with the user with the larger parameter as a result of the comparison portion 495.

Thus, in the distribution battle, it is possible to compete with the specified opponent for points acquired during distribution and obtain rewards.

The comparison portion 495 can perform the comparison at a timing after a predetermined time has elapsed since the association portion 470 associated the first user and the second user.

The predetermined time can be, for example, 15 minutes or 30 minutes or the like, but the specific numerical value is not limited.

Thus, the timing of the comparison is not limited to after the end of distribution, but also includes during distribution.

The initial value and final value of the parameter to be compared may be determined by the first user and/or the second user specifying the period (start time and end time).

The display portion 460 can display the second parameter in the first video.

Figure 31:
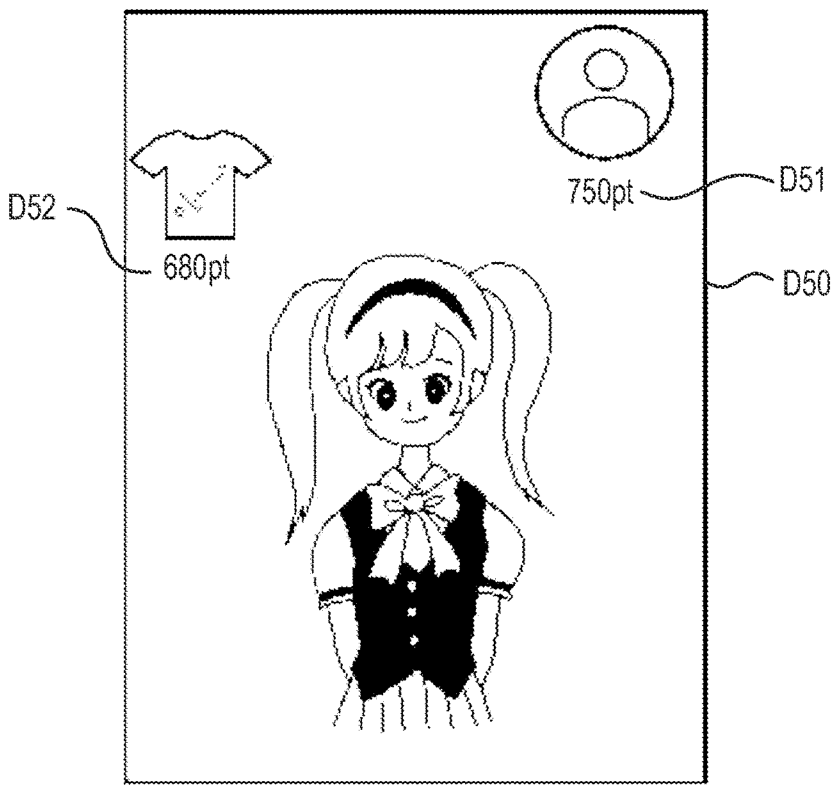
FIG. 31 is a conceptual diagram showing an image of a screen displayed on a user terminal.

FIG. 31 is an image diagram showing an example in which a second parameter D51 is displayed in a first video D50. A second user icon may be displayed in the vicinity of the second parameter D51.

At this time, the first parameter can be displayed together with an event icon, as indicated by reference numeral D52 in FIG. 31.

The display portion 460 can also display a second video D60 in the first video D50.

Figure 32:
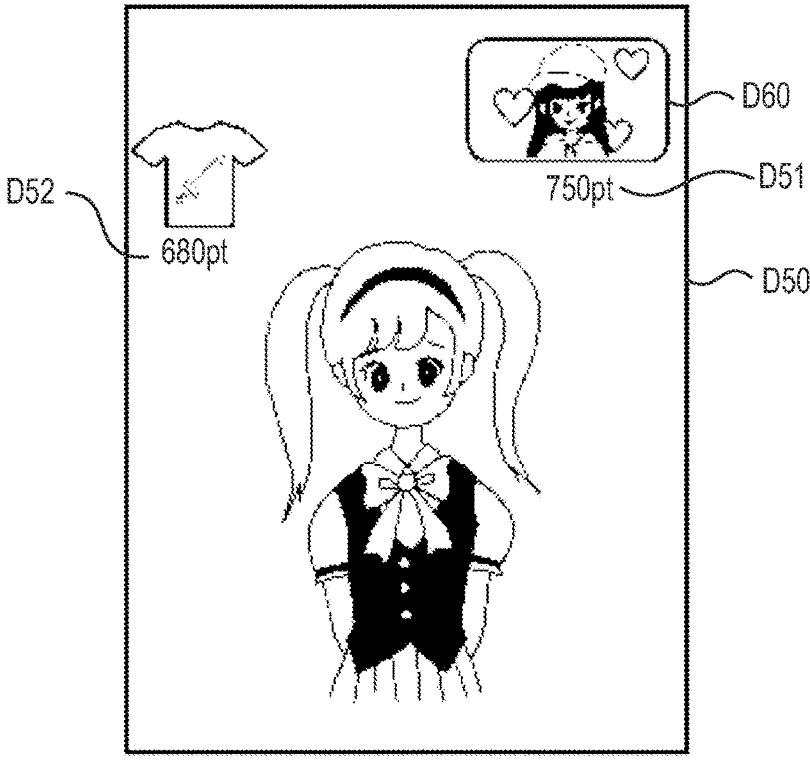
FIG. 32 is a conceptual diagram showing an image of a screen displayed on a user terminal.

FIG. 32 is an image diagram showing an example in which the second video D60 is displayed in the first video D50.

Thus, the first user and a viewing user of the first video can confirm the video and/or the second parameter of the second user who is the opponent during distribution/viewing of the video.

Similarly, in the second video viewed by the second user and a viewing user of the second video, a video and/or the first parameter of the first user who is the opponent can be displayed.

The display portion 460 can further display the first parameter and the second parameter in the first video as a horizontal bar chart.

Figure 33:
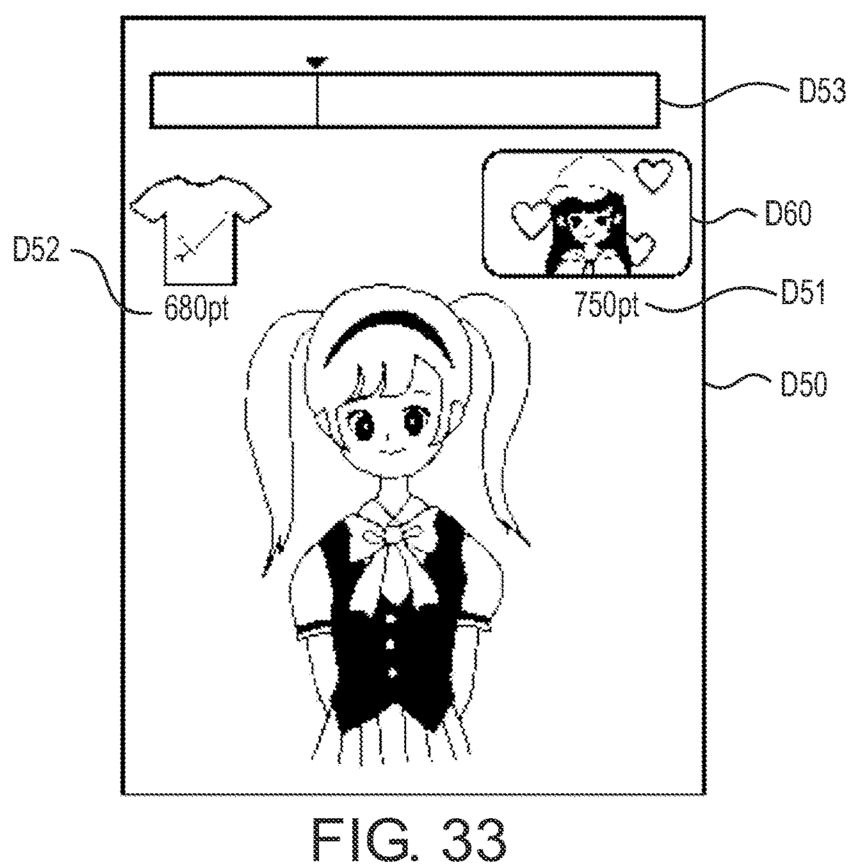
FIG. 33 is a conceptual diagram showing an image of a screen displayed on a user terminal.

FIG. 33 is an image diagram showing an example of a horizontal bar chart D53. At this time, the central position of the horizontal bar chart is the position in which the first parameter and the second parameter are equal, and by shifting the boundary left or right from this position, it is possible to compare the magnitudes of the parameters of both users.

In FIG. 33, the left side of the horizontal bar chart D53 indicates the first parameter (680 pt), the right side of the horizontal bar chart D53 indicates the second parameter (750 pt), and the boundary is shown closer to the left than the center position.

Thus, by visualizing and displaying the competitive state of the parameters of both users, it is possible to increase the willingness of the first user, the second user, and other users to perform actions to increase or decrease the parameters.

When a viewing user associated as a viewing user of the first video has selected the second video D60 displayed in the first video D50, the association portion 470 can associate the viewing user as a viewing user of the second video D60.

The selection of the second video D60 also includes the selection of the second parameter D51 displayed in the first video D50.

Thus, the viewing user(s) of the first video or the second video can move back and forth between the videos, so the distributing users will strive to improve the quality of the content so as not to cause the viewing users to leave.

In addition, movement of the viewing user(s) includes not only the movement of the viewing user(s) in the sense of leaving a distributing user who is the source of the movement, but also the movement of the viewing user(s) in the sense of supporting a distributing user who is the source of the movement.

Specifically, viewing users can also give gifts that reduce a parameter, so they can move to reduce a parameter of the source distributing user.

Such gifts that reduce a parameter will be explained in detail.

The receiver 410 can receive a display request for a specific gift for the first video from a viewing user terminal.

At this time, the display portion 460 displays the specific gift object corresponding to the specific gift in the first video in response to the display request for the specific gift, and reduces the first parameter according to the specific gift.

In addition, the display portion 460 may further display a specific gift object in the second video in response to a display request for a specific gift, and increase the second parameter in response to the specific gift.

By setting the decrease value of the first parameter and the increase value of the second parameter to the same value, it is possible to create a configuration in which the parameter value is transferred from the first user to the second user, that is, a configuration in which the second user steals the parameter value from the first user.

Figure 34:
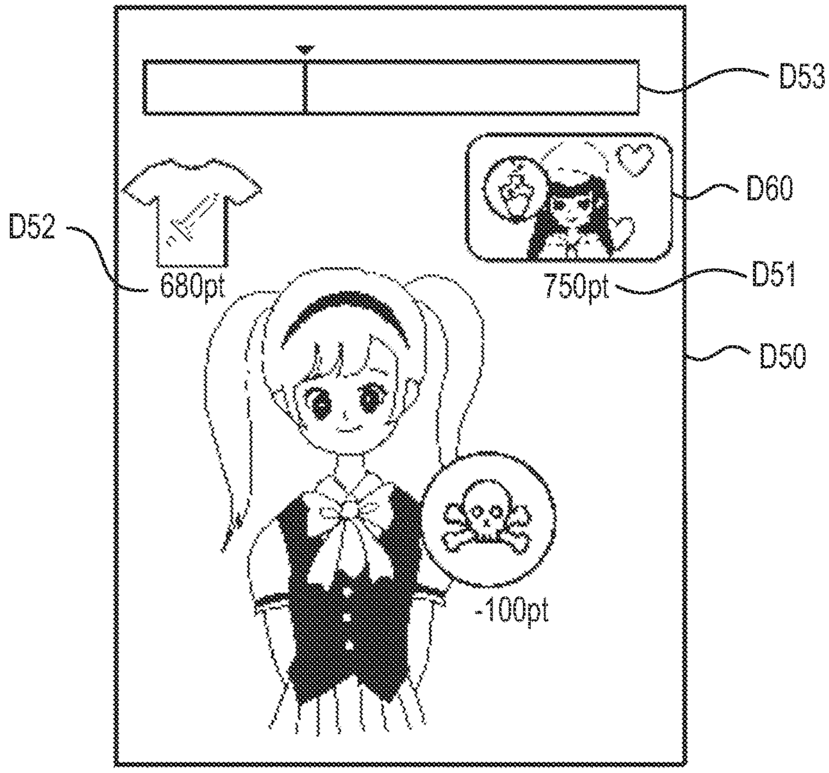
FIG. 34 is a conceptual diagram showing an image of a screen displayed on a user terminal.
Figure 35:
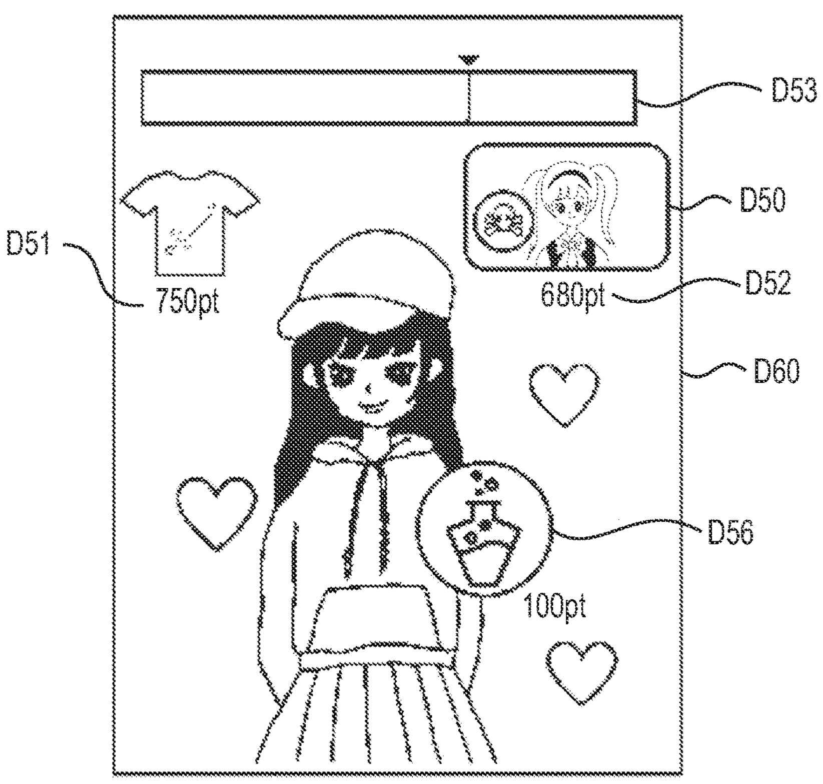
FIG. 35 is a conceptual diagram showing an image of a screen displayed on a user terminal.

FIGS. 34 and 35 are image diagrams showing examples in which such specific gift objects D55 and D56 are displayed in the first video D50 and the second video D60.

As shown in the figures, the specific gift objects D55 and D56 may be displayed in different modes in the first video and the second video. In addition, an increase/decrease value may be displayed together with the gift objects D55 and D56.

The reward can be an item that can be attached to the first character object associated with the first user terminal 100 or the second character object associated with the second user terminal 200, or can be a predetermined production effect displayed on the first or second video.

According to the above-described configuration, the interaction with other users in the video is activated, the entertainment value of the video is improved, and the quality is also improved.

Next, an example will be described in which the above-described configuration is applied to a collaborative video in which two or more character objects appear in one video during distribution.

At this time, the above-described first calculator 480 increases or decreases the value of the first parameter based on actions from the first user terminal 100 and/or another user terminal(s) different from the first user terminal 100 in a first video in which a first character object associated with a first user and a third character object(s) associated with a third user(s) are displayed.

At this time, the change portion 440 changes the ratio of increase of the value of the first parameter to a third ratio according to the number of first character objects and the number of third character objects.

The third ratio can be varied according to the relationship between the first user and the third user.

As an example, the relationship between the first user and the third user can be determined based on the follow status of the first user and the third user. For example, when the first user and the third user are in a mutual follow relationship, the third ratio may be made larger than in the case of a non-follow relationship.

As another example, the relationship between the first user and the third user can be determined based on the rank tier to which the users belong. For example, when the first user and the third user belong to different rank tiers, the third ratio may be made larger than when they belong to the same rank tier.

According to the above configuration, interaction with other users in the video is activated, the entertainment value of the video is improved, and the quality is also improved.

Figure 36:
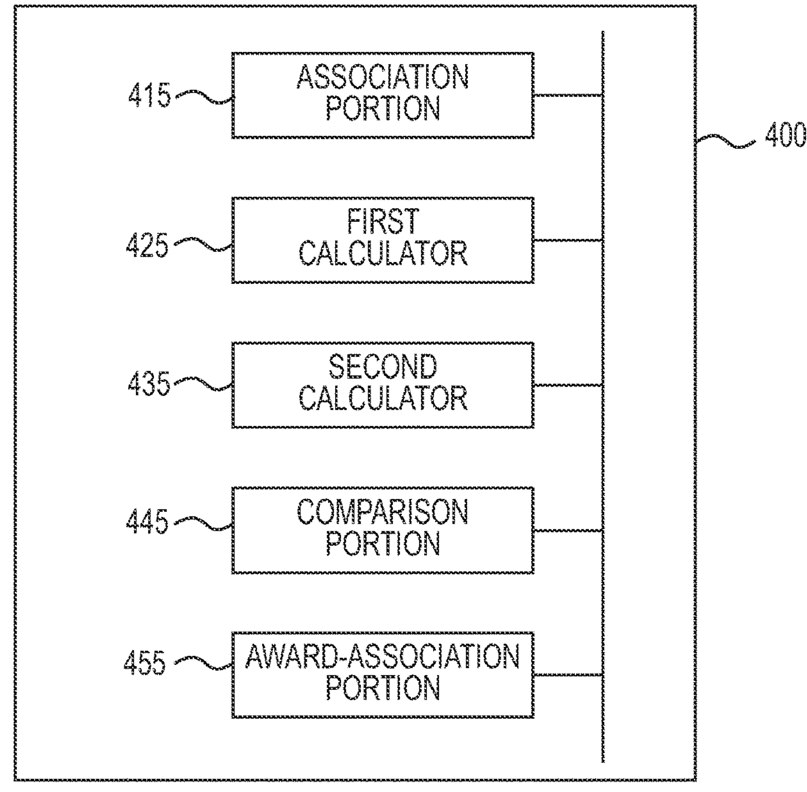
FIG. 36 is a configuration diagram showing an example of a functional configuration of a server device in another embodiment of this disclosure.
Figure 37:
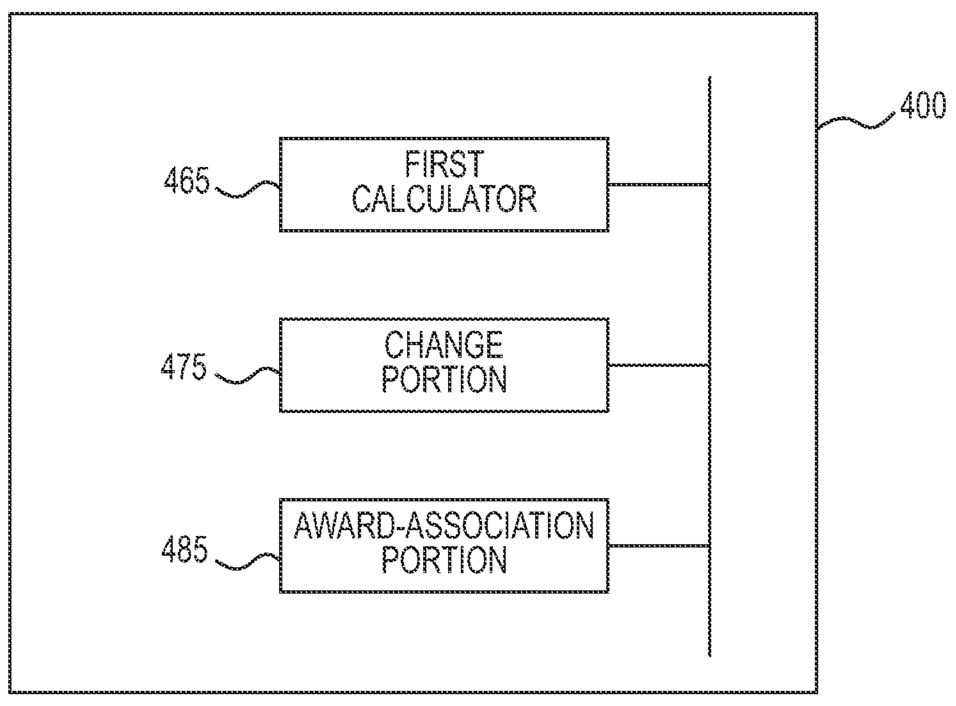
FIG. 37 is a configuration diagram showing an example of a functional configuration of a server device in another embodiment of this disclosure.

The distribution battle and collaborative video described above can also be implemented as independent embodiments as shown in FIGS. 36 and 37.

In the case in which the distribution battle is an independent embodiment, as shown in FIG. 36, one or more computer processors included in an information processing system that provides a virtual space in which a user's character object can be displayed may include an association portion 415, a first calculator 425, a second calculator 435, a comparison portion 445, and a reward-association portion 455.

The association portion 415 associates the first user terminal 100 of the first user and the second user terminal 200 of the second user by selection from at least one of them, or automatically.

The first calculator 425 increases or decreases a first parameter associated with the first user terminal 100 based on actions from the first user terminal 100 and/or another user terminal(s) different from the first user terminal in a first video in which a first character object associated with the first user terminal 100 is displayed.

The second calculator 435 increases or decreases a second parameter associated with the second user terminal 200 based on actions from the second user terminal 200 and/or another user terminal(s) different from the second user terminal 200 in a second video in which a second character object associated with the second user terminal 200 is displayed.

The comparison portion 445 compares the first parameter calculated by the first calculator 425 and the second parameter calculated by the second calculator 435.

The reward-association portion 455 associates a predetermined reward with the first user terminal 100 and/or the second user terminal 200 according to the result of the comparison portion 445.

For the configuration of each of these units, the configurations can be adopted that were explained in the above-described association portion 470, first calculator 480, second calculator 490, comparison portion 495, and reward-association portion 450.

According to the above configuration, interaction with other users in the video is activated, the entertainment value of the video is improved, and the quality is also improved.

In the case in which the collaborative distribution is an independent embodiment, as shown in FIG. 37, one or more computer processors included in an information processing system that provides a virtual space in which a user's character object can be displayed may include a first calculator 465, a change portion 475, and a reward-association portion 485.

The first calculator 465 increases or decreases a first parameter associated with the first user terminal 100 based on actions from the first user terminal 100 and/or another user terminal(s) different from the first user terminal in a first video in which a first character object associated with the first user terminal 100 is displayed.

The change portion 475 changes the ratio of increase of the value of the first parameter according to the number of other character objects associated with other user terminals different from the first user terminal 100.

The reward-association portion 485 associates a predetermined reward with the first user terminal 100 according to the value of the first parameter increased by the increase ratio changed by the change portion 475.

For the configuration of each of these units, the configurations can be adopted that was explained in the above-described association portion 470, the first calculator 480, the change portion 440, and the reward-association portion 450

According to the above configuration, interaction with other users in the video is activated, the entertainment value of the video is improved, and the quality is also improved.

Next, an information processing method according to an embodiment of this disclosure will be described.

Figure 38:
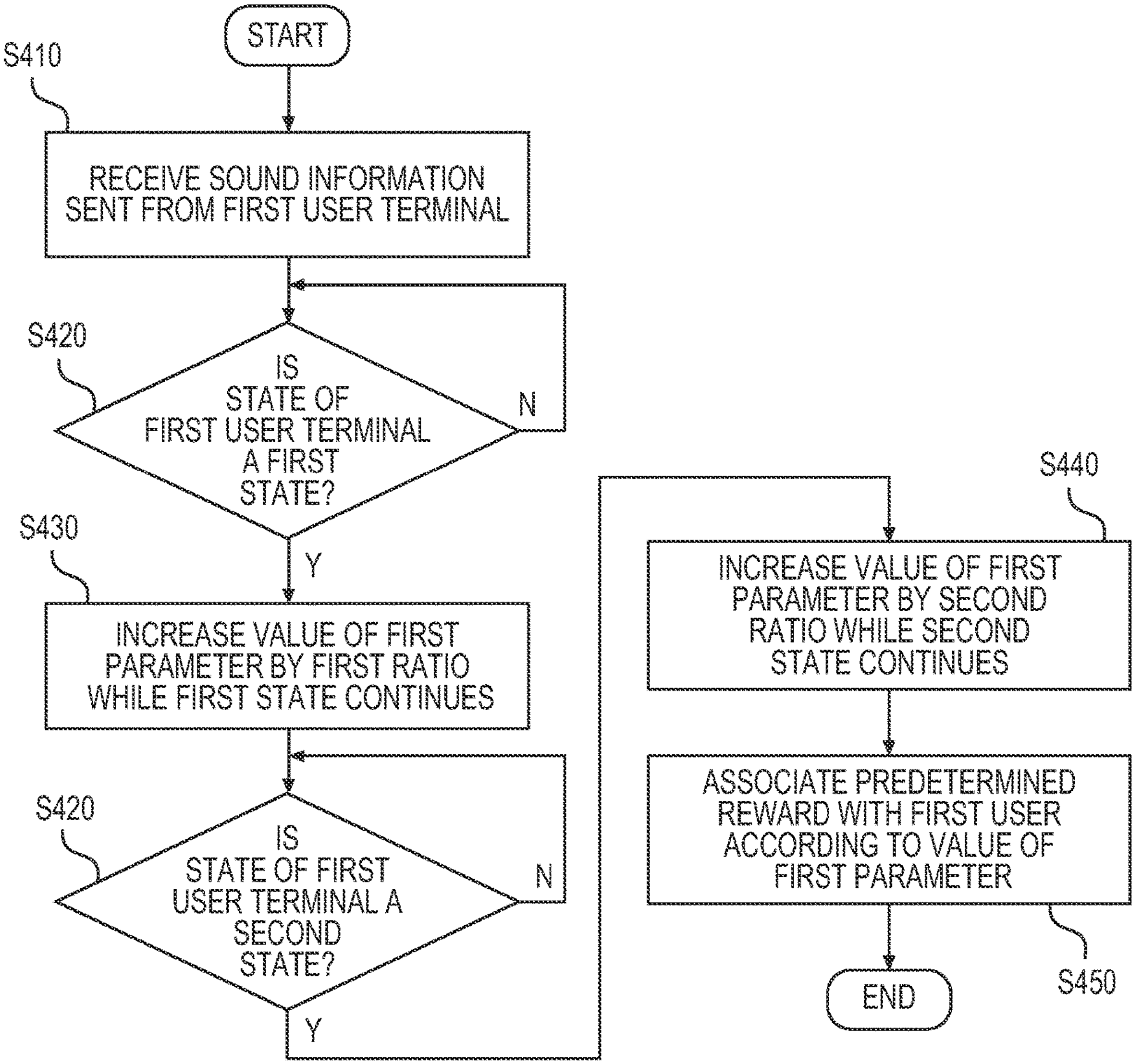
FIG. 38 is a flow diagram showing an example of a flow of an information processing method in this disclosure.

An information processing method in an embodiment of this disclosure, as shown in FIG. 38, causes one or more computer processors included in an information processing system that provides a virtual space in which a user's character object can be displayed to execute a reception step S410, a determination step S420, an increase step S430, a change step S440, and a reward-association step S450.

The reception step S410 receives information sent from the first user terminal 100 of the first user.

The reception step S410 can be executed by the receiver 410 described above.

The reception step S410 can be executed at the server side (server device 400).

The determination step S420 determines the state of the first user terminal 100 based on the information received in the reception step S410.

The determination step S420 can be executed by the determination portion 420 described above.

The determination step S420 can be executed at the server side (server device 400).

When it is determined that the state of the first user terminal 100 is a first state in the determination step S420, while the first state continues, the increase step S430 increases the value of the first parameter associated with the user by a first ratio.

The increase step S430 can be executed by the increase portion 430 described above.

The increase step S430 may be executed at the server side (server device 400) or may be executed at the client side (first user terminal 100).

In the change step S440, when it is determined in the determining step S420 that the state of the first user terminal 100 has changed from the first state to a second state, while the second state continues, the ratio at which the value of the first parameter is increased is changed to a second ratio.

The change step S440 can be executed by the change portion 440 described above.

The change step S440 may be executed at the server side (server device 400) or may be executed at the client side (first user terminal 100/second user terminal 200).

The reward-association step S450 associates a predetermined reward with the first user according to the value of the first parameter.

The reward-association step S450 can be executed by the reward-association portion 450 described above.

The reward-association step S450 may be executed at the server side (server device 400) or may be executed at the client side (first user terminal 100/second user terminal 200).

The above-described configuration provides a technical improvement that solves or alleviates at least part of the problem of the conventional technology described above.

Next, a computer program according to an embodiment of this disclosure will be described.

A computer program according to an embodiment of this disclosure can be executed in an information processing system 3000 that provides a virtual space in which a user's character object can be displayed.

A computer program according to this disclosure causes one or more computer processors included in the information processing system 3000 to implement a reception function, a determination function, an increase function, a change function, and a reward-association function.

The reception function receives information sent from the first user terminal 100 of the first user.

The determination function determines the state of the first user terminal 100 based on the information received by the reception function.

When it is determined by the determination function that the state of the first user terminal 100 is a first state, while the first state continues, the increase function increases the value of the first parameter associated with the user by a first ratio.

When it is determined by determination function that the state of the first user terminal has changed from the first state to the second state, while the second state continues, the change function changes the ratio at which the value of the first parameter is increased to a second ratio.

The reward-association function associates a predetermined reward with the first user according to the value of the first parameter.

Figure 39:
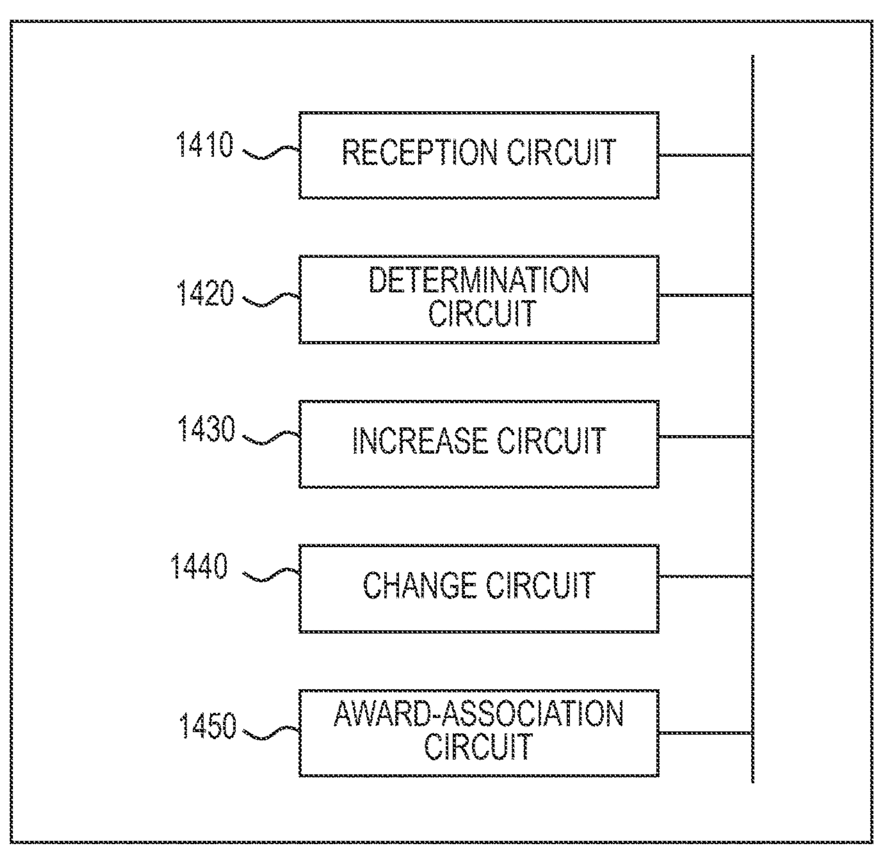
FIG. 39 is a circuit configuration diagram showing an example of a circuit configuration for realizing a computer program in this disclosure.

The above-described functions can be realized by a reception circuit 1410, a determination circuit 1420, an increase circuit 1430, a change circuit 1440, and a reward-association circuit 1450 shown in FIG. 39. The reception circuit 1410, the determination circuit 1420, the increase circuit 1430, the change circuit 1440, and the reward-association circuit 1450 are realized by the receiver 410, the determination portion 420, the increase portion 430, the change portion 440, and the reward-association portion 450 described above, respectively. The details of each part are as described above.

Next, an information processing device according to an embodiment of this disclosure will be described. The information processing device corresponds to the first user terminal 100 in the information processing system 3000 described above.

Figure 40:
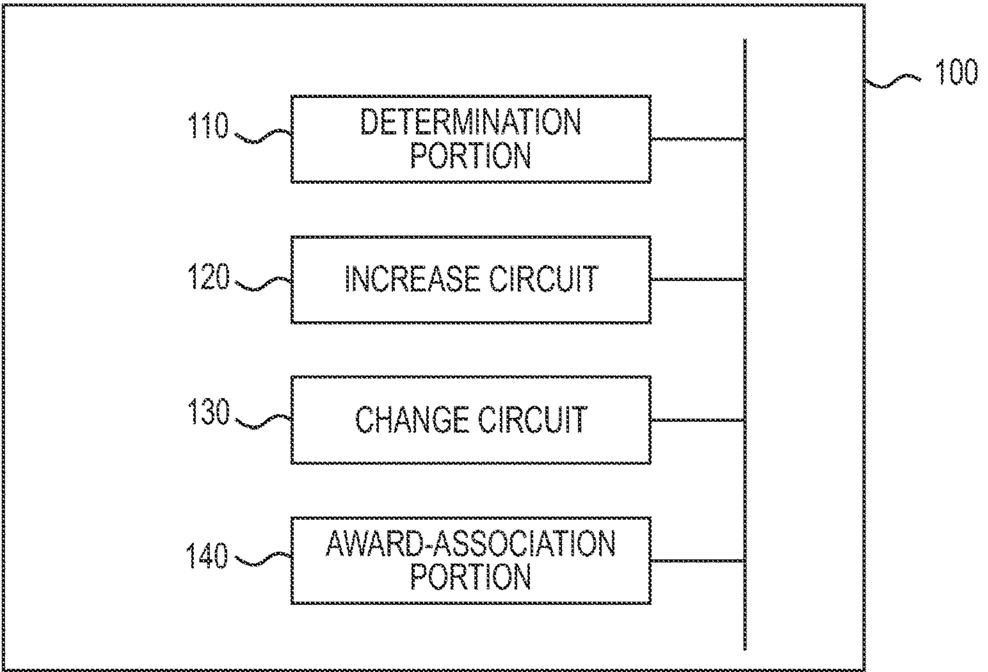
FIG. 40 is a configuration diagram showing an example of a functional configuration of a first user terminal in this disclosure.

The information processing device is an information processing device that includes one or more computer processors, and the one or more computer processors include a determination portion 110, an increase portion 120, a change portion 130, and a reward-association portion 140, as shown in FIG. 40.

The determination portion 110 determines the state of the information processing device.

The determination portion 110 can have the same configuration as the determination portion 420 described above.

When it is determined by the determination portion 110 that the state of the information processing device is a first state, the increase portion 120 increases the value of a first parameter associated with a user by a first ratio while the first state continues.

The increase portion 120 can have the same configuration as the increase portion 430 described above.

When it is determined by the determination portion 110 that the state of the information processing device has changed from the first state to a second state, while the second state continues, the change portion 130 changes the ratio at which the value of the first parameter is increased to a second ratio.

The change portion 130 can have the same configuration as the change portion 440 described above.

The reward-association portion 140 associates a predetermined reward with the first user according to the value of the first parameter.

The reward-association portion 140 can have the same configuration as the reward-association portion 450 described above.

The above-described configuration provides a technical improvement that solves or alleviates at least part of the problem of the conventional technology described above.

Next, an example of an information processing method according to an embodiment of this disclosure will be described. This information processing method is an information processing method executed in the information processing device (first user terminal 100) described above.

Figure 41:
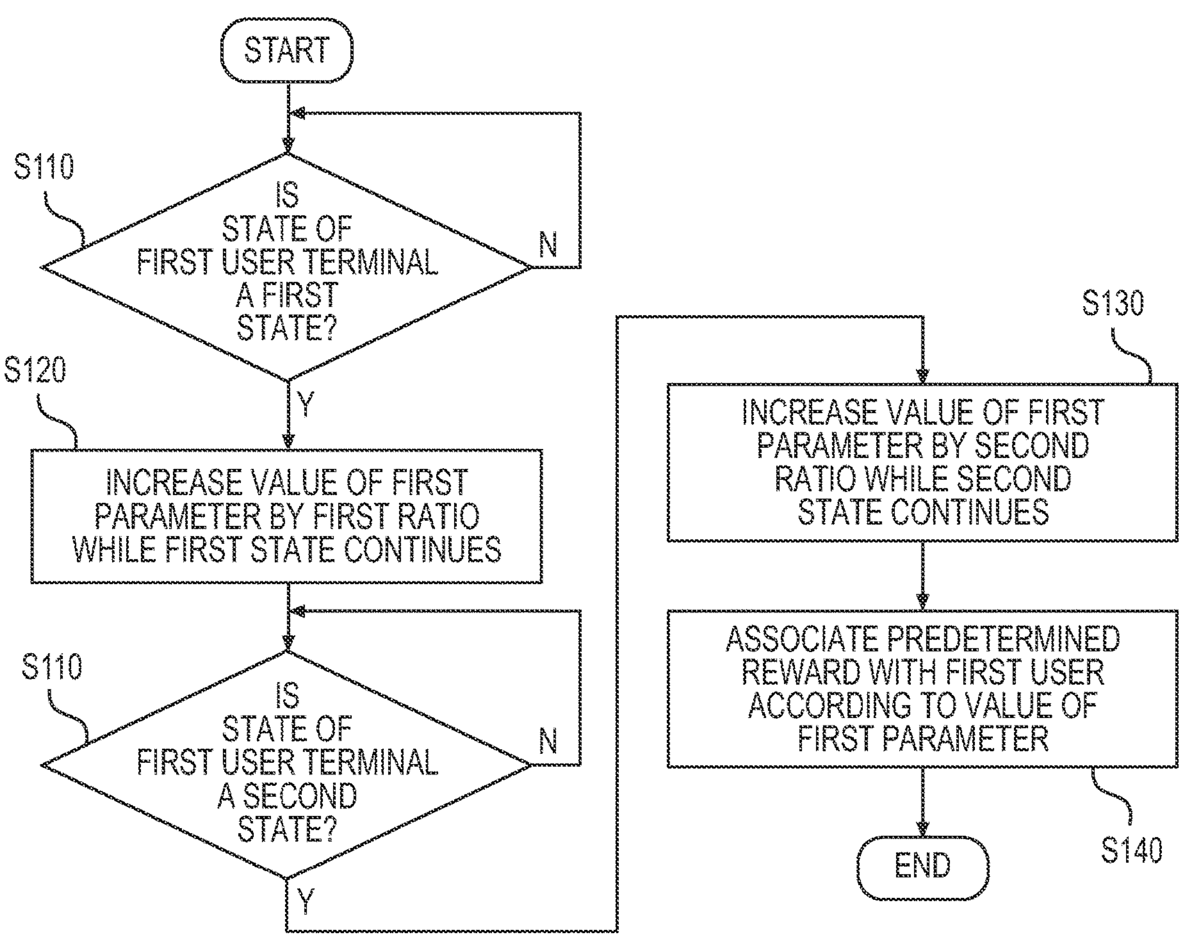
FIG. 41 is a flow diagram showing an example of a flow of an information processing method in a first user terminal in this disclosure.

The information processing method according to this disclosure, as shown in FIG. 41 as an example, causes one or more computer processors included in the information processing device to execute a determination step S110, an increase step S120, a change step S130, and a reward-association step S140.

The determination step S110 determines the state of the information processing device. The determination step S110 can be executed by the determination portion 110 described above.

When it is determined in the determination step S110 that the state of the information processing device is in a first state, in the increase step S120, the value of a first parameter associated with a user is increased by a first ratio while the first state continues. The increase step S120 can be performed by the increase portion 120 described above.

In the change step S130, when it is determined in the determination step S110 that the state of the information processing device has changed from the first state to a second state, while the second state continues, the ratio at which the value of the first parameter is increased is changed to a second ratio. The change step S130 can be performed by the change portion 130 described above.

The reward-association step S140 associates a predetermined reward with the first user according to the value of the first parameter. The reward-association step S140 can be performed by the reward-association portion 140 described above.

The above-described configuration provides a technical improvement that solves or alleviates at least part of the problem of the conventional technology described above.

Next, a computer program according to an embodiment of this disclosure will be described. Such a computer program is a computer program executed in the information processing device (first user terminal 100) described above.

A computer program according to this disclosure causes one or a plurality of processors included in an information processing device to realize a determination function, an increase function, a change function, and a reward-association function.

The determination function determines the state of the information processing device.

When it is determined by the determination function that the state of the information processing device is a first state, while the first state continues, the increase function increases the value of a first parameter associated with a user by a first ratio.

When it is determined by the determination function that the state of the information processing device has changed from the first state to a second state, while the second state continues, the change function changes the ratio at which the value of the first parameter is increased to the second ratio.

The reward-association function associates a predetermined reward with the first user according to the value of the first parameter.

Figure 42:
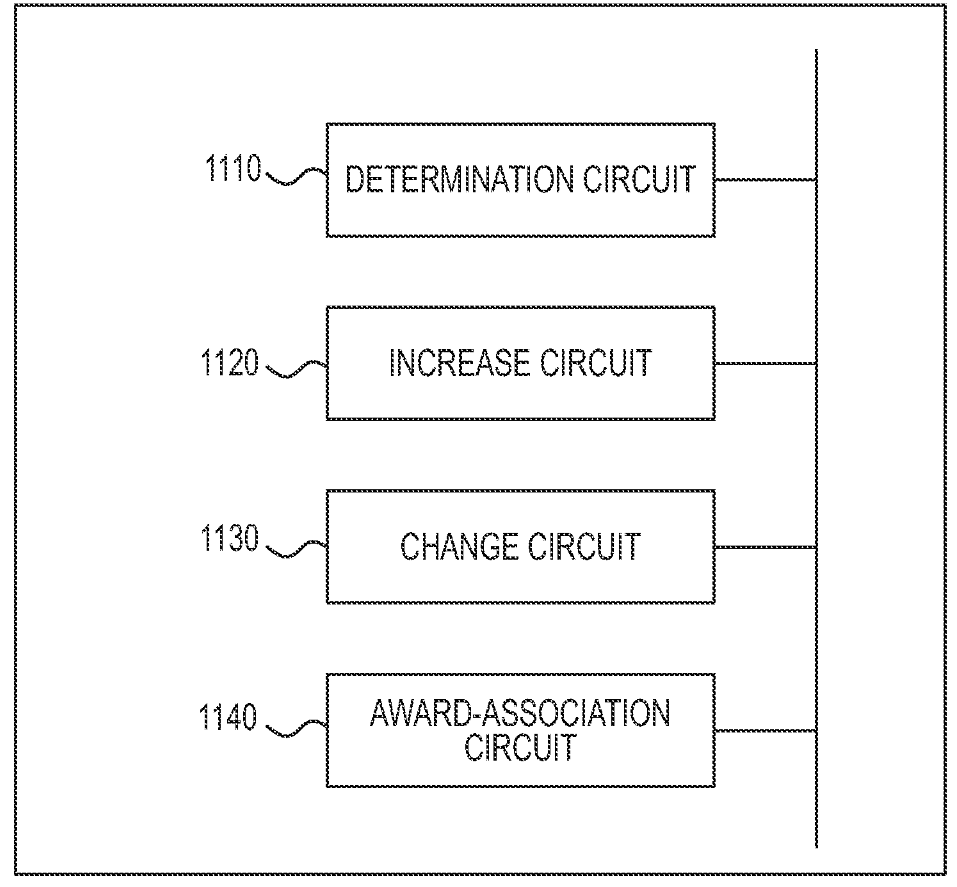
FIG. 42 is a circuit configuration diagram showing an example of a circuit configuration for realizing a computer program executed by a first user terminal in this disclosure.

The above-described functions can be realized by a determination circuit 1110, an increase circuit 1120, a change circuit 1130, and a reward-association circuit 1140 shown in FIG. 42. The determination circuit 1110, the increase circuit 1120, the change circuit 1130, and the reward-association circuit 1140 are realized by the determination portion 110, the increase portion 120, the change portion 130, and the reward-association portion 140 described above, respectively. The details of each part are as described above.

Further, an information processing device such as a computer or a mobile phone can be preferably used to function as the server device or the terminal device according to the above-described embodiments. Such an information processing device can be realized by storing a program describing processing details for realizing each function of the server device or terminal device according to an embodiment in a storage portion of the information processing device, and reading and executing the program by the CPU of the information processing device.

Figure 43:
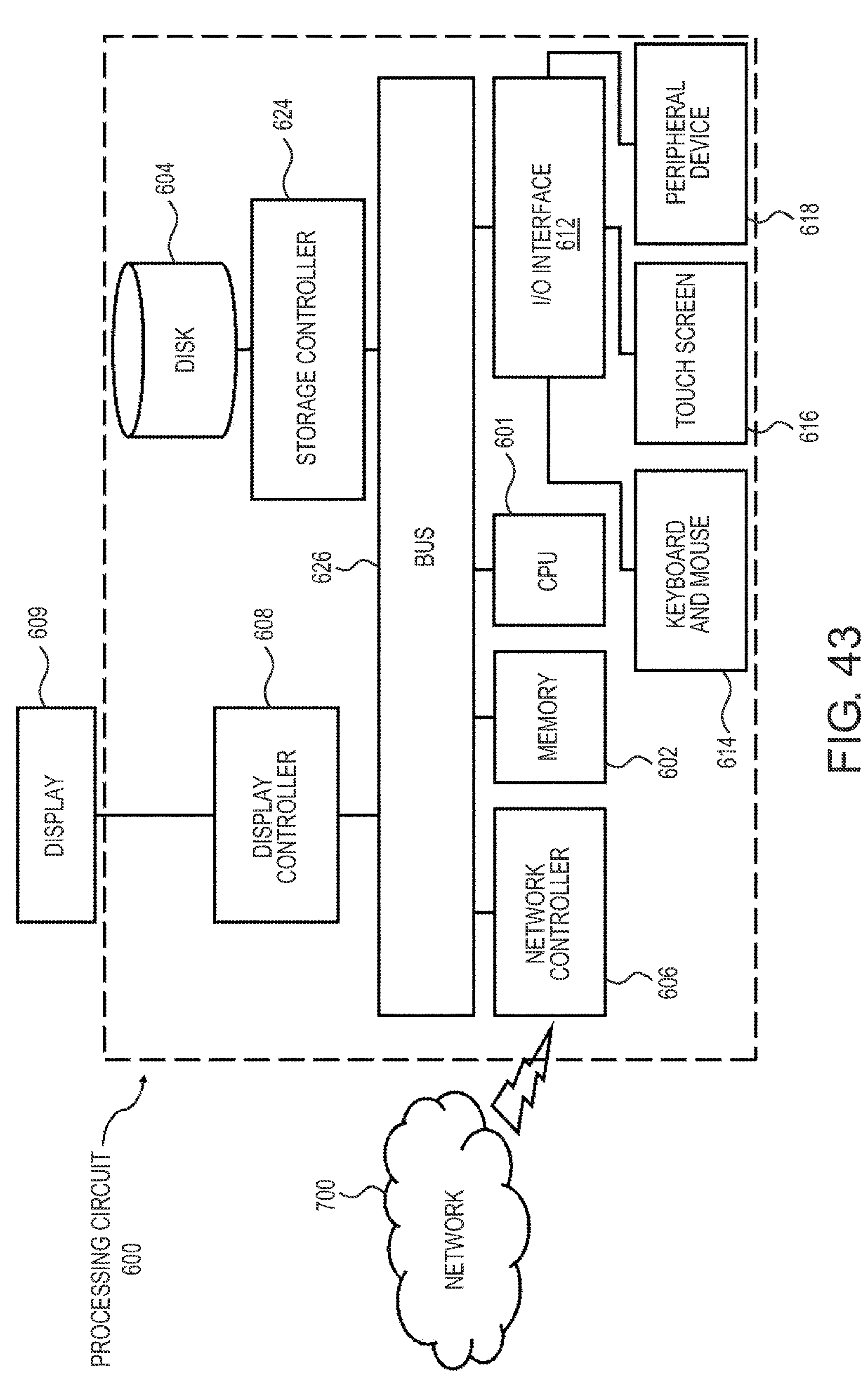
FIG. 43 is a block diagram of a processing circuit that executes computer-based operations in this disclosure.

FIG. 43 is a block diagram of processing circuitry for performing computer-based operations in accordance with this disclosure. FIG. 43 shows a processing circuit 600, which corresponds to a CPU of the terminal(s) and device(s) in this disclosure.

The processing circuit 600 can be used to control any computer-based or cloud-based control process, and the flowchart descriptions or blocks can be understood as expressing modules, segments or portions of one or more executable commands for implementing specific logical functions or steps within the process, and alternative implementations are included within the exemplary embodiments of this advancement in which the function may be executed. The order from that shown or discussed includes substantially the same or the reverse order depending on the functionality involved, as will be understood by one skilled in the art. The functionality of the elements disclosed herein can be implemented using processing circuits or circuits including general purpose processors, special purpose processors, integrated circuits, ASICs ("Application Specific Integrated Circuits"), conventional circuits configured or programmed to perform the disclosed functions, and/or combinations thereof. A processor processes circuits or circuits that include transistors and other circuits therewithin. The processor may be a processor programmed to execute programs stored in memory. In this disclosure, processing circuits, units, and means are hardware that performs or is programmed to perform the enumerated functions. The hardware can be any hardware disclosed herein or any commonly known hardware that is otherwise programmed or configured to perform the enumerated functions.

In FIG. 43, the processing circuit 600 includes a CPU 601 that executes one or more of the control processes discussed in this disclosure. Process data and instructions may be stored in a memory 602. These processes and instructions may also be stored on a storage medium disk 604, such as a hard drive (HDD) or portable storage medium, or may be stored remotely. Furthermore, the advancement(s) recited in the scope of the claims is not limited by the form of computer-readable media on which the instructions of the process are stored. For example, the instructions may be stored on a CD, DVD, flash memory RAM, ROM, PROM, EPROM, EEPROM, hard disk, or any other non-transitory computer-readable medium in an information processing device with which the processing circuit 600 communicates, such as a server or computer. The processes may also be stored in network-based storage, cloud-based storage, or other mobile-accessible storage and executable by the processing circuit 600.

Further, the claimed advancement may be provided as a utility application, a background daemon, or an operating system component, or as a combination thereof, and can be executed along with the CPU 601 and an operating system such as Microsoft Windows, UNIX, Solaris, LINUX, Apple MAC-OS, Apple iOS and other systems known to those skilled in the art.

The hardware elements for realizing the processing circuit 600 may be realized by various circuit elements. In addition, each function of the above-described embodiment may be realized by a circuit including one or more processing circuits. The processing circuits include a specially programmed processor, such as the processor (CPU) 601 shown in FIG. 43. The processing circuits also include devices such as application specific integrated circuits (ASICs) and conventional circuit components arranged to perform the enumerated functions.

Alternatively, or additionally, the CPU 601 may be implemented on an FPGA, ASIC, or PLD, or using discrete logic circuits, as will be appreciated by those skilled in the art. Also, the CPU 601 may be realized as a plurality of processors operating in parallel and in cooperation to execute the above-described instructions of the processes of this disclosure.

The processing circuit 600 of FIG. 43 also includes a network controller 606 such as an Ethernet PRO network interface card for interfacing with the network 700. As can be appreciated, the network 700 can be a public network such as the Internet, or a private network such as a local area network (LAN) or wide area network (WAN), or any combination thereof, and may also include a public switched telephone network (PSTN) or integrated services digital network (ISDN) sub-networks. The network 700 can also be wired, such as an Ethernet network, a Universal Serial Bus (USB) cable, or the like, or wireless, such as a cellular network including EDGE, 3G and 4G wireless cellular systems. The wireless network can also be Wi-Fi, wireless LAN, Bluetooth, or any other form of wireless communication known. Additionally, the network controller 606 may comply with other direct communication standards such as Bluetooth, Near Field Communication (NFC), infrared or others.

The processing circuit 600 further includes a display controller 608, such as a graphics card or graphics adapter, for interfacing with a display 609, such as a monitor. An I/O interface 612 interfaces with a keyboard and/or a mouse 614 and a touch screen panel 616 on or separate from the display 609. The I/O interface 612 also connects to various peripheral devices 618.

A storage controller 624 connects the storage media disk 604 with a communication bus 626, which may be ISA, EISA, VESA, PCI or similar, and which interconnects all components of the processing circuit 600. A description of the general features and functionality of the display 609, the keyboard and/or mouse 614, the display controller 608, the storage controller 624, the network controller 606, and the I/O interface 612, is omitted here for brevity because these features are commonly known.

The exemplary circuit elements described in the context of this disclosure may be replaced with other elements or may be of different construction than the examples provided herein. Further, circuits configured to perform the functions described in this specification may be implemented in multiple circuit units (e.g., chips), or the features may be combined in circuits on a single chipset.

The functions and features described herein may also be performed by various distributed components of the system. For example, one or more processors may perform these system functions, where the processors are distributed among a plurality of components communicating within a network. Distributed components can include one or more client and server machines that can share processing, as well as various human interfaces and communication devices (e.g., display monitors, smartphones, tablets, or personal digital assistants (PDAs)). The network may be a private network such as LAN or WAN, or a public network such as the Internet. Input to the system is received through direct user input and can be received remotely in real time or as a batch process. Moreover, some implementations may be performed on modules or hardware that are not identical to those described. Accordingly, other implementations are within the scope of what is claimed.

While several embodiments of the disclosure have been described, these embodiments are provided by way of example and are not intended to limit the scope of the disclosure. These novel embodiments can be implemented in various other forms, and various omissions, replacements, and modifications can be made without departing from the spirit of the disclosure. These embodiments and their modifications are included in the scope and gist of the disclosure, and are included in the scope of the embodiments described in the claims, and their equivalents.

Further, the methods described in the embodiments can be stored on a recording medium such as a magnetic disk (floppy (registered trademark) disk, hard disk, or the like), optical disc (CD-ROM, DVD, MO, or the like), semiconductor memory (ROM, RAM, flash memory, or the like), or the like, as programs that can be executed by a computer (computer), or can be sent and distributed via a communication medium. The programs stored on the medium include setting programs that configure, in the computer, software means (including not only executable programs but also tables and data structures) executed by the computer. A computer that realizes this device reads a program stored on a recording medium, and depending on the case, constructs software means by a setting program, and executes the above-described processes through operations controlled by the software means. The term "recording medium" as used herein is not limited to those for distribution, and includes storage media such as magnetic disks and semiconductor memory provided inside the computer or equipment connected via a network. A memory may function, for example, as a main memory device, an auxiliary memory device, or cache memory.

EXPLANATION OF SYMBOLS

100 First user terminal
200 Second user terminal
300 Network
400 Server device
410 Receiver
420 Determination portion
430 Increase portion
440 Change portion
450 Reward-association portion

The invention claimed is:

1. An information processing system that provides a virtual space comprising:

one or more processors programmed to:

receive information sent from a first user terminal of a first user, determine a state of the first user terminal based on the received information, in response to determining that the state of the first user terminal is a first state, increase a value of a first parameter associated with the first user by a first ratio while the first state continues, in response to determining that the state of the first user terminal has changed from the first state to a second state, change the first ratio to a second ratio such that the value of the first parameter is increased by the second ratio while the second state continues, and associate a predetermined reward with the first user according to the value of the first parameter, wherein the second state is either (i) a distribution state in which a first video is being distributed at the first user terminal, the first video including a first character object animated according to sensor data of tracked movement of the first user or (ii) a viewing state in which the first video is being viewed at the first user terminal, the first state is an active state in which an application for providing the virtual space is activated at the first user terminal, the first state not corresponding to either the distribution state or the viewing state, the first parameter continuously increases by the first ratio while the first state of the first user terminal continues regardless of user action, and the first parameter continuously increases by the second ratio while the second state of the first user terminal continues regardless of user action.

2. The information processing system according to claim 1, wherein the second ratio when the second state is the distribution state is different from the second ratio when the second state is the viewing state.

3. The information processing system according to claim 1, wherein the reward is an item that can be attached to the first character object associated with the first user.

4. The information processing system according to claim 1, wherein the reward is a free coin or a paid coin associated with the first user.

5. The information processing system according to claim 1, wherein the one or more processors further determine whether a number of actions from another user terminal or a worth related to a value of the actions exceeds a predetermined value in the first video that is being distributed at the first user terminal, the first state is a state in which it is determined that the number of actions or the worth related to the value of the actions is equal to or less than the predetermined value, and the second state is a state in which it is determined that the number of actions or the worth related to the value of the actions exceeds the predetermined value.

6. The information processing system according to claim 1, wherein the one or more processors further determine whether a number of actions from the first user terminal or a worth related to a value of the actions exceeds a predetermined value in the first video that is being distributed or viewed at the first user terminal, the first state is a state in which it is determined that the number of actions or the worth related to the value of the actions is equal to or less than the predetermined value, and the second state is a state in which it is determined that the number of actions or the worth related to the value of the actions exceeds the predetermined value.

7. The information processing system according to claim 1, wherein the one or more processors further determine whether a predetermined item is associated with the first user, and change the second ratio when it is determined that the predetermined item is associated with the first user.

8. The information processing system according to claim 1, further comprising a display that displays the value of the first parameter in a graph in the first video.

9. The information processing system according to claim 1, wherein the one or more processors are further programmed to increase or decrease the value of the first parameter based on an action from the first user terminal and/or another user terminal different from the first user terminal in the first video in which the first character object associated with the first user and a third character object associated with a third user are displayed, and change the first ratio to a third ratio according to the number of the first character object and the number of the third character object.

10. The information processing system according to claim 9, wherein the third ratio is varied according to a relationship between the first user and the third user.

11. An information processing method by one or more processors included in an information processing system that provides a virtual space, the method comprising:

receiving information sent from a first user terminal of a first user;

determining a state of the first user terminal based on the received information;

in response to determining that the state of the first user terminal is a first state, increasing a value of a first parameter associated with the first user by a first ratio while the first state continues;

in response to determining that the state of the first user terminal has changed from the first state to a second state, changing the first ratio to a second ratio such that the value of the first parameter is increased by the second ratio while the second state continues; and associating a predetermined reward with the first user according to the value of the first parameter, wherein the second state is either (i) a distribution state in which a first video is being distributed at the first user terminal, the first video including a first character object animated according to sensor data of tracked movement of the first user or (ii) a viewing state in which the first video is being viewed at the first user terminal, the first state is an active state in which an application for providing the virtual space is activated at the first user terminal, the first state not corresponding to either the distribution state or the viewing state, the first parameter continuously increases by the first ratio while the first state of the first user terminal continues regardless of user action, and the first parameter continuously increases by the second ratio while the second state of the first user terminal continues regardless of user action.

12. An information processing method by one or more processors included in an information processing device of a first user included in an information processing system that provides a virtual space, the method comprising:

determining a state of the information processing device of the first user;

in response to determining that the state of the information processing device is a first state, increasing a value of a first parameter associated with the first user by a first ratio while the first state continues;

in response to determining that the state of the information processing device has changed from the first state to a second state, changing the first ratio to a second ratio such that the value of the first parameter is increased by the second ratio while the second state continues; and associating a predetermined reward with the first user according to the value of the first parameter, wherein the second state is either (i) a distribution state in which a first video is being distributed at the information processing device, the first video including a first character object animated according to sensor data of tracked movement of the first user or (ii) a viewing state in which the first video is being viewed at the information processing device, and, the first state is an active state in which an application for providing the virtual space is activated at the information processing device, the first state not corresponding to either the distribution state or the viewing state, the first parameter continuously increases by the first ratio while the first state of the information processing device continues regardless of user action, and the first parameter continuously increases by the second ratio while the second state of the information processing device continues regardless of user action.

13. A non-transitory computer-readable medium storing thereon a program that causes one or more processors included in an information processing device of a first user included in an information processing system that provides a virtual space to execute:

determining a state of the information processing device of the first user;

in response to determining that the state of the information processing device is a first state, increasing a value of a first parameter associated with the first user by a first ratio while the first state continues;

in response to determining that the state of the information processing device has changed from the first state to a second state, changing the first ratio to a second ratio such that the value of the first parameter is increased by the second ratio while the second state continues; and associating a predetermined reward with the first user according to the value of the first parameter, wherein the second state is either (i) a distribution state in which a first video is being distributed at the information processing device, the first video including a first character object animated according to sensor data of tracked movement of the first user or (ii) a viewing state in which the first video is being viewed at the information processing device, the first state is an active state in which an application for providing the virtual space is activated at the information processing device, the first state not corresponding to either the distribution state or the viewing state, the first parameter continuously increases by the first ratio while the first state of the information processing device continues regardless of user action, and the first parameter continuously increases by the second ratio while the second state of the information processing device continues regardless of user action.

* * * * *